US010642562B2

(12) United States Patent
Akatsuka et al.

(10) Patent No.: US 10,642,562 B2
(45) Date of Patent: May 5, 2020

(54) DISPLAY APPARATUS AND DISPLAY SYSTEM

(71) Applicant: KABUSHIKI KAISHA TOSHIBA, Minato-ku, Tokyo (JP)

(72) Inventors: Yasuo Akatsuka, Tokyo (JP); Masahiro Takagi, Tokyo (JP); Hiroshi Tsurumi, Kawasaki Kanagawa (JP); Kojiro Suzuki, Kawasaki Kanagawa (JP); Koji Horisaki, Yokohama Kanagawa (JP); Toshihiro Nakamura, Kawasaki Kanagawa (JP); Takashi Nakada, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 25 days.

(21) Appl. No.: 16/107,193

(22) Filed: Aug. 21, 2018

(65) Prior Publication Data
US 2018/0357035 A1 Dec. 13, 2018

Related U.S. Application Data

(63) Continuation of application No. 15/062,008, filed on Mar. 4, 2016, now Pat. No. 10,078,485.

(30) Foreign Application Priority Data

Mar. 13, 2015 (JP) .................................. 2015-051170
Feb. 8, 2016 (JP) .................................. 2016-022044

(51) Int. Cl.
*G06F 3/14* (2006.01)
*G09G 5/00* (2006.01)

(52) U.S. Cl.
CPC ........... *G06F 3/1446* (2013.01); *G09G 5/006* (2013.01); *G09G 2356/00* (2013.01); *G09G 2370/042* (2013.01); *G09G 2370/16* (2013.01)

(58) Field of Classification Search
CPC .. G06F 3/1446; G09G 5/006; G09G 2356/00; G09G 2370/042; G09G 2370/16; H04W 4/008
See application file for complete search history.

(56) References Cited

U.S. PATENT DOCUMENTS 5,523,769 A 6/1996 Lauer et al.
7,006,083 B2 2/2006 Nishimura
(Continued)

FOREIGN PATENT DOCUMENTS

JP 4693930 B1 6/2011
JP 2012083403 A 4/2012
(Continued)

*Primary Examiner* — Bryan Earles
(74) *Attorney, Agent, or Firm* — Holtz, Holtz & Volek PC

(57) ABSTRACT

A display apparatus includes a plurality of surfaces, and a display device provided on at least one surface among the plurality of surfaces. A plurality of communication sections are arranged to correspond to at least two or more side surfaces with respect to the surface on which the display device is provided among the plurality of surfaces and configured to perform communication within a predetermined distance, each of the plurality of communication sections including different identification information. A control section is configured to perform control of the plurality of communication sections and the display device. When another display apparatus is connected to the display apparatus, the control section periodically performs time synchronization to synchronize an image displayed on the display device with an image displayed on a display device provided in the other display apparatus.

5 Claims, 48 Drawing Sheets

(56) References Cited

U.S. PATENT DOCUMENTS

| | | | |
|---|---|---|---|
| 7,576,707 B2 | 8/2009 | Nishimura | |
| 7,719,480 B2 | 5/2010 | Devos et al. | |
| 8,123,360 B2 | 2/2012 | Hasegawa | |
| 8,994,683 B2 | 3/2015 | Small et al. | |
| 9,547,467 B1 | 1/2017 | Deluca et al. | |
| 9,741,316 B2 * | 8/2017 | Loeffler | G06F 3/1438 |
| 9,792,081 B2 * | 10/2017 | Fukuhara | G06F 3/1423 |
| 2003/0146882 A1 | 8/2003 | Ogino et al. | |
| 2009/0066711 A1 | 3/2009 | Hou et al. | |
| 2010/0302284 A1 | 12/2010 | Karaki | |
| 2012/0062442 A1 * | 3/2012 | Locker | G06F 3/1446 |
| | | | 345/1.3 |
| 2015/0002371 A1 | 1/2015 | Burgess et al. | |
| 2015/0077310 A1 | 3/2015 | Inamoto et al. | |
| 2015/0340009 A1 * | 11/2015 | Loeffler | G06F 3/1438 |
| | | | 345/1.3 |
| 2016/0078664 A1 * | 3/2016 | Mizuguchi | G09G 5/12 |
| | | | 345/475 |
| 2016/0155389 A1 | 6/2016 | Beon et al. | |
| 2018/0314483 A1 * | 11/2018 | Liu | G06F 3/1446 |

FOREIGN PATENT DOCUMENTS

| | | |
|---|---|---|
| JP | 5282183 B2 | 9/2013 |
| JP | 5574438 B2 | 8/2014 |

\* cited by examiner

FIG. 5

TBL1

| SHAPE CODE | SHAPE | SHAPE INFORMATION | | | | PIXEL INFORMATION (NUMBER OF PIXELS) | | | |
|---|---|---|---|---|---|---|---|---|---|
| | | A: | B: | C: | D: | A: | B: | C: | D: |
| Rec | RECTANGLE | LONG SIDE 20 cm | SHORT SIDE 15 cm | LONG SIDE 20 cm | SHORT SIDE 15 cm | 1000 | 750 | 1000 | 750 |
| Squ | SQUARE | A,B,C,D:15cm | — | — | — | A,B,C,D:750 | — | — | — |
| Tri | REGULAR TRIANGLE | A,B,C:15cm | — | — | — | A,B,C:750 | — | — | — |
| Hex | REGULAR HEXAGON | A,B,C,D,E,F :15cm | — | — | — | A,B,C,D,E,F :750 | — | — | — |

FIG. 10

| ITEM NAME | SEARCH STATE | ADJACENT NUMBER |
|---|---|---|
| BLOCK TYPE | SQU | N.A. |
| OWN BLOCK NUMBER | 0 | N.A. |
| A STATE | NULL | 0 |
| B STATE | NULL | 0 |
| C STATE | NULL | 0 |
| D STATE | NULL | 0 |

TBL2

FIG. 11

|  | SEARCH STATE | | | ADJACENT NUMBER |
|---|---|---|---|---|
| INITIAL VALUE | NULL | | | 0 |
| VALUE DURING SEARCH | START | IN | SEARCH | 0 |
| SEARCH END VALUE | END | IN_END | SEARCH_END | EDGE | DUP | ANY ONE OF 0 TO N |

| ITEM NAME | SEARCH STATE | ADJACENT NUMBER |
|---|---|---|
| BLOCK TYPE | SQU | N.A. |
| OWN BLOCK NUMBER | 1 | N.A. |
| A STATE | START | 0 |
| B STATE | NULL | 0 |
| C STATE | NULL | 0 |
| D STATE | NULL | 0 |

| ITEM NAME | SEARCH STATE | ADJACENT NUMBER |
|---|---|---|
| BLOCK TYPE | SQU | N.A. |
| OWN BLOCK NUMBER | 1 | N.A. |
| A STATE | START | 0 |
| B STATE | SEARCH | 0 |
| C STATE | NULL | 0 |
| D STATE | NULL | 0 |

| ITEM NAME | SEARCH STATE | ADJACENT NUMBER |
|---|---|---|
| BLOCK TYPE | SQU | N.A. |
| OWN BLOCK NUMBER | 1 | N.A. |
| A STATE | START | 0 |
| B STATE | SEARCH | 0 |
| C STATE | NULL | 0 |
| D STATE | DUP | 8 |

FIG. 23

| ITEM NAME | SEARCH STATE | ADJACENT NUMBER |
|---|---|---|
| BLOCK TYPE | SQU | N.A. |
| OWN BLOCK NUMBER | 8 | N.A. |
| A STATE | IN_END | 7 |
| B STATE | EDGE | 0 |
| C STATE | EDGE | 0 |
| D STATE | DUP | 1 |

TBL2

| ITEM NAME | SEARCH STATE | ADJACENT NUMBER |
|---|---|---|
| BLOCK TYPE | SQU | N.A. |
| OWN BLOCK NUMBER | 1 | N.A. |
| A STATE | START | 0 |
| B STATE | SEARCH_END | 2 |
| C STATE | NULL | 0 |
| D STATE | DUP | 8 |

| ITEM NAME | SEARCH STATE | ADJACENT NUMBER |
|---|---|---|
| BLOCK TYPE | SQU | N.A. |
| OWN BLOCK NUMBER | 1 | N.A. |
| A STATE | START | 0 |
| B STATE | SEARCH_END | 2 |
| C STATE | SEARCH | 0 |
| D STATE | DUP | 8 |

| ITEM NAME | SEARCH STATE | ADJACENT NUMBER |
|---|---|---|
| BLOCK TYPE | SQU | N.A. |
| OWN BLOCK NUMBER | 1 | N.A. |
| A STATE | START | 0 |
| B STATE | SEARCH_END | 2 |
| C STATE | DUP | 9 |
| D STATE | DUP | 8 |

TBL2

| ITEM NAME | SEARCH STATE | ADJACENT NUMBER |
|---|---|---|
| BLOCK TYPE | SQU | N.A. |
| OWN BLOCK NUMBER | 1 | N.A. |
| A STATE | END | 0 |
| B STATE | SEARCH_END | 2 |
| C STATE | DUP | 9 |
| D STATE | DUP | 8 |

TBL2

TBL4

| TRANSMITTING/RECEIVING SECTION OF UPSTREAM SIDE BLOCK | TRANSMITTING/RECEIVING SECTION OF DOWNSTREAM SIDE BLOCK | | | |
|---|---|---|---|---|
| | A | B | C | D |
| A | 180 | 270 | 0 | 90 |
| B | 90 | 180 | 270 | 0 |
| C | 0 | 90 | 180 | 270 |
| D | 270 | 0 | 90 | 180 |

FIG. 44

| IMAGE DATA TRANSMISSION SIDE BLOCK | | IMAGE DATA RECEPTION SIDE BLOCK | | BLOCK | ROTATION ANGLE (θ1(x)) | | | | CUMULATIVE ROTATION ANGLE (θ2(x)) | | | | MOD(θ2(x),360) | | | |
|---|---|---|---|---|---|---|---|---|---|---|---|---|---|---|---|---|
| BLOCK NAME | TRANSMITTING/RECEIVING SECTION NAME | BLOCK NAME | TRANSMITTING/RECEIVING SECTION NAME | | 180 | 90 | | | 180 | 90 | | | 180 | 90 | | |
| SMARTPHONE | A | B | 2(1) | A | | | | | | | | | | | | |
| | (C) | D | | | (0) | 270 | | | 0 | 270 | | | 0 | 270 | | |
| 2(1) | B | | 2(2) | A | 90 | | | | 90 | | | | 90 | | | |
| 2(2) | D | | 2(3) | D | 180 | | | | 270 | | | | 270 | | | |
| 2(3) | B | | 2(4) | C | 270 | | | | 540 | | | | 180 | | | |
| 2(4) | B | | 2(5) | A | 90 | | | | 630 | | | | 270 | | | |
| 2(5) | C | | 2(6) | D | 270 | | | | 900 | | | | 180 | | | |
| 2(6) | C | | 2(7) | B | 90 | | | | 990 | | | | 270 | | | |
| 2(7) | D | | 2(8) | D | 180 | | | | 1170 | | | | 90 | | | |
| 2(8) | D | | 2(7) | D | 180 | | | | 1350 | | | | 270 | | | |
| 2(7) | A | | 2(9) | A | 180 | | | | 1530 | | | | 90 | | | |

TBL5

FIG. 46

| | | | 2(1) | | 2(2) | | 2(3) | | 2(4) | | 2(5) | | 2(6) | | 2(7) | | 2(8) | | 2(7) | | 2(9) | |
|---|---|---|---|---|---|---|---|---|---|---|---|---|---|---|---|---|---|---|---|---|---|---|---|
| | BLOCK NUMBER | TRANSMITTING/ RECEIVING SECTION NAME | A | | A | | D | | C | | A | | D | | B | | D | | D | | A | |
| BLOCK NUMBER | SMARTPHONE | | B | 180 | 90 | | | | | | | | | | | | | | | | | | |
| | | | A | 0 | 270 | | | | | | | | | | | | | | | | | | |
| | | | C | | | | | | | | | | | | | | | | | | | | |
| | | | D | | | | | | | | | | | | | | | | | | | | |
| 2(1) | | B | | | 270 | 180 | | | | | | | | | | | | | | | | | |
| | | | | | 90 | 0 | | | | | | | | | | | | | | | | | |
| 2(2) | | D | | | | | 90 | 0 | | | | | | | | | | | | | | | |
| | | | | | | | 270 | 180 | | | | | | | | | | | | | | | |
| 2(3) | | B | | | | | | | 0 | 270 | | | | | | | | | | | | | |
| | | | | | | | | | 180 | 90 | | | | | | | | | | | | | |
| 2(4) | | B | | | | | | | | | 90 | 0 | | | | | | | | | | | |
| | | | | | | | | | | | 270 | 180 | | | | | | | | | | | |
| 2(5) | | A | | | | | | | | | | | 0 | 270 | | | | | | | | | |
| | | | | | | | | | | | | | 180 | 90 | | | | | | | | | |
| 2(6) | | C | | | | | | | | | | | | | 90 | 0 | | | | | | | |
| | | | | | | | | | | | | | | | 270 | 180 | | | | | | | |
| 2(7) | | D | | | | | | | | | | | | | | | 270 | 180 | | | | | |
| | | | | | | | | | | | | | | | | | 90 | 0 | | | | | |
| 2(8) | | D | | | | | | | | | | | | | | | | | 90 | 0 | | | |
| | | | | | | | | | | | | | | | | | | | 270 | 180 | | | |
| 2(7) | | A | | | | | | | | | | | | | | | | | | | 270 | 180 | 0 |
| | | | | | | | | | | | | | | | | | | | | | | 90 | |

UPSTREAM SIDE BLOCK / DOWNSTREAM SIDE BLOCK — TBL6

FIG. 48

| IMAGE DATA TRANSMISSION SIDE BLOCK | | | IMAGE DATA RECEPTION SIDE BLOCK | | BLOCK | ROTATION ANGLE (θ1(x)) | | | | CUMULATIVE ROTATION ANGLE (θ2(x)) | | | | MOD(θ2(x),360) | | | |
|---|---|---|---|---|---|---|---|---|---|---|---|---|---|---|---|---|---|
| BLOCK NAME | TRANSMITTING/RECEIVING SECTION NAME | | BLOCK NAME | TRANSMITTING/RECEIVING SECTION NAME | | 0 | 90 | | 270 | 0 | 90 | | 270 | 0 | 90 | | 270 |
| SMARTPHONE | 0 | 90 | | | 2(1) | | | | | | | | | | | | |
| | 180 | 270 | 2(1) | | | 180 | 270 | | | 180 | 270 | | | 180 | 270 | | |
| 2(1) | A | | 2(2) | B | 2(2) | | 270 | | | | 360 | | | | 0 | | |
| 2(2) | C | | 2(3) | B | 2(3) | | 90 | | | | 450 | | | | 90 | | |
| 2(3) | C | | 2(4) | C | 2(4) | | 180 | | | | 630 | | | | 270 | | |
| 2(4) | B | | 2(5) | C | 2(5) | | 270 | | | | 900 | | | | 180 | | |
| 2(5) | B | | 2(6) | A | 2(6) | | 90 | | | | 990 | | | | 270 | | |
| 2(6) | C | | 2(7) | D | 2(7) | | 270 | | | | 1260 | | | | 180 | | |
| 2(7) | C | | 2(8) | B | 2(8) | | 90 | | | | 1350 | | | | 270 | | |
| 2(8) | D | | 2(9) | D | 2(9) | | 180 | | | | 1530 | | | | 90 | | |

FIG. 49

TBL8

| BLOCK NUMBER (UPSTREAM) | TRANSMITTING/ RECEIVING SECTION NAME | 2(1) | 2(2) | 2(3) | 2(4) | 2(5) | 2(6) | 2(7) | 2(8) | 2(9) |
|---|---|---|---|---|---|---|---|---|---|---|
| SMARTPHONE | | 0 / 180 | 90 / 270 | | | | | | | |
| 2(1) | A | ╲ | 0 / 180 | 90 / 270 | | | | | | |
| 2(2) | C | | 270 / 90 | 0 / 180 | | | | | | |
| 2(3) | C | | | 0 / 180 | 90 / 270 | | | | | |
| 2(4) | B | | | | 180 / 0 | 270 / 90 | | | | |
| 2(5) | B | | | | | 90 / 270 | 180 / 0 | | | |
| 2(6) | C | | | | | | 180 / 0 | 270 / 90 | | |
| 2(7) | C | | | | | | | 90 / 270 | 180 / 0 | |
| 2(8) | D | | | | | | | | 180 / 0 | 270 / 90 |
| | | | | | | | | | | 0 / 180, 90 / 270 |

DOWNSTREAM SIDE BLOCK →

↑ UPSTREAM SIDE BLOCK

DISPLAY APPARATUS AND DISPLAY SYSTEM

CROSS REFERENCE TO RELATED APPLICATIONS

This application is a Continuation Application of U.S. application Ser. No. 15/062,008, filed on Mar. 4, 2016, which claims the benefit of priority from the prior Japanese Patent Application No. 2015-051170 filed in Japan on Mar. 13, 2015 and the Japanese Patent Application No. 2016-022044 filed in Japan on Feb. 8, 2016, the entire contents of all of which are incorporated herein by their reference.

FIELD

An embodiment described herein relates generally to a display apparatus and a display system.

BACKGROUND

Display apparatuses that display images such as still images and moving images have been widely used in a television, a personal computer, a tablet terminal, a smartphone, a digital signage, and the like.

In order to display a large image, there has also been proposed a large screen system in which a plurality of display panels are planarly arranged to form a large display screen.

However, in the display apparatus and the display system in the past, a shape and a size of a display screen are determined in advance. The shape and the size cannot be changed. In the case of the large screen system formed by arranging the plurality of display panels, a shape and a size of a screen once constructed cannot be changed.

BRIEF DESCRIPTION OF THE DRAWINGS

FIG. 5 is a diagram showing an example of a display block information table TBL1 stored in a memory 32 or a ROM 37 of the smartphone 3 according to the embodiment;

FIG. 10 is a diagram showing a state during initialization of a state information table TBL2 of the block 2 according to the embodiment;

FIG. 11 is a diagram showing values of state variables that a search state and an adjacent number written in the state information table TBL2 can take according to the embodiment;

FIG. 23 is a diagram showing a state of the state information table TBL2 of the block (8) at time when the block (8) transmits the search response RC to a block 2(7) according to the embodiment;

FIG. 32 is a diagram showing an example of an adjacent matrix table generated in S112 according to the embodiment;

FIG. 33 is a diagram showing a part of an adjacent matrix table TBL3 including information concerning a connection relation among the blocks 2 as a result of the processing in FIG. 30 according to the embodiment;

FIG. 43 is a data table showing how many degrees pixel coordinates of the block 2(2) on a downstream side are rotated to the right with respect to the block 2(1) on an upstream side to set arrangement relations of the transmitting/receiving sections the same;

FIG. 44 is a diagram showing an example of rotation angles of pixel coordinates of the respective blocks 2(1) to 2(9) coupled as shown in FIG. 36;

FIG. 46 is a diagram showing an example of rotation angles of pixel coordinates at the time when the respective blocks 2(1) to 2(9) coupled as shown in FIG. 36 are viewed from respective directions;

FIG. 48 is a diagram showing an example of rotation angles of the pixel coordinates of the respective blocks 2(1) to 2(9) coupled as shown in FIG. 47;

FIG. 49 is a diagram showing an example of rotation angles of the pixel coordinates at the time when the respective blocks 2(1) to 2(9) coupled as shown in FIG. 47 are viewed from the respective directions;

Figure 52:
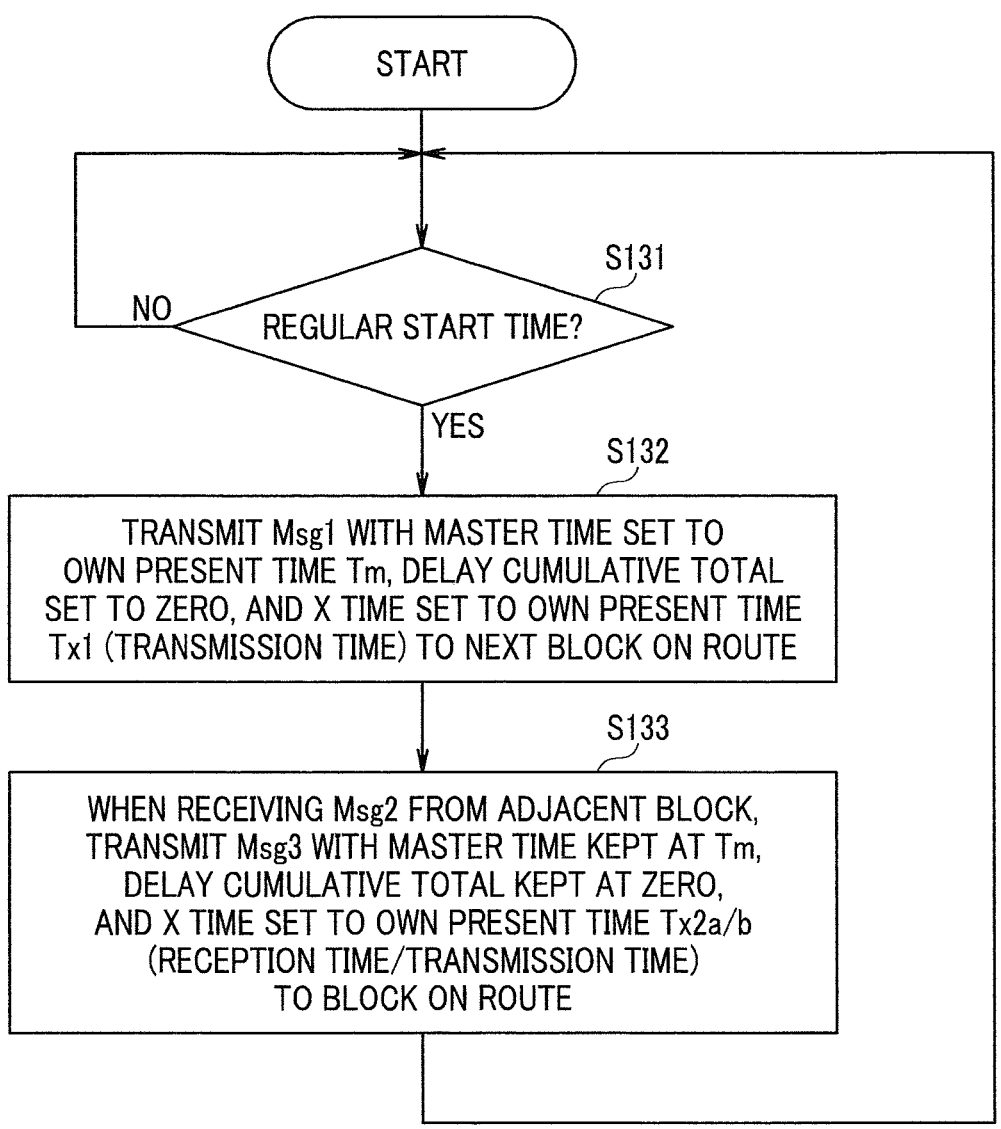
Figure 53:
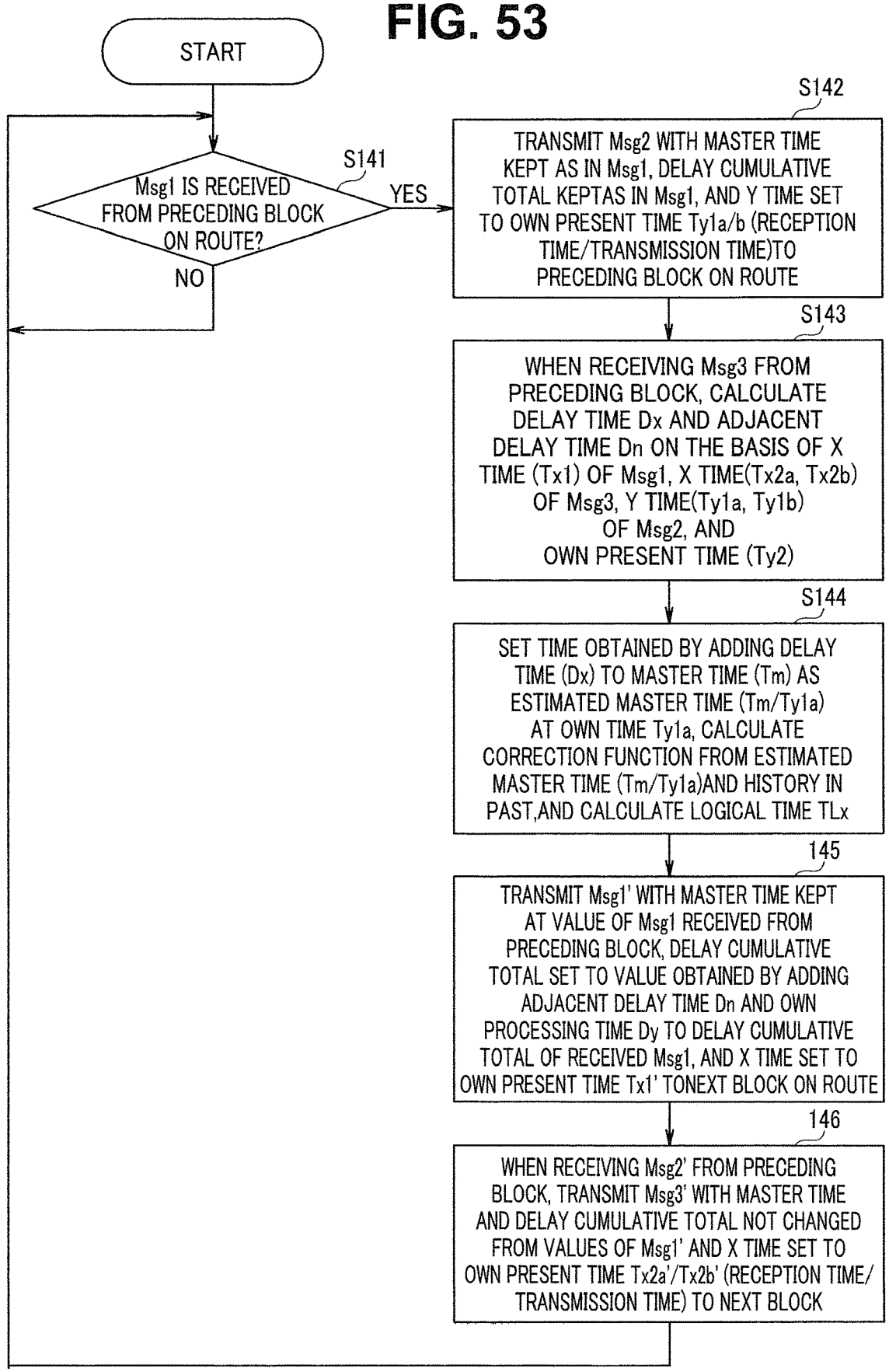
Figure 54:
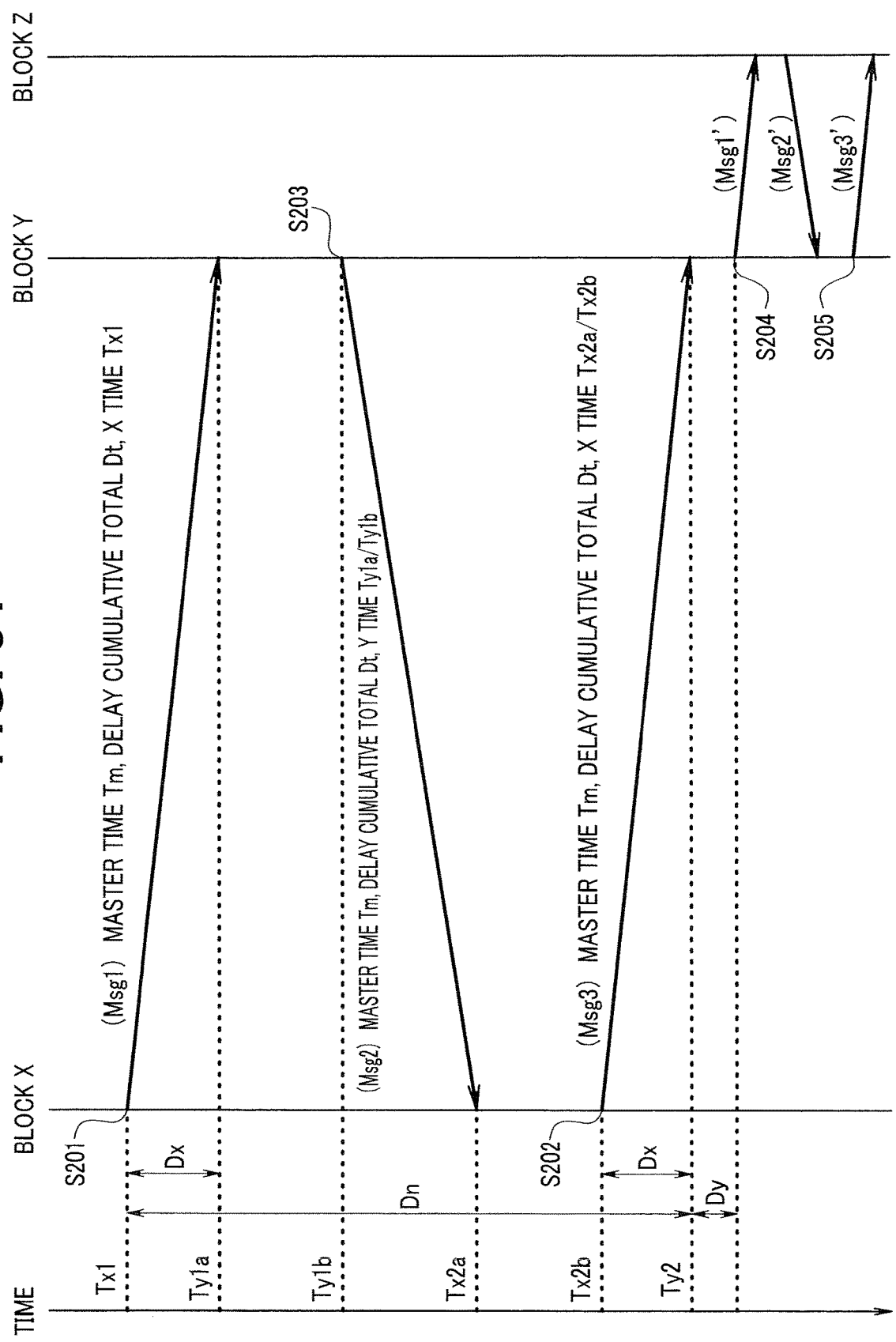
Figure 55:
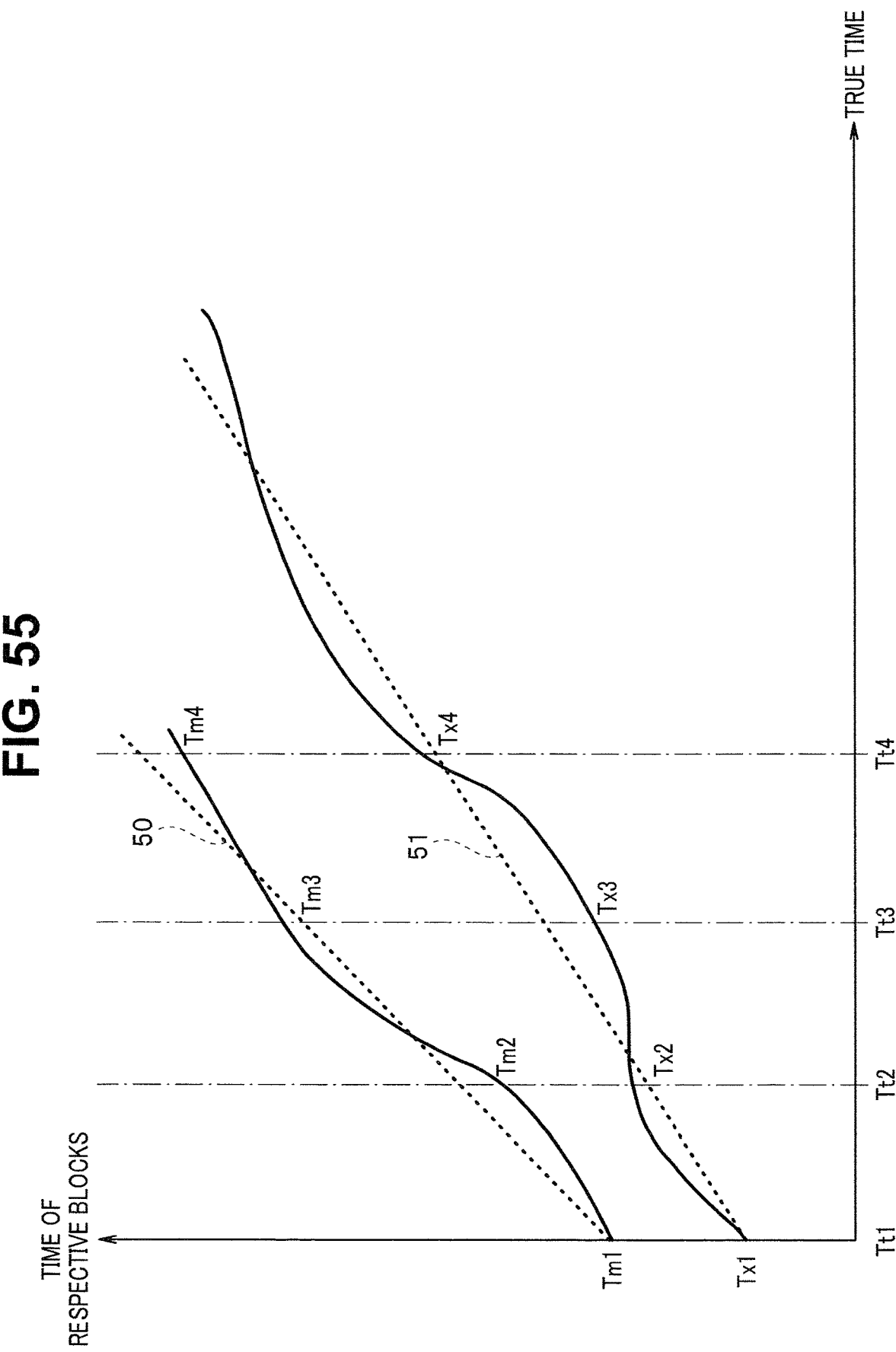
Figure 56:
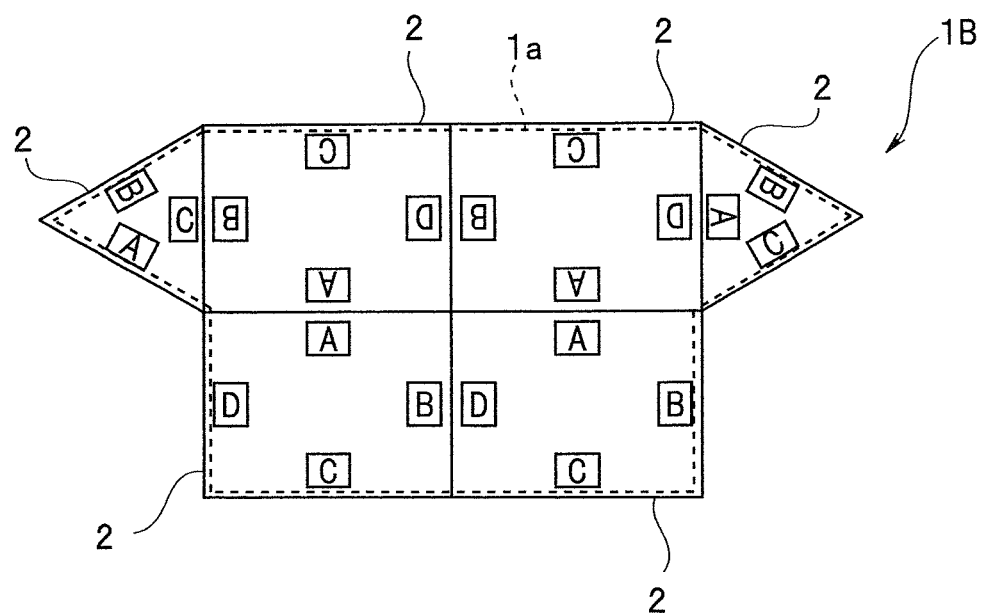
Figure 57A:
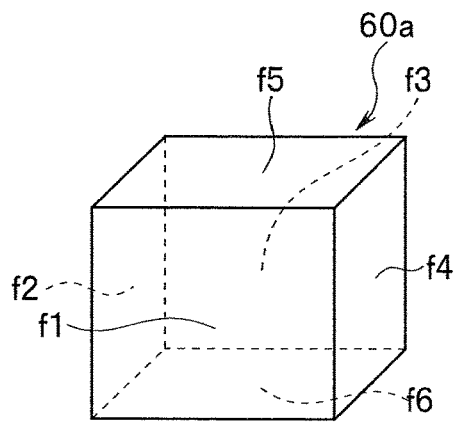
Figure 57B:
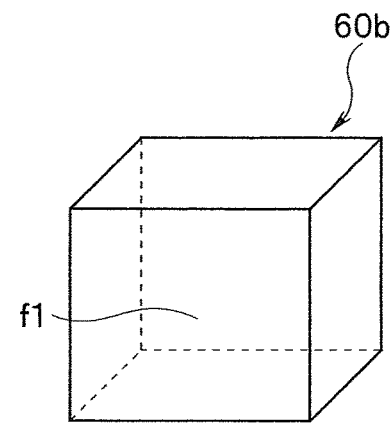
Figure 57C:
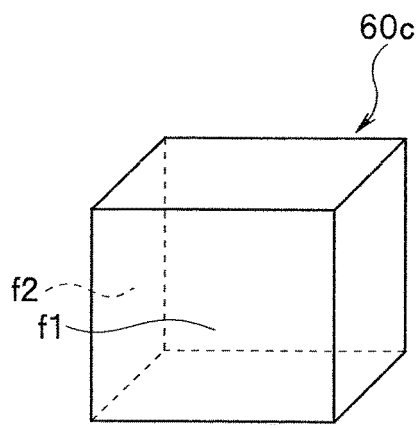
Figure 57D:
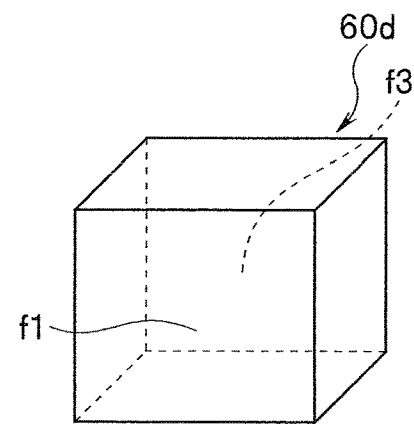
Figure 57E:
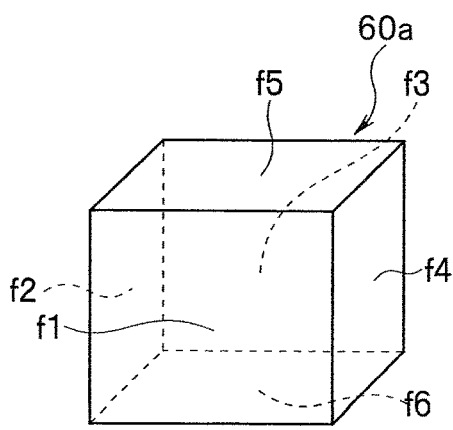
Figure 57F:
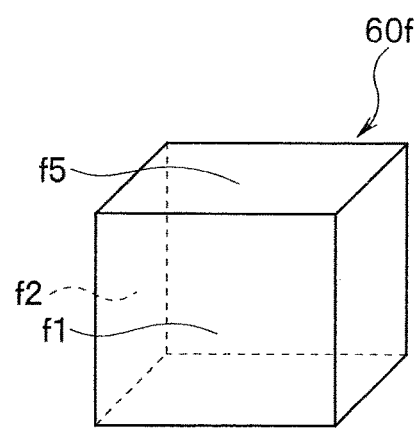
Figure 57G:
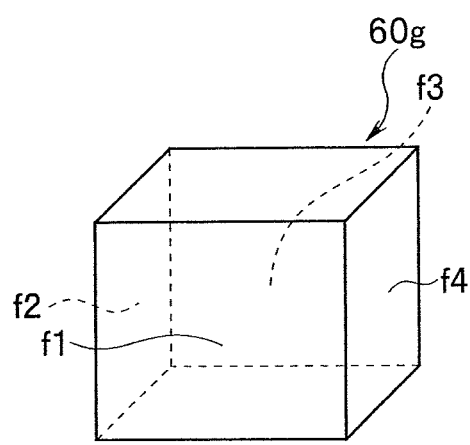
Figure 57H:
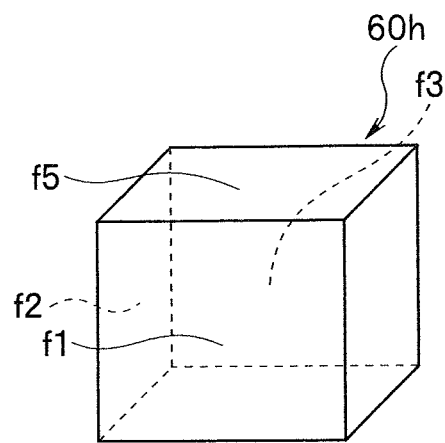
Figure 57I:
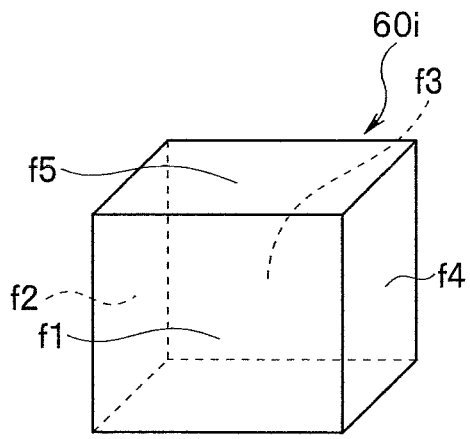
Figure 58:
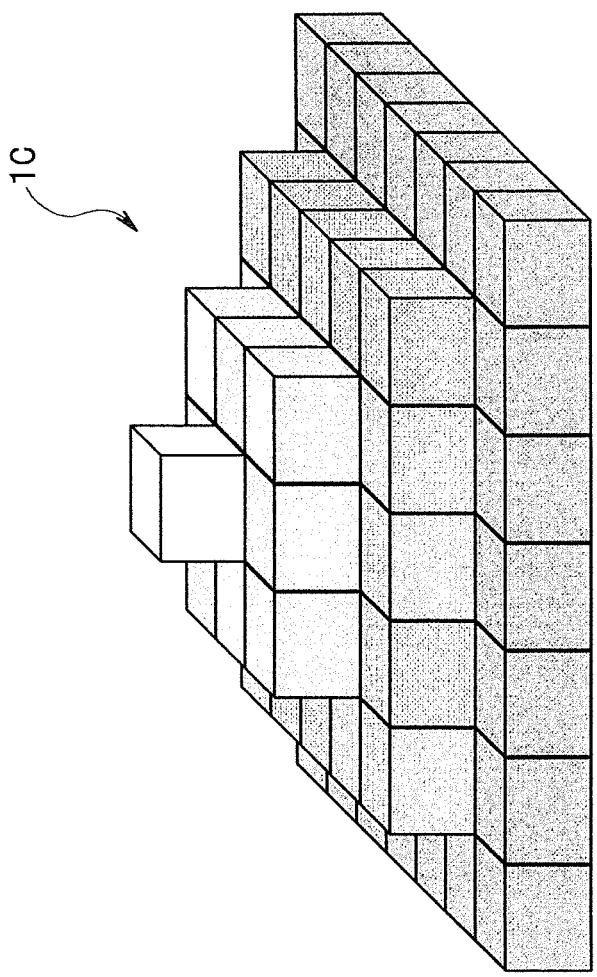
Figure 59:
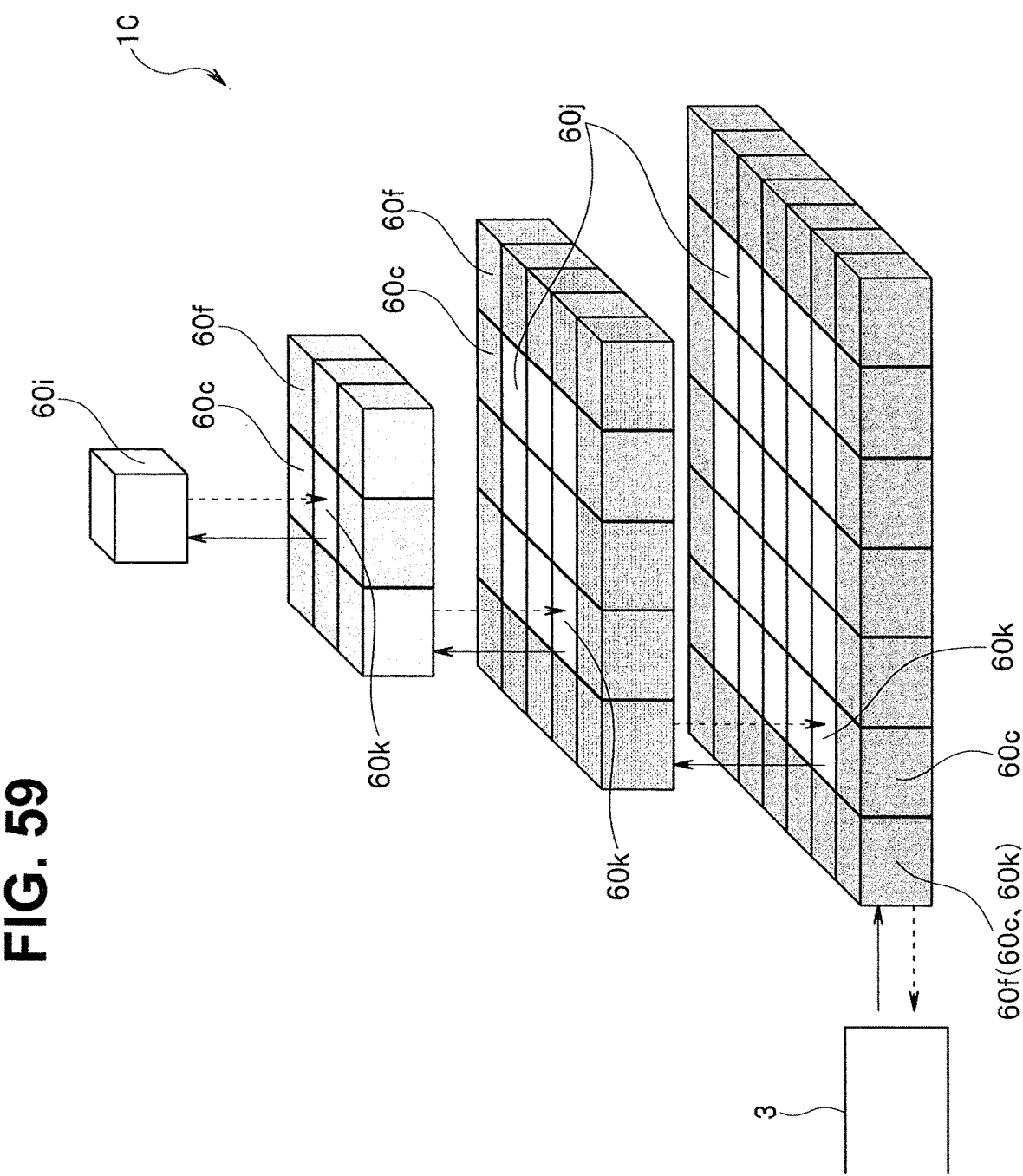
Figure 60:
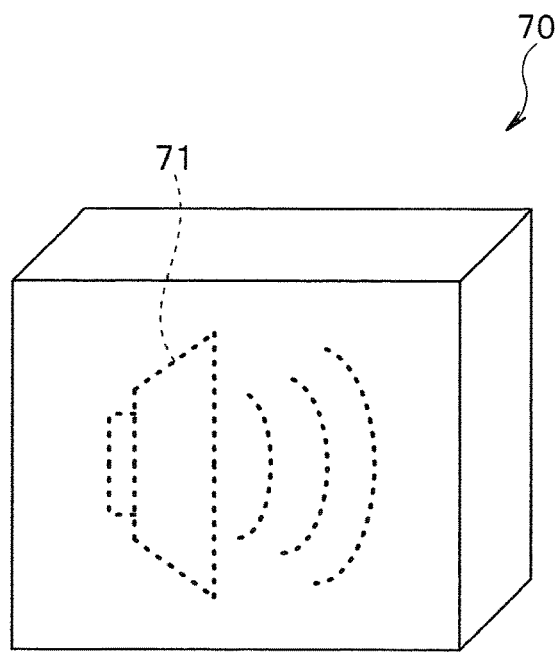
Figure 61:
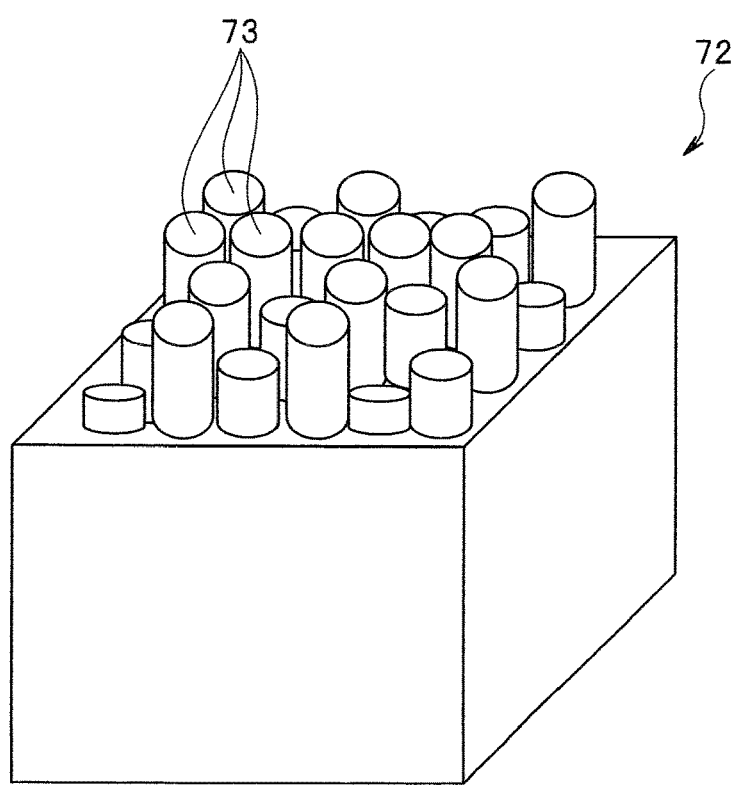

FIG. S1 is a flowchart for explaining an example of a flow of transfer/display processing of block image information in the respective blocks 2 according to the embodiment;

FIG. 52 is a flowchart for explaining an example of time synchronous message processing in a master block;

FIG. 53 is a flowchart for explaining an example of time synchronous message processing in a slave block;

FIG. 54 is a timing chart for explaining the processing shown in FIGS. 52 and 53;

FIG. 55 is a diagram for explaining logical time in S144 in FIG. 53;

FIG. 56 is a diagram showing a configuration example of a display system 1B including blocks having two kinds of shapes, i.e., a rectangle and a regular triangle according to the embodiment;

FIG. 57A is a perspective view showing an example of a cubic block;

FIG. 57B is a perspective view showing an example of a cubic block;

FIG. 57C is a perspective view showing an example of a cubic block;

FIG. 57D is a perspective view showing an example of a cubic block;

FIG. 57E is a perspective view showing an example of a cubic block;

FIG. 57F is a perspective view showing an example of a cubic block;

FIG. 57G is a perspective view showing an example of a cubic block;

FIG. 57H is a perspective view showing an example of a cubic block;

FIG. 57I is a perspective view showing an example of a cubic block;

FIG. 58 is a diagram showing an example of a display system formed in a pyramid structure by placing cubic blocks one on top of another in stages;

FIG. 59 is an exploded view of the display system 1C having the pyramid structure exploded in the respective stages;

FIG. 60 is a diagram showing an example of another configuration of a block; and FIG. 61 is a diagram showing an example of another configuration of a block.

DETAILED DESCRIPTION

A display apparatus according to an embodiment is a display apparatus including a plurality of surfaces. The display apparatus includes: a display device provided on at least one surface among the plurality of surfaces; a plurality of communication sections arranged to correspond to at least two or more side surfaces with respect to the surface on which the display device is provided among the plurality of surfaces and configured to perform communication within a predetermined distance; and a control section configured to perform control of the plurality of communication sections and the display device.

A display system according to the embodiment includes the display apparatus according to the embodiment in plurality.

The embodiment is explained below with reference to the drawings.

(Configuration)

Figure 1:
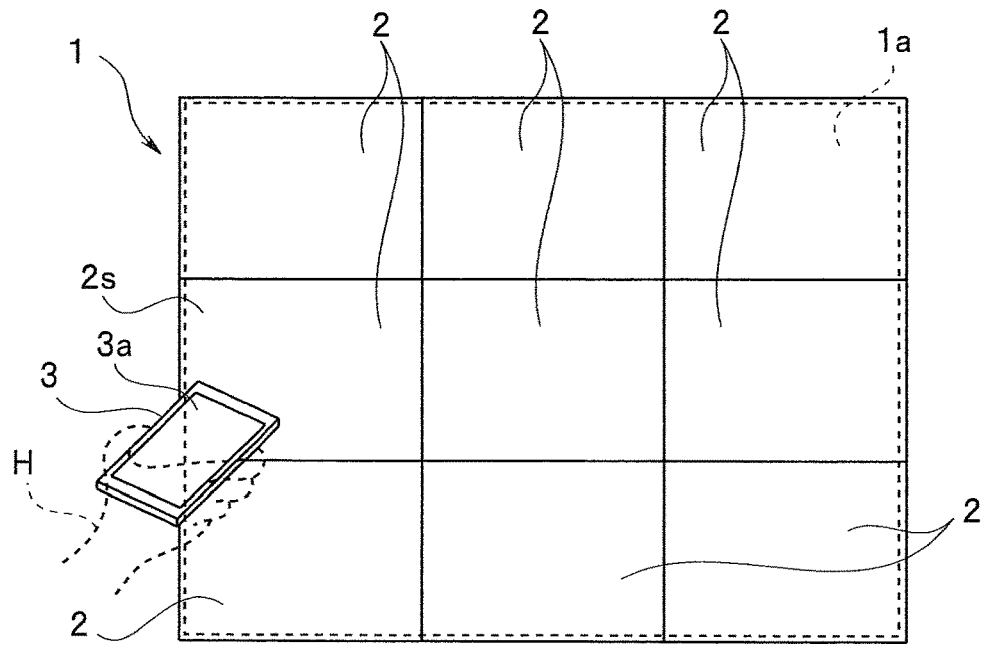
FIG. 1 is a diagram for explaining a use mode of a display system 1 according to an embodiment.
Figure 2:
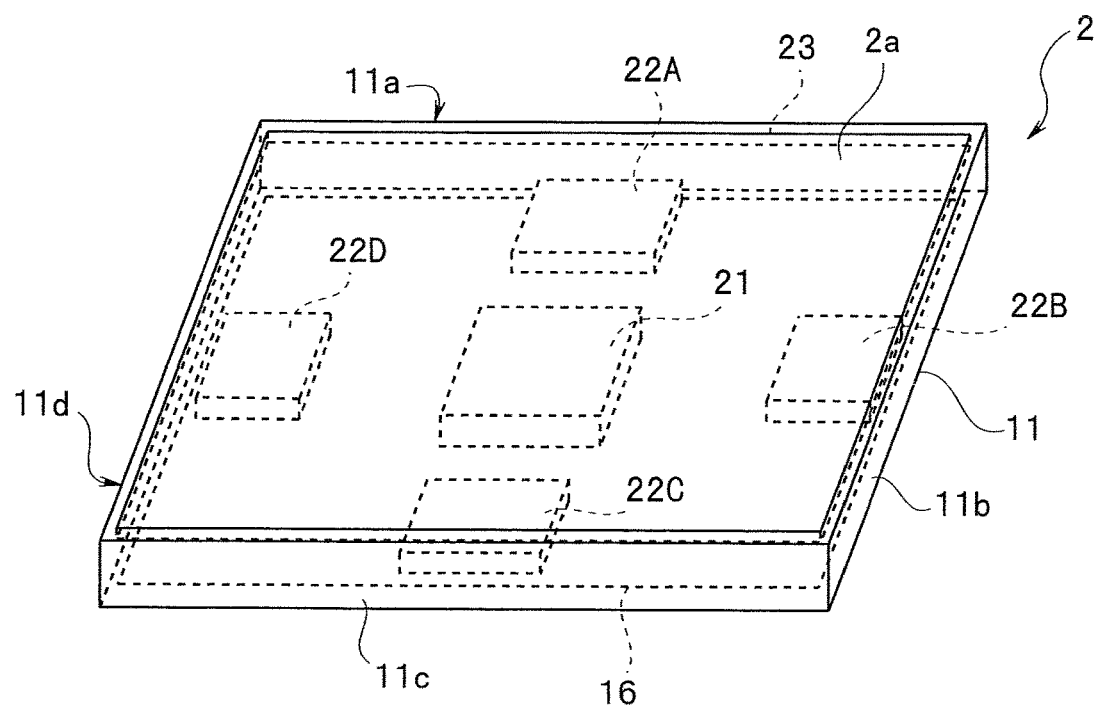
FIG. 2 is a perspective view of a display block 2 configuring the display system 1 according to the embodiment.
Figure 3:
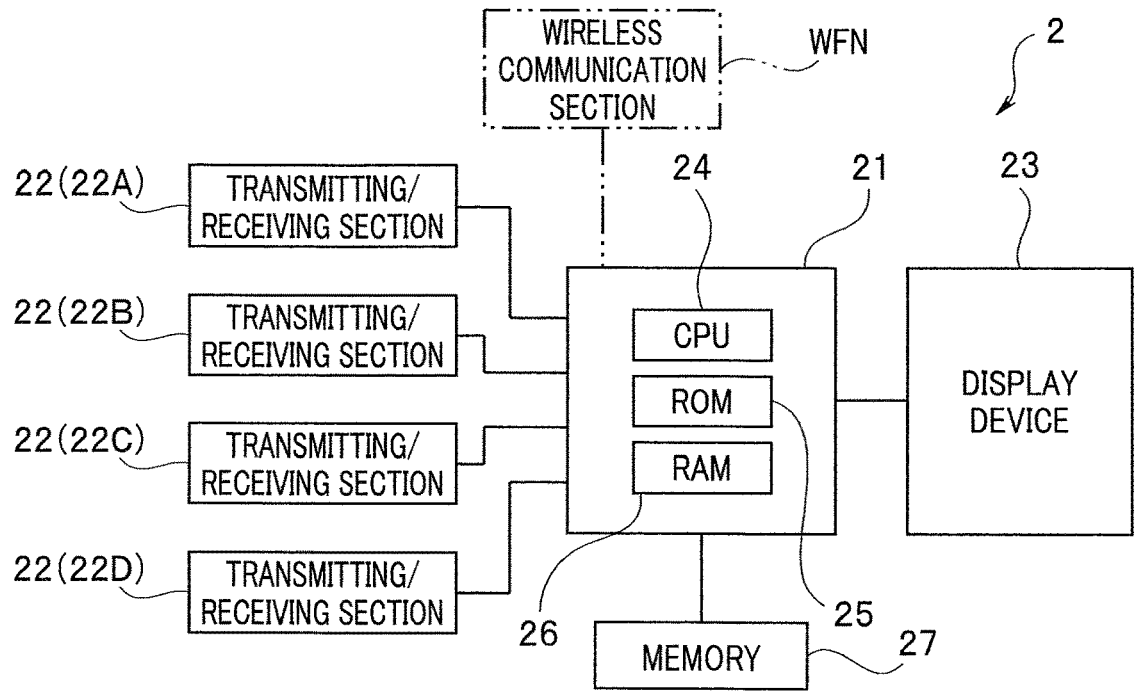
FIG. 3 is a block diagram showing an internal configuration of the display block 2.
Figure 4:
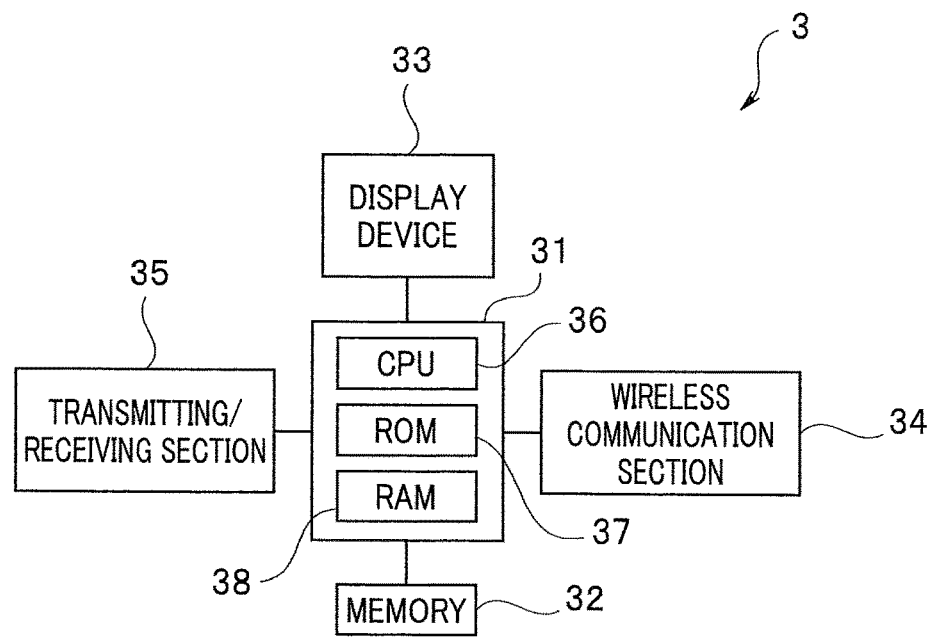
FIG. 4 is a block diagram showing an internal configuration of a smartphone 3.

FIG. 1 is a diagram for explaining a use mode of a display system 1 according to the present embodiment. FIG. 2 is a perspective view of a display block 2 configuring the display system 1 according to the embodiment. FIG. 3 is a block diagram showing an internal configuration of the display block 2. FIG. 4 is a block diagram showing an internal configuration of a smartphone 3.

The display system 1 is configured from a plurality (nine, here) of display blocks (hereinafter simply referred to as blocks) 2. As shown in FIG. 2, the block 2, which is a display apparatus, includes a housing 11 of a predetermined thickness including a plurality of surfaces and including a display surface 2a on one surface on an upper side. A display surface 1a of the display system 1 including the display surfaces 2a of the plurality of blocks 2 is formed by arranging side surface sections of the housings 11 of the blocks 2 to be joined.

That is, the block 2 includes the display surface 2a on one of the plurality of surfaces and includes a plurality (four, here) of side surface sections around the display surface 2a. The display surface 1a of the display system 1 is one display surface including a plurality of display surfaces 2a formed by arranging the side surface sections of the blocks 2 in close contact with or close to one another. The arrangement of the surfaces in close contact with or close to one another is explained using a word "coupling" in this specification.

The housing 11 of the block 2 is made of plastic resin or the like. The coupling of the side surface sections of the blocks 2 may be physical connection by, for example, magnets (not shown in the figure) provided on inner sides of the side surface sections of the respective blocks. However, the coupling is performed on condition that the coupling does not hinder communication of information from a block to a block explained below.

As shown in FIG. 1, a user can bring the smartphone 3 grasped by a hand H close to any one block 2 of the display system 1 and transmit a predetermined command to the display system 1.

That is, the user can couple the plurality of blocks 2 to one another and construct the display system 1 including the display surface 1a having any shape. The user can transmit the predetermined command and an image to be displayed to the display system 1 and cause the display system 1 to display the image on the display surface 1a. In the case of FIG. 1, the display surface 1a of the display system 1 is configured from nine display surfaces 2a of the nine blocks 2.

As explained above, each of the blocks 2, which are the display apparatuses, includes a plurality of surfaces. Each of the blocks 2 includes a display device 23 provided to locate the display surface 2a on at least one of the plurality of surfaces.

As shown in FIGS. 2 and 3, each of the blocks 2 includes a control section 21, four transmitting/receiving sections 22A, 22B, 22C, and 22D (hereinafter referred to as transmitting/receiving section(s) 22 when the four transmitting/receiving sections are collectively indicated or one transmitting/receiving section is indicated), and a display device 23. The control section 21 and the four transmitting/receiving sections 22 are mounted on a substrate 16.

As shown in FIG. 3, the control section 21 includes a central processing unit (hereinafter referred to as CPU) 24, a ROM 25, and a RAM 26. Further, a memory 27, which is a nonvolatile memory such as a flash memory, is connected to the control section 21. In the RAM 26, a state information table TBL2 explained below is stored and information such as a coupled state with the other blocks is stored.

The memory 27 is a memory having a relatively large capacity. As explained below, the memory 27 is capable of storing a large number of image data of still images. When it is desired to store a large number of moving images having large capacities, a storage capacity of the memory 27 may be increased according to the capacities of the moving images.

The CPU 24 can read out a computer program stored in the ROM 25, develop the computer program in the RAM 26, and execute the computer program. In the ROM 25, a processing program and table information explained below are stored in advance.

The four transmitting/receiving sections 22 are disposed on respective four sides of each of the blocks 2 having a rectangular shape, more specifically, near the respective side surface sections of the housing 11. The transmitting/receiving sections 22 are transmitting/receiving sections for near field communication (NFC). The transmitting/receiving sections 22 are circuits capable of performing, in a state in which a certain side of each of the blocks 2 is coupled to a certain side of another block 2, communication only between two transmitting/receiving sections 22 disposed near the coupled two sides.

The two transmitting/receiving sections 22 are capable of communicating with each other, for example, only at a distance within several centimeters. When a side surface section 11a of certain one block 2 and a side surface section 11b of another block 2 are coupled, the transmitting/receiving section 22A disposed near the side surface section 11a of the one block 2 is capable of communicating with a transmitting/receiving section 22B disposed near the side surface section 11b of the other block 2. However, the transmitting/receiving section 22A is incapable of communicating with the transmitting/receiving section 22C near a side surface section 11c of the other block 2, the transmitting/receiving section 22D near a side surface section 11d of the other block 2, and the transmitting/receiving section 22A near the side surface section 11a of the other block 2.

Similarly, the transmitting/receiving section 22B disposed near the side surface section 11b of the other block 2 is capable of communicating with the transmitting/receiving section 22A disposed near the side surface section 11a of the one block 2. However, the transmitting/receiving section 22B is incapable of communicating with the transmitting/receiving section 22C near the side surface section 11c of the one block 2, the transmitting/receiving section 22D near the side surface section 11d of the one block 2, and the transmitting/receiving section 22B near the side surface section 11b of the one block 2. Note that a size of blocks is different according to a purpose of use of the blocks. Therefore, a communication distance between the blocks only has to be adjusted to match the size.

As explained above, each of the blocks 2 includes the plurality of transmitting/receiving sections 22A, 22B, 22C, and 22D disposed to correspond to at least two or more surfaces (four surfaces, here) among a plurality (six, here) of surfaces and configured to perform communication within a predetermined distance.

When receiving a signal from the transmitting/receiving section 22 of another block 2, each of the transmitting/receiving sections 22, which are communication sections, can transmit a communication response signal and recognize that the transmitting/receiving sections 22 are capable of communicating with each other.

Therefore, when a certain block 2 is coupled to another block 2, communication is possible only between the two transmitting/receiving sections 22 near coupled two side surface sections adjacent to each other. Transmission and reception of a command and data can be performed between the two transmitting/receiving sections 22.

As explained below, the smartphone 3 also includes a transmitting/receiving section 35 for near field communication (NFC) like the transmitting/receiving sections 22. The respective transmitting/receiving sections 22 are capable of performing near field communication with the smartphone 3 as well.

The control section 21 of each of the blocks 2 includes information for associating the respective side surface sections of the own blocks and the transmitting/receiving sections 22 disposed near the respective side surface sections. In the case of the block 2 shown in FIG. 2, information indicating that the transmitting/receiving section 22A is disposed near the side surface section 11a, the transmitting/receiving section 22B is disposed near the side surface section 11b, the transmitting/receiving section 22C is disposed near the side surface section 11c, and the transmitting/receiving section 22D is disposed near the side surface section 11d is written in the ROM 25 of the control section 21 in advance, for example, during manufacturing of the block 2.

Note that, in the following explanation, a side on which the transmitting/receiving section 22A is disposed is referred to as A side, a side on which the transmitting/receiving section 22B is disposed is referred to as B side, a side on which the transmitting/receiving section 22C is disposed is referred to as C side, and a side on which the transmitting/receiving section 22D is disposed is referred to as D side.

Further, in each of the blocks 2, the display device 23 is provided on an upper surface side of the block 2 to locate a display surface on an upper surface of the block 2 having a rectangular parallelepiped shape. The display surface 2a is the display surface of the display device 23 and is formed to cover substantially an entire surface of the upper surface of the block 2. The display device 23 is a liquid crystal display device, an organic EL display device, an LED display device, or the like.

That is, a surface of each of the blocks 2 on which the display surface 2a is located is an upper surface of the housing. At least two or more surfaces (four surfaces) on which the plurality of transmitting/receiving sections 22A, 22B, 22C, and 22D are disposed are side surfaces of the housing.

Note that, in each of the blocks 2, a not-shown power switch (e.g., the surface on the opposite side of the display device 23) is provided. Respective circuits such as the CPU 24 of each of the blocks 2 are started by turning on the power switch.

As shown in FIG. 4, the smartphone 3 includes a control section 31, a memory 32, a display device 33, a wireless communication section 34, and a transmitting/receiving section 35. Note that ON/OFF of the power switch may start a system of a start block according to a system start signal transmitted from the smartphone 3 to the start block. In this way, the start signal may be transmitted from a block to an adjacent block to start all the blocks in order.

The control section 31 includes a CPU 36, a ROM 37, and a RAM 38.

The CPU 36 can read out computer programs stored in the ROM 37 and the memory 32, develop the computer programs in the RAM 38, and execute the computer programs. In the memory 32 or the ROM 37, an image display application program (FIG. 9) for causing the display system 1 to display an image is stored.

Further, in the memory 32 or the ROM 37, a display block information table TBL1 used in the image display application program is also stored.

FIG. 5 is a diagram showing an example of the display block information table TBL1 stored in the memory 32 or the ROM 37 of the smartphone 3. The display block information table TBL1 includes shape codes indicating shapes of the blocks 2, shape information corresponding to the shape codes, and pixel information.

Information concerning lengths of respective sides is registered for each of the shape codes. In FIG. 5, Rec, Squ, Tri, and Hex are the shape codes and respectively mean a rectangle, a square, a regular triangle, and a regular hexagon. For example, information indicating that, concerning the shape code (Rec) of the rectangle, a long side is 20 cm long and a short side is 15 cm long and, concerning the regular triangle (Tri), respective sides are 15 cm long is registered in the display block information table TBL1.

Further, pixel information of each of blocks is registered for each of the shape codes. For example, in the case of the rectangle (Rec), pixel information indicating that one long side has 1000 pixels, one short side has 750 pixels, the other long side has 1000 pixels, and the other short side has 750 pixels is registered in the display block information table TBL1.

The memory 32 connected to the CPU 36 is a nonvolatile memory such as a flash memory. The memory 32 is a memory having a relatively large capacity. As explained below, the memory 32 is capable of storing image data of still images or moving images.

The display device 33 is a display device having a touch panel. The user can give instructions for execution of various commands to the CPU 36 by touching a screen 3a of the display device 33.

The wireless communication section 34 is a circuit block for a telephone call and data communication and is a circuit for communication of the smartphone 3 with a telephone line and a communication line.

The transmitting/receiving section 35 is a transmitting/receiving section for near field communication (NFC) and is a circuit capable of communicating with the transmitting/receiving sections 22 of each of the blocks 2.

In the smartphone 3, when the image display application program is executed, a predetermined command, that is, a block arrangement search request command SC is transmitted to the block 2.

Figure 6:
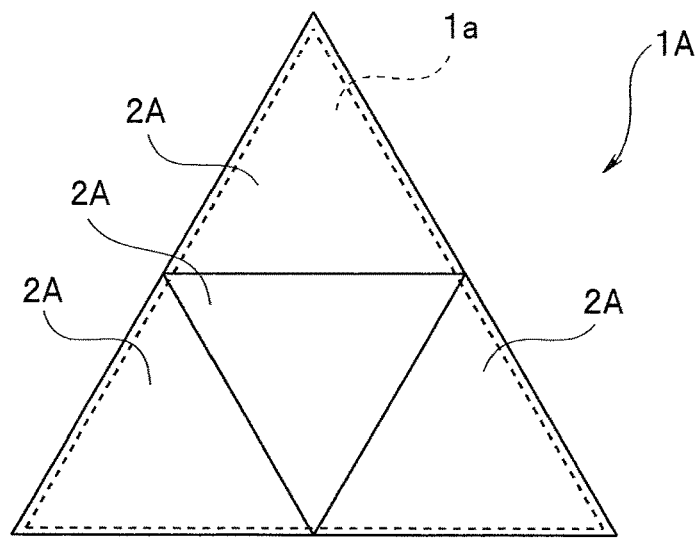
FIG. 6 is a diagram showing an example of a display system 1A including a block 2A having a regular triangular shape according to the embodiment.

FIG. 6 is a diagram showing an example of a display system 1A including blocks 2A having a regular triangular shape. The display system 1A shown in FIG. 6 includes the regular triangular display surface 1a formed by combining and connecting four blocks 2A having the regular triangular shape.

Figure 7:
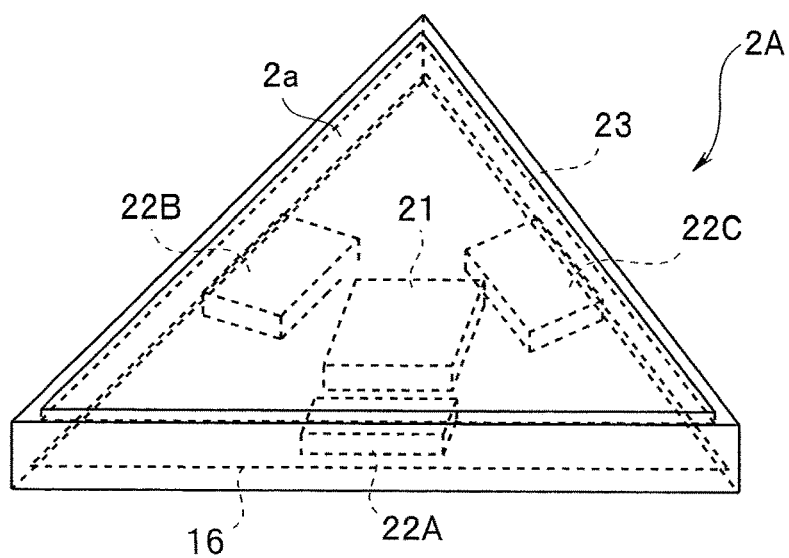
FIG. 7 is a perspective view of the block 2A according to the embodiment.

FIG. 7 is a perspective view of the block 2A. As shown in FIG. 7, the transmitting/receiving sections 22A, 22B, and 22C are disposed near three side surface sections corresponding to three sides of the triangular block 2A. Although not shown in the figure, the block 2A has a configuration same as the configuration shown in FIG. 3. The three transmitting/receiving sections 22A, 22B, and 22C are connected to the control section 21. The block 2A shown in FIGS. 6 and 7 is a display block corresponding to shape code (Tri) of the regular triangle shown in FIG. 5.

Note that, besides the rectangle, the square, the regular triangle, and the regular hexagon shown in FIG. 5, display blocks having various shapes such as an isosceles triangle and a regular pentagon may be provided. That is, in the display system, at least one of the plurality of blocks may include a display surface having a shape different from a shape of the other blocks.

In the display system of the embodiment, the blocks having the different shapes can also be coupled. The user can construct, using blocks having various shapes, a display system including a display surface having a desired shape.

(Action)

As explained above, the user can couple the plurality of blocks 2 to construct the display system 1 having any shape. The user can transmit data of an image, which the user desires to display, from the transmitting/receiving section 35 of the smartphone 3 to any one display block 2 of the display system 1 and cause the display system 1 to display the image on the display surface 1a.

Figure 8:
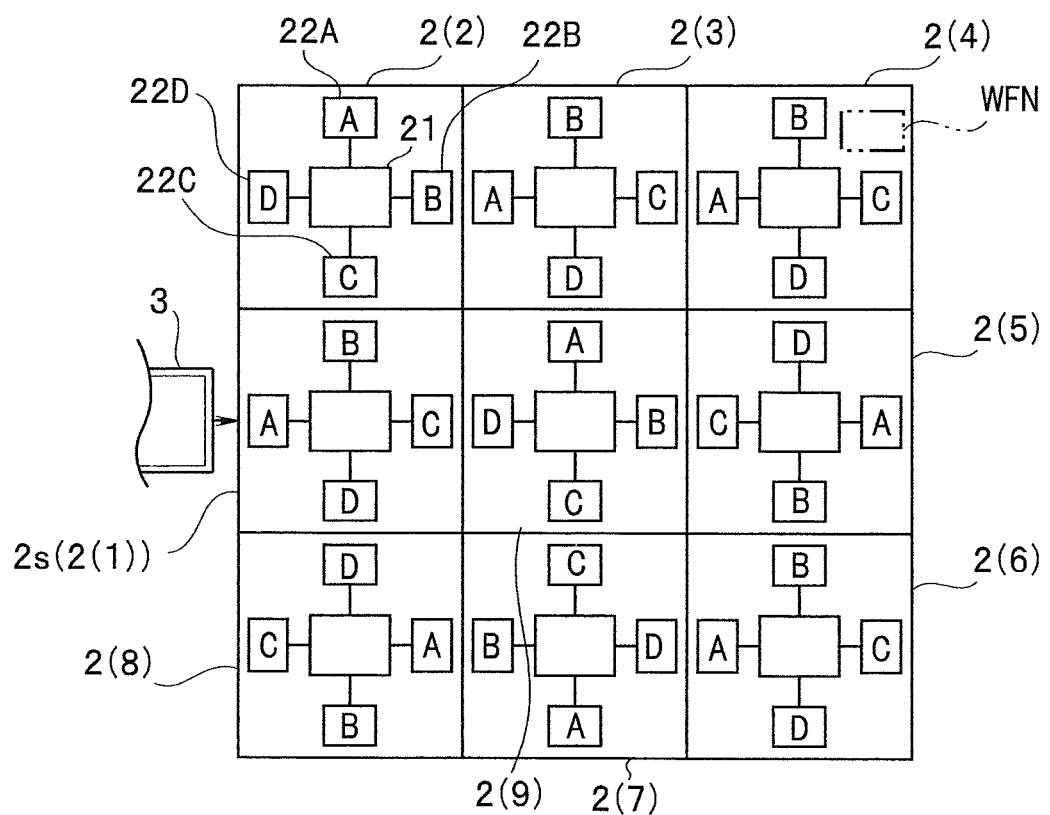
FIG. 8 is a configuration diagram of the display system 1 in which nine blocks 2 are connected to form a display surface 1a in a square according to the embodiment.

FIG. 8 is a configuration diagram of the display system 1 in which nine blocks 2 are connected to form the display surface 1a in a square. In FIG. 8, each of the blocks 2 is a square. The nine blocks 2 are shown as 2(1), 2(2), 2(3), 2(4), 2(5), 2(6), 2(7), 2(8), and 2(9) to be distinguished from one another in the following explanation. In FIG. 8, positions of the respective transmitting/receiving sections 22A to 22D corresponding to the sides A to D of each of the blocks 2 are indicated by positions of signs A to D.

Action of the smartphone 3 and the display system 1 is explained below with reference to a configuration of the display system 1 in FIG. 8 as an example.

(Operation in the Smartphone 3)

Figure 9:
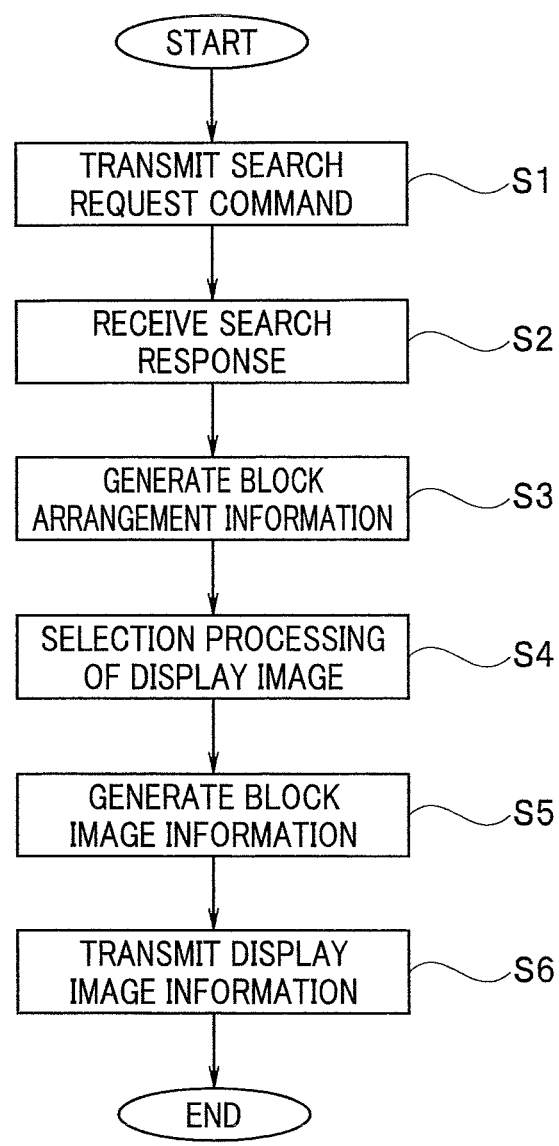
FIG. 9 is a flowchart for explaining an example of a flow of processing of an image display application program executed in the smartphone 3 according to the embodiment.

FIG. 9 is a flowchart for explaining an example of a flow of processing of the image display application program executed in the smartphone 3.

Note that, in order to cause the display system 1 to display an image, the user turns on a power supply of each of the blocks 2 configuring the display system 1.

The processing in FIG. 9 is executed when the user starts the image display application program in the smartphone 3. The image display application program is a computer program for causing the display system 1 to display a desired image. When the image display application program is executed, various command buttons are displayed on the screen 3a of the smartphone 3. The user can cause the smartphone 3 to execute various kinds of processing by touching desired command buttons among a plurality of command buttons displayed on the screen 3a.

When the user touches a displayed arrangement search command transmission button, the processing in FIG. 9 is executed. The CPU 36 transmits a block arrangement search request command (hereinafter referred to as search request command) SC (step (hereinafter abbreviated as S) 1). More specifically, the user brings the smartphone 3 close to any block 2 in the display system 1, touches the arrangement search request command transmission button on the screen 3a, and causes the smartphone 3 to execute transmission processing of the search request command SC. In the case of FIG. 8, the smartphone 3 is brought close to the block 2(1) and the search request command SC is transmitted. The search request command SC is transmitted from the transmitting/receiving section 35. That is, the smartphone 3 is a transmitting apparatus that transmits the search request command SC, which is predetermined information, to one of the plurality of blocks 2, which are respectively display apparatuses.

In the case of FIG. 8, the search request command SC is received by the transmitting/receiving section 22A closest to the smartphone 3 among the transmitting/receiving sections 22A to 22D of the block 2(1) in a left side center. The search request command SC is a command for causing the block 2(1) to execute search request/response command processing (FIGS. 13 to 18) in order to acquire arrangement information of the plurality of blocks 2 configuring the display system 1, that is, block arrangement information.

The search request command SC is received by one transmitting/receiving section 22 of the block 2(1), in the case of FIG. 8, the transmitting/receiving section 22A of the block 2(1) from the smartphone 3 through near field communication (NFC).

A route information string PIS is added to the search request command SC as explained below. However, the route information string PIS is not added to the search request command SC transmitted from the smartphone 3 first in S1. That is, in S1, the search request command SC not including the route information string PIS is transmitted.

The block 2(1) (hereinafter referred to as start block 2s as well), which receives the search request command SC not including the route information string PIS, executes the search request/response command processing for obtaining coupled state information of the plurality of blocks 2 configuring the display system 1. Note that as explained below, the search request/response command processing is executed in each of the blocks 2 including the start block 2s. The search request/response command processing is explained below (FIGS. 13 to 18).

After the transmission of the search request command SC, the CPU 36 receives a block arrangement search response (hereinafter referred to as search response) RC including coupled state information among the plurality (nine, here) of blocks 2 configuring the display system 1 from the start block 2s (S2). The route information string PIS indicating the coupled state information among the blocks 2 is included in the search request command SC and the search response RC transmitted and received among the blocks 2.

The search response RC is the search request command SC returned in response to the transmitted search request command SC. Therefore, as explained below, the CPU 36 can obtain, from the route information string PIS included in the search response RC received from the start block 2s, block arrangement information configured from all the blocks 2 configuring the display system 1.

Figure 30:
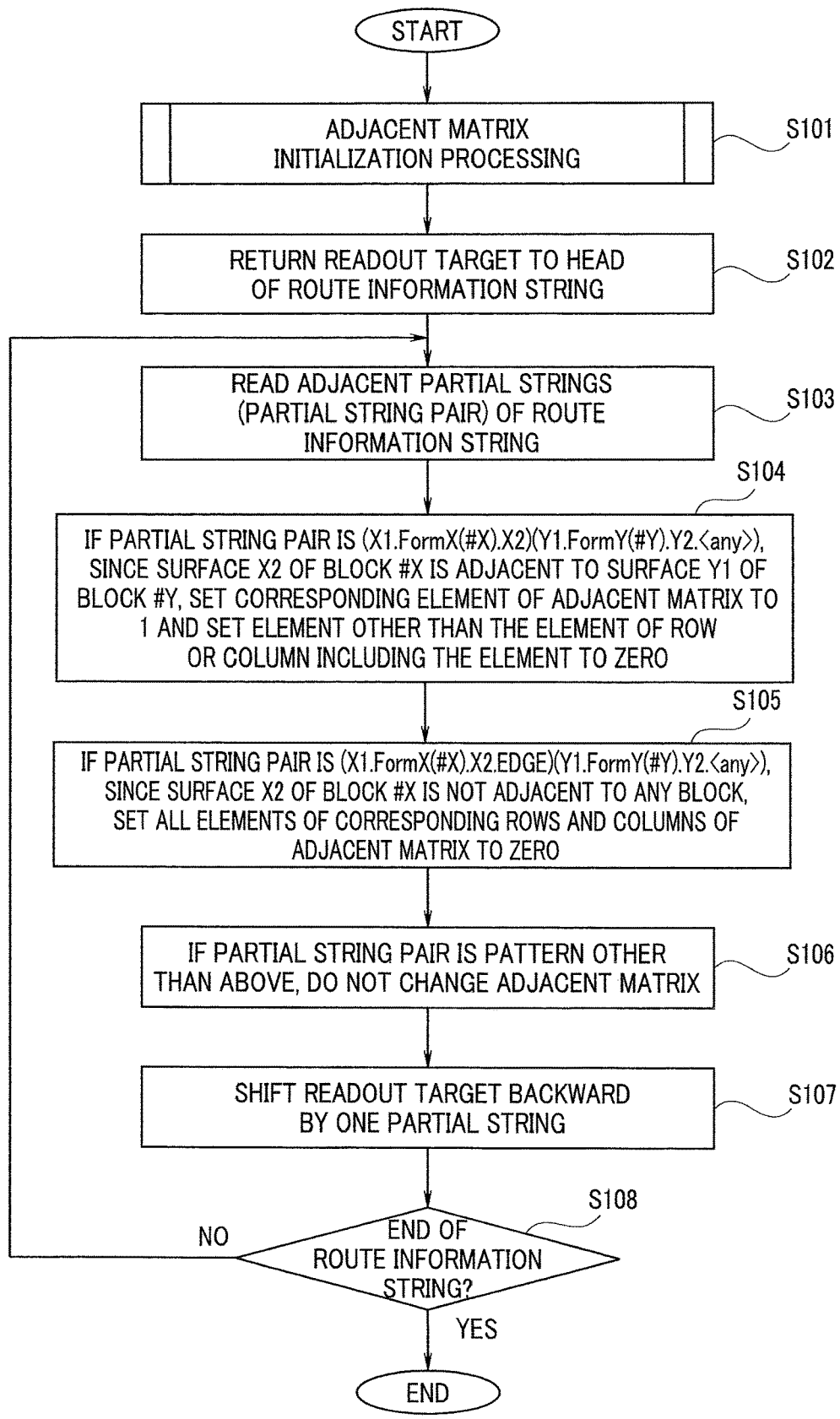
FIG. 30 is a flowchart for explaining an example of a flow of adjacent matrix creation processing for generating block arrangement information in S3 according to the embodiment.
Figure 31:
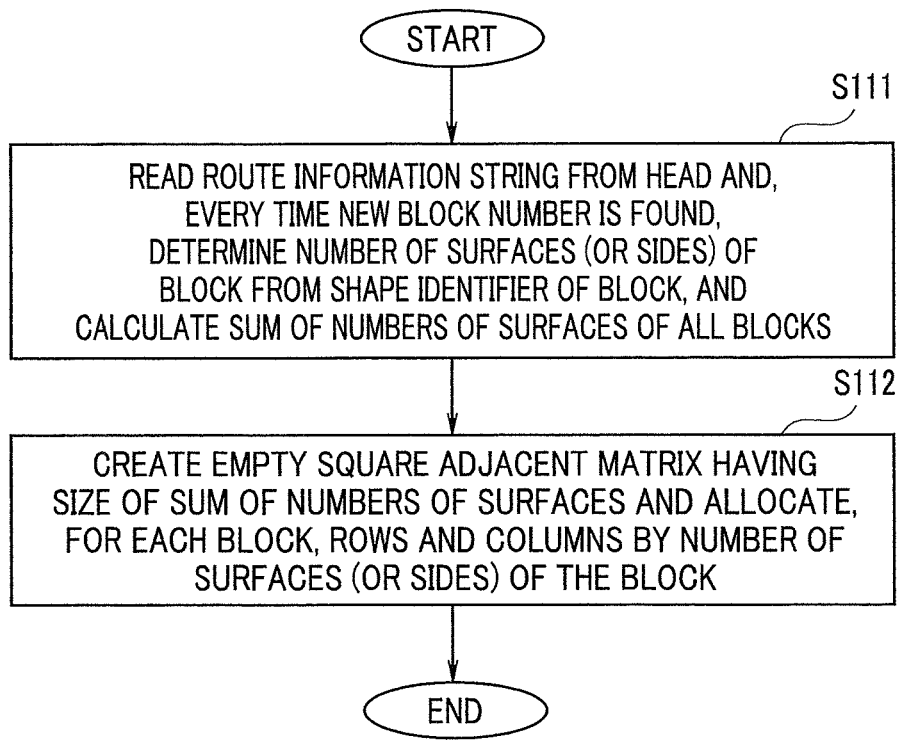
FIG. 31 is a flowchart for explaining an example of a flow of adjacent matrix initialization processing according to the embodiment.

The CPU 36 creates an adjacent matrix through adjacent matrix creation processing on the basis of the route information string PIS included in the received search response RC and the display block information table TBL1 and generates block arrangement information of the display system 1 (S3). The adjacent matrix creation processing in S3 is explained below (FIGS. 30 and 31).

The block arrangement information includes information concerning an overall shape and a size of the display surface 1a of the display system 1 and a shape and a size (including the number of pixels) of respective display regions of the plurality of blocks 2 configuring the display surface 1a.

Note that, at this point, the information concerning the shape and the size of the display surface 1a of the display system 1 may be displayed on the screen 3a of the smartphone 3.

The CPU 36 executes selection processing of a display image (S4).

When the user instructs transmission processing of the search request command SC, the CPU 36 acquires the route information string PIS from the start block 2s after a predetermined time period. Therefore, the CPU 36 displays, on the screen 3a of the smartphone 3, for example, a message indicating that the generation of the block arrangement information indicating the coupled state of the plurality of blocks is completed or a message for urging selection of an image to be displayed.

In response to a result of the display, the user can select or designate, out of images stored in the memory 32 of the smartphone 3, an image that the user desires to cause the display system 1 to display (hereinafter referred to as display image) (S4).

Note that the selection or the designation of the image is performed after S3. However, the user may select in advance, before the execution of the processing in FIG. 9, the selection or the designation of the image to be displayed on the display system 1.

When the display image is selected and determined, the CPU 36 generates, on the basis of the block arrangement information generated in S3, image information of each of the blocks (hereinafter referred to as block image information) from the selected display image (S5).

The block image information is display image data of each of the blocks and is image information of a display image that CPU 36 causes each of the blocks 2 to display in order to cause the display system 1 to display the display image on the display surface 1a.

The CPU 36 transmits display image information including a generated plurality of pieces of block image information to the start block 2s in association with information concerning an own block number (explained below) temporarily generated in each of the blocks 2 (S6). That is, the block image information of each of the blocks 2 is generated. Each of pieces of block image information is transmitted together with the information concerning the own block number.

As explained below, when receiving the display image information, the start block 2s determines on the basis of the block number simultaneously transmitted whether the block image information included in the display image information is a block image to be displayed by the start block 2s. When the block image information is addressed to the start block 2s, the start block 2s outputs the block image information to the display device 23 and displays the block image information. When the block image information is not addressed to the start block 2s, the start block 2s transfers the received display image information to another adjacent block 2.

Each of the blocks 2 acquires, on the basis of the information concerning the own block number, block image information concerning an image to be displayed by the block 2 and displays the image on the display surface 2a. As a result, the image selected by the user is displayed on the display surface 1a of the display system 1. Note that image information addressed to the block 2 and image information of the other blocks may be temporarily stored in the RAM 26 or the memory 27. If images other than an image addressed to the block 2 are displayed, for example, the display system 1 can be used for a jigsaw puzzle and the like.

(Processing in Each of the Blocks)

Before explaining processing in each of the blocks, the state information table TBL2 generated in the RAM 26 of each of the blocks 2 is explained.

FIG. 10 is a diagram showing a state during initialization of the state information table TBL2 of the block 2. The state information table TBL2 is a table generated during initialization of the block 2. In the state information table TBL2, information concerning a search state and an adjacent number can be stored concerning a block type, an own block number, and respective sides.

In a column of the search state of the block type, a shape code of a block is stored. In a column of the search state of the own block number, a number of the block, that is, a block number is stored. The shape code of the block and the number of the block are respectively stored in the column of the search state of the block type and the column of the search state of the own block number. However, the shape code of the block and the number of the block may be stored in other columns or other tables.

In columns of the search state of the respective sides, search state information is stored.

In columns of the adjacent number of the respective sides, numbers of adjacent blocks are stored.

Note that, in FIG. 10, "N.A." is an abbreviation of "NOT APPLICABLE".

When the power supply is turned on, each of the blocks 2 executes the initialization processing, generates the state information table TBL2, and initializes content of the state information table TBL2.

FIG. 11 is a diagram showing values of state variables that a search state and an adjacent number written in the state information table TBL2 can take.

An initial value of the search state is "NULL". The search state is any one of "START", "IN", and "SEARCH" during a search. A search end value of the search state is any one of "END", "IN_END", "SEARCH_END", "EDGE", and "DUP".

An initial value and a value during a search of the adjacent number are "0". A search end value of the adjacent number is any one of "0" to "N". N is an integer.

Figure 12:
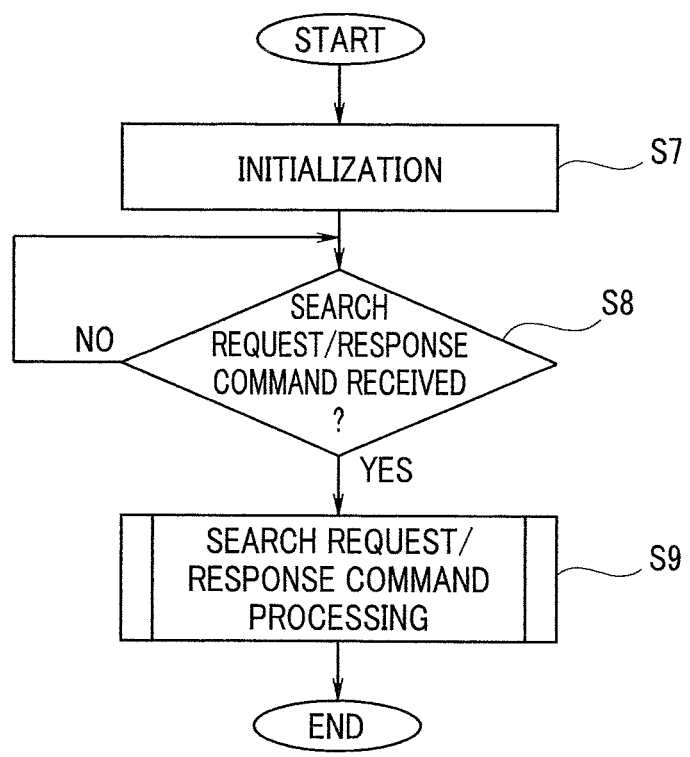
FIG. 12 is a flowchart for explaining an example of a flow of processing executed when a power supply of each of blocks 2 is turned on according to the embodiment.

FIG. 12 is a flowchart for explaining an example of a flow of processing executed when the power supply of each of the blocks 2 is turned on.

When the power supply of each of the blocks 2 is turned on, the CPU 24 reads out a predetermined initialization program from the ROM 25 and executes initialization of the respective circuits in the block 2 (S7).

During the initialization, the CPU 24 of each of the blocks 2 generates the state information table TBL2 shown in FIG. 10 and stores the state information table TBL2 in the RAM 26.

The CPU 24 reads out a shape code indicating a shape of the block stored in the ROM 25 and stores the shape code in the column of the search state of the item of the block type of the state information table TBL2. Further, the CPU 24 generates, according to the block type, the items of the states corresponding to the respective sides and stores "NULL" in the columns of the search state. The CPU 24 stores "0" in other columns of the other items.

Therefore, as shown in FIG. 10, during the initialization of the state information table TBL2 of each of the blocks 2, "SQU" corresponding to the shape code is written in the column of the search state of the block type. Items of states of the side A to the side D of the square corresponding to the four transmitting/receiving sections 22A to 22D are generated. "NULL" is written in the columns of the search item of the respective states.

When the initialization ends, the CPU 24 determines whether the search request command SC or the search response RC is received (S8). The search response RC is a command returned in response to the transmitted search request command SC. The search response RC has a configuration same as the configuration of the search request command SC.

If the search request command SC or the search response RC is not received (NO in S8), the CPU 24 performs no processing. When the search request command SC and the search response RC are received (YES in S8), the CPU 24 reads out a computer program for the search request/response command processing, which is a processing program for the search request command SC and the search response RC, from the ROM 25 and executes the computer program (S9).

(Search Request/Response Command Processing in Each of the Blocks 2)

FIGS. 13 to 18 are flowcharts for explaining an example of a flow of the search request/response command processing in S3 in each of the blocks 2.

When the block 2 receives the search request command SC or the search response RC, the CPU 24 stores, in the RAM 26, an indication that a transmitting/receiving section that receives the search request command SC or the search response RC is an input transmitting/receiving section (S11). In the block 2(1) that receives the search request command SC, the transmitting/receiving section 22A is the input transmitting/receiving section.

The CPU 24 determines whether the received command is the search request command SC or the search response RC or whether a timeout signal of a set timer explained below is generated (S12).

In S12, no processing is performed until the search request command SC or the search response RC is received or until the set timer times out.

When the received command is the search request command SC, the CPU 24 determines whether the own block number in the state information table TBL2 is "0" (S13). Immediately after the initialization, the own block number in the state information table TBL2 of each of the blocks 2 is "0".

When the own block number is "0" (YES in S13), the CPU 24 sets, as the own block number, a number obtained by adding 1 to a largest block number included in the route information string PIS and sets the search state of the input transmitting/receiving section to START when the own block number is 1 and otherwise sets the search state to IN (S14). Therefore, the processing in S14 configures an identification-information generating section that generates the own block number, which is the identification information of the own block, on the basis of information included in the received search request command SC.

In the case of the display system 1 shown in FIG. 8, the smartphone 3 transmits the search request command SC in S1. The block 2(1) of the display system 1 receives the search request command SC in the transmitting/receiving section 22A. According to the initialization, the own block number in the state information table TBL2 of the block 2(1) is "0".

Since the own block number is "0" (YES in S13), the CPU 24 of the block 2(1) writes, in the column of the own block number in the state information table TBL2, a number obtained by incrementing the largest block number included in the route information string PIS by 1 (S14).

As explained above, the empty route information string PIS is added to the search request command SC transmitted in S1 in FIG. 9.

Therefore, the CPU 24 of the block 2(1) writes "1" in the column of the own block number in the state information table TBL2 and writes "START" in the column of the search state of the transmitting/receiving section 22A corresponding to the input transmitting/receiving section.

Figure 19:
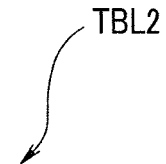
FIG. 19 a diagram showing a state of the state information table TBL2 after a block 2(1) receives, in a transmitting/receiving section 22A, a search request command SC from the smartphone 3 and executes processing in S14 according to the embodiment.

FIG. 19 is a diagram showing a state of the state information table TBL2 after the block 2(1) receives, in the transmitting/receiving section 22A, the search request command SC from the smartphone 3 and executes the processing in S14.

Note that, in the case of the block 2(1), the search request command SC is received from the smartphone 3. Therefore, the adjacent number of the transmitting/receiving section 22A, which is the input transmitting/receiving section, is "0" as shown in FIG. 19. However, when the search request command SC is received from another block 2, the CPU 24 of each of the blocks 2 extracts a block number of the block 2, which transmits the search request command SC, from route information PI at an end of the route information string PIS and writes the block number in the column of the adjacent number of the input transmitting/receiving section.

Subsequently, the CPU 24 searches for a transmitting/receiving section whose search state is NULL in a predetermined order. If a transmitting/receiving section whose search state is NULL is present, the CPU 24 sets the transmitting/receiving section as an output transmitting/receiving section and sets the search state of the output transmitting/receiving section to SEARCH (S15). Note that, if there is only one transmitting/receiving section, there is no transmitting/receiving section whose search state is "NULL".

The predetermined order is determined in advance in each of the blocks. The predetermined order is determined as cyclical order like order of the transmitting/receiving sections 22A, 22B, 22C, 22D, 22A, 22B, . . .

The search state is "NULL" in the transmitting/receiving sections 22B, 22C, and 22D other than the transmitting/receiving section 22A. Therefore, the CPU 24 of the block 2(1) sets the transmitting/receiving section 22B as the output transmitting/receiving section first according to the predetermined order and sets the search state of the transmitting/receiving section 22B to "SEARCH".

Figure 20:
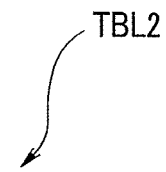
FIG. 20 is a diagram showing a state of the state information table TBL2 at time when a transmitting/receiving section 22B is set as an output transmitting/receiving section first by execution of processing in S15 in the block 2(1) according to the embodiment.

FIG. 20 is a diagram showing a state of the state information table TBL2 at time when the transmitting/receiving section 22B is set as the output transmitting/receiving section first according to the execution of the processing in S15.

After S15, the CPU 24 of the block 2(1) determines whether a transmitting/receiving section whose search state is "NULL" is present in S15 (S16). S16 is processing for determining whether all the transmitting/receiving sections are checked.

When a transmitting/receiving section whose search state is "NULL" is present (YES in S16), the CPU 24 of the block 2(1) adds the route information PI to the end of the route information string PIS and generates a new route information string PIS (S17).

The route information PI is explained. The route information PI includes (input transmitting/receiving section identifier. shape identifier (own block number). output transmitting/receiving section identifier).

After S17, the CPU 24 of the block 2(1) transmits, from the output transmitting/receiving section, the search request command SC with the route information string PIS attached (S18).

For example, in the case explained above, the search state of the transmitting/receiving section 22B of the block 2(1) is "NULL". Therefore, the CPU 24 of the block 2(1) transmits the search request command SC with the route information string PIS attached from the transmitting/receiving section 22B, which is the output transmitting/receiving section. The route information string PIS at this point is as described below.

(A.Squ(1).B) . . . String 1

As explained above, the route information PI is empty in the search request command SC from the smartphone 3. Therefore, the route information string PIS included in the search request command SC transmitted from the transmitting/receiving section 22B in S18 is the string 1.

After S18, the CPU 24 of the block 2(1) sets a timer concerning a search request such as a software timer (S19). The processing returns to S12.

The transmitting/receiving section 22B of the block 2(1) shown in FIG. 8 functions as the output transmitting/receiving section. The CPU 24 of the block 2(1) outputs the search request command SC generated in S17 to the block 2(2).

The CPU 24 of the block 2(1) returns to the processing in S12. However, since the communication response signal is received from the block 2(2), the set timer is released. As a result, the timeout signal is not output from the timer.

In the case of FIG. 8, the block 2(2) receives, in the transmitting/receiving section 22C, the search request command SC from the transmitting/receiving section 22B of the block 2(1). The CPU 24 of the block 2(2) starts the execution of the processing in FIG. 13 according to the reception of the received search request command SC.

The CPU 24 of the block 2(2) executes the processing in S11 to S19 explained above. As a result, the state information table TBL2 is generated in the RAM 26 of the block 2(2). In S14, since the largest block number in the route information string PIS included in the search request command SC is "1", the CPU 24 of the block 2(2) sets the own block number to "2" and sets the state C concerning the transmitting/receiving section 22C, which is the input transmitting/receiving section, as "IN".

Further, in S15, the CPU 24 of the block 2(2) sets the transmitting/receiving section 22D as the output transmitting/receiving section, sets the search state of the state D corresponding to the transmitting/receiving section 22D to "SEARCH" (S15), and executes S16 to S19.

Figure 15:
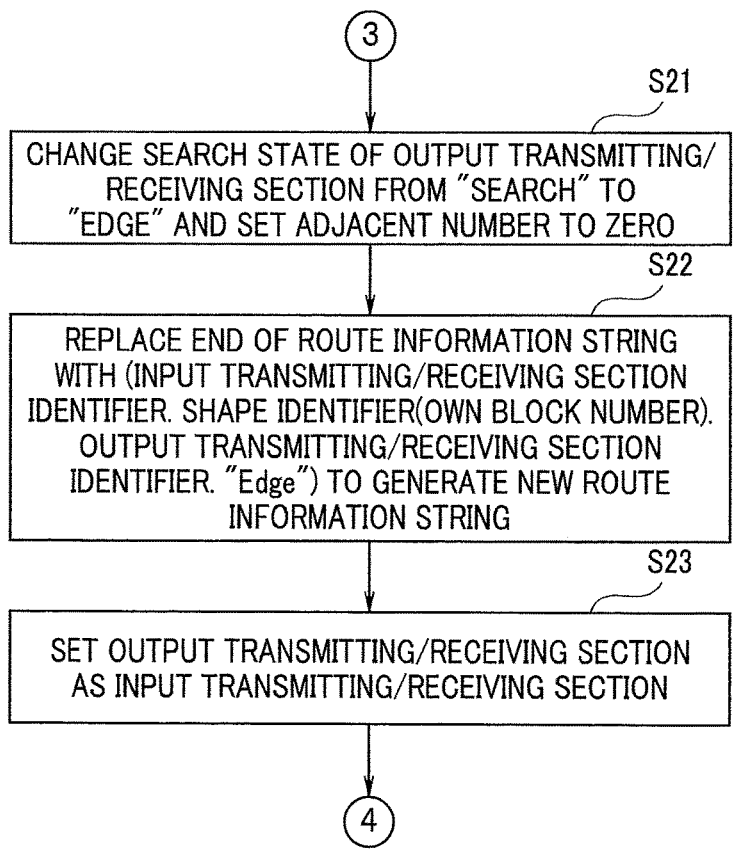
FIG. 15 is a flowchart for explaining the example of the flow of the search request/response command processing in S3 in each of the blocks 2 according to the embodiment.

As shown in FIG. 8, a coupled block is absent on the side D of the transmitting/receiving section 22D of the block 2(2). Therefore, in S12, the CPU 24 of the block 2(2) detects, that is, receives the timeout signal of the timer set in S19. As shown in FIG. 15, the CPU 24 of the block 2(2) changes the search state of the transmitting/receiving section 22D, which is the output transmitting/receiving section, from "SEARCH" to "EDGE" and sets the adjacent number to "0" (zero) (S21).

That is, the control section 21 determines presence or absence of the other blocks 2 on the respective surfaces on the basis of whether a predetermined signal (the communication response signal) is received within a predetermined time period set in the timer according to the transmission of the search request command SC.

The CPU 24 of the block 2(2) replaces the end of the route information string PIS with (input transmitting/receiving section identifier. shape identifier (own block number). output transmitting/receiving section identifier. "Edge") and changes the route information string PIS to a new route information string PIS (S22). The new route information string PIS is as described below.

(A.Squ(1).B)(C.Squ(2).D.Edge) . . . String 2

The CPU 24 of the block 2(2) sets the output transmitting/receiving section as the input transmitting/receiving section (S23). In the case explained above, the transmitting/receiving section 22D of the block 2(2) is set as the input transmitting/receiving section.

Thereafter, the processing shifts to S15. The CPU 24 of the block 2(2) sets the transmitting/receiving section 22A as the output transmitting/receiving section according to the predetermined order, sets the search state of the state A corresponding to the transmitting/receiving section 22A to "SEARCH", and executes S16 to S19.

As shown in FIG. 8, as in the transmitting/receiving section 22D, a coupled block is absent on the side A of the transmitting/receiving section 22A of the block 2(2). Therefore, the CPU 24 of the block 2(2) executes the processing in S21 to S23.

The CPU 24 of the block 2(2) sets the transmitting/receiving section 22B as the output transmitting/receiving section according to the predetermined order, sets the search state of the state B corresponding to the transmitting/receiving section 22B to "SEARCH" (S15), and executes S16 to S19. The block 2(3) is present on the side B of the transmitting/receiving section 22B of the block 2(2). Therefore, since the communication response signal is received from the transmitting/receiving section 22A of the block 2(3), the timer is released.

At this point, the route information string PIS included in the search request command SC transmitted from the block 2(2) to the block 2(3) is as described below.

(A.Squ(1).B)(C.Squ(2).D.Edge)(D.Squ(2).A.Edge)(A.Squ(2).B) . . . String 3

That is, the route information string PIS included in the search request command SC increases with the route information PI added to the received route information string PIS.

Thereafter, similarly, in the case of the display system 1 shown in FIG. 8, the respective blocks 2 execute the same processing, whereby the search request command SC with the route information string PIS attached is transmitted in order of, starting from the block 2(2), the block 2(3), the block 2(4), the block 2(5), the block 2(6), the block 2(7), and the block 2(8).

The CPU 24 of the block 2(8) receives the search request command SC in the transmitting/receiving section 22A. Thereafter, since a coupled block is absent on the side B and the side C, the CPU 24 of the block 2(8) transmits the search request command SC from the transmitting/receiving section 22A to the block 2(1).

Figure 16:
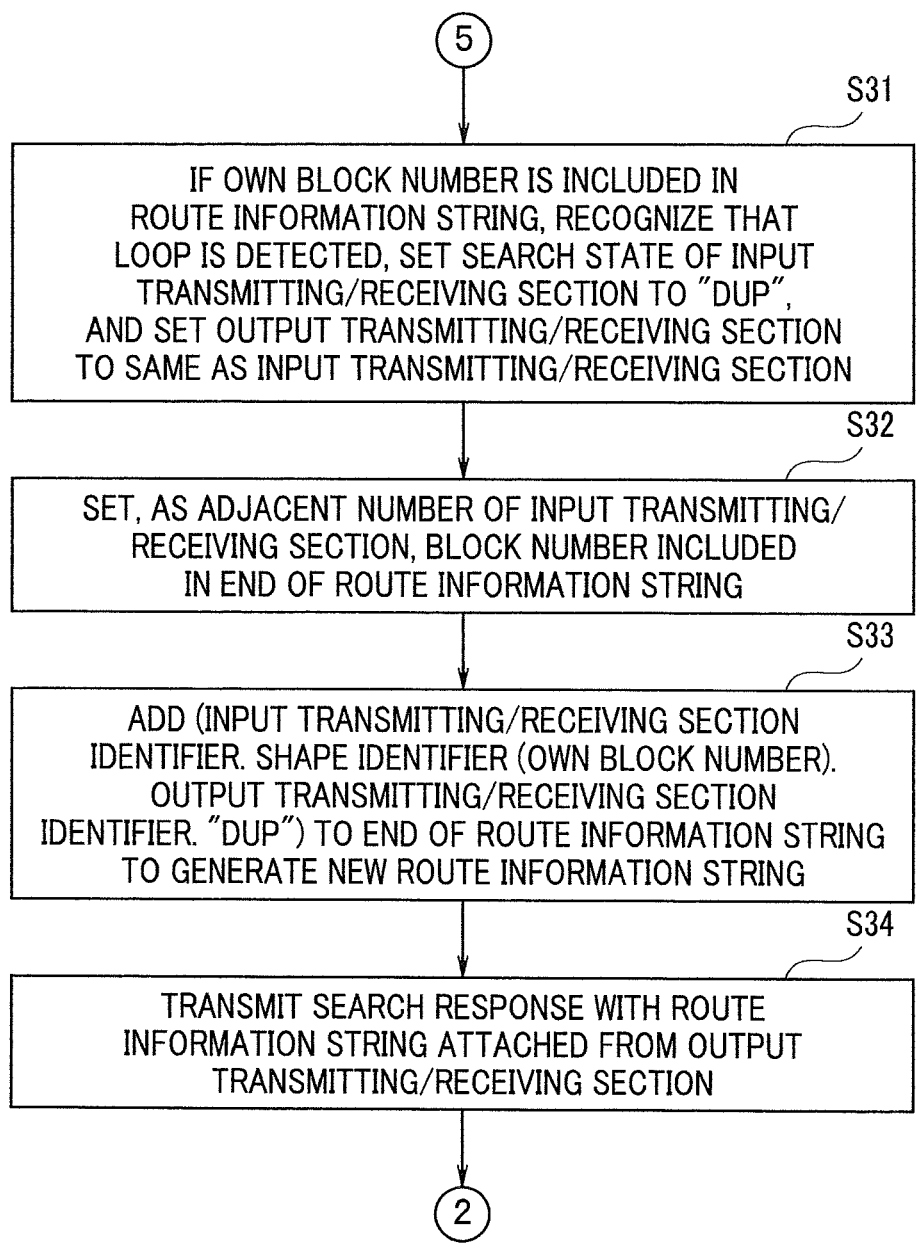
FIG. 16 is a flowchart for explaining the example of the flow of the search request/response command processing in S3 in each of the blocks 2 according to the embodiment.

When receiving the search request command SC from the block 2(8), since the own block number is not "0" (NO in S13), as shown in FIG. 16, if the own block number is included in the route information string PIS, the CPU 24 of the block 2(1) recognizes that a loop is detected, sets the search state of the transmitting/receiving section 22D, which is the input transmitting/receiving section, to "DUP" (an abbreviation of "duplication"), and sets the output transmitting/receiving section the same as the input transmitting/receiving section (S31). The loop means that the transmitted search request command SC returns to the own block 2. The output transmitting/receiving section is set the same as the input transmitting/receiving section in order to return the search request command SC to the block 2, which transmits the search request command SC, by setting the received search request command SC as a search response.

The CPU 24 of the block 2(1) sets, as the adjacent number of the input transmitting/receiving section, a block number included in the end of the route information string PIS (S32).

Further, the CPU 24 of the block 2(1) adds (input transmitting/receiving section identifier. shape identifier (own block number). output transmitting/receiving section identifier. DUP) to the end of the route information string PIS and changes the route information string PIS to a new route information string PIS (S33).

The CPU 24 of the block 2(1) transmits the search request command SC with the route information string PIS attached from the output transmitting/receiving section as the search response RC (S34).

Figure 21:
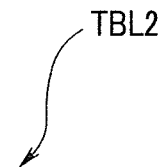
FIG. 21 is a diagram showing a state of the state information table TBL2 in the block 2(1) that transmits a search response RC to a block (8) according to the embodiment.

FIG. 21 is a diagram showing a state of the state information table TBL2 in the block 2(1) that transmits the search response RC to the block 2(8). As shown in FIG. 21, the search state of the side D of the state information table TBL2 in the block 2(1) at this point is "DUP". The adjacent number of the side D is "8".

Figure 22:
FIG. 22 is a diagram showing a route information string PIS included in the search response RC that the block (1) transmits to the block (8) according to the embodiment.

FIG. 22 is a diagram showing the route information string PIS included in the search response RC that the block 2(1) transmits to the block 2(8). The search response RC transmitted from the block 2(1) to the block 2(8) is a command having a configuration same as the configuration of the search request command SC including the route information string PIS shown in FIG. 22. As shown in FIG. 22, the search request command SC transmitted from the start block 2s, that is, the block 2(1) increases with the route information PI added during search and transfer.

After S34, the processing by the CPU 24 of the block 2(1) shifts to S12.

Figure 13:
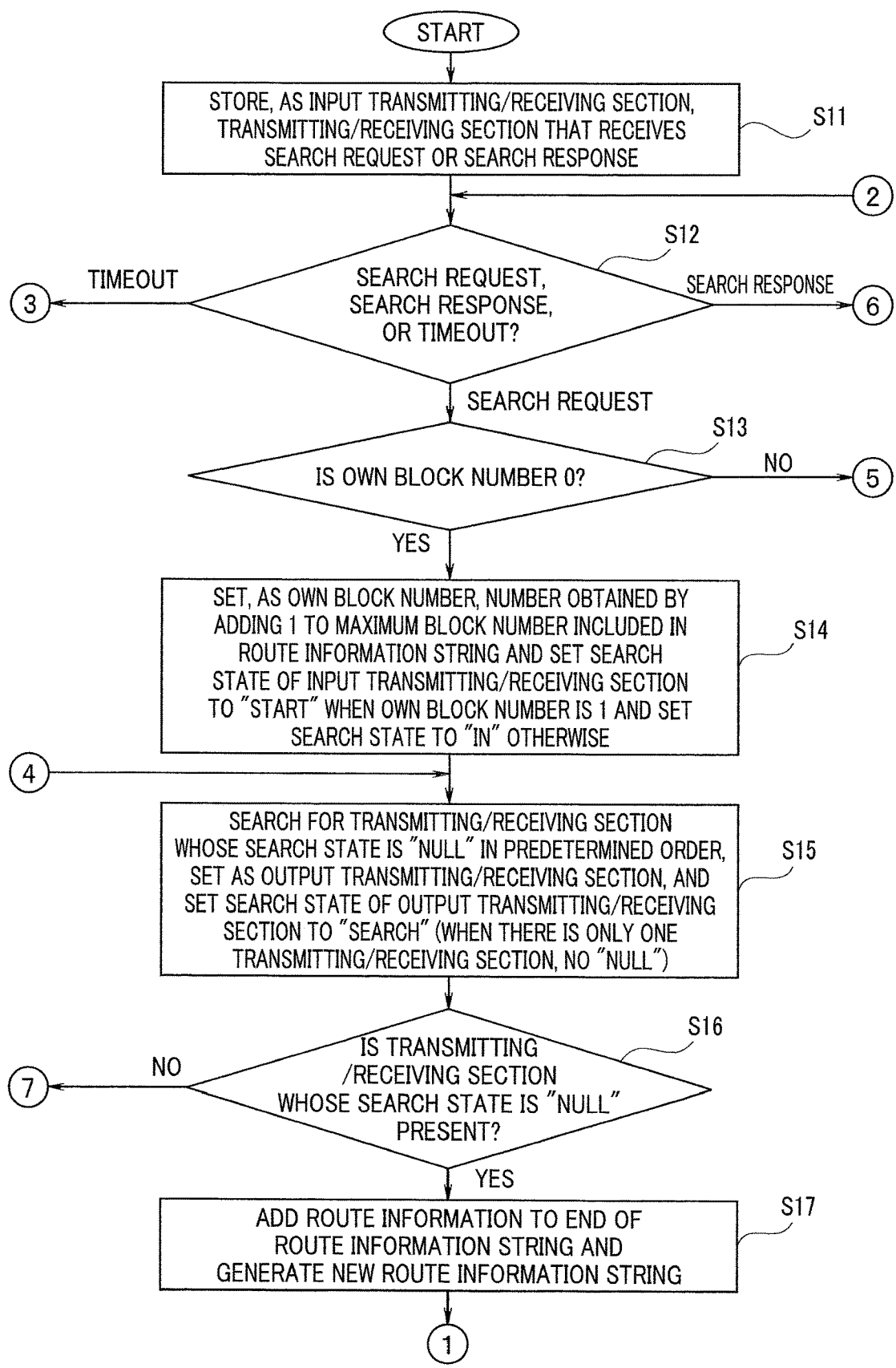
FIG. 13 is a flowchart for explaining an example of a flow of search request/response command processing in S3 in each of the blocks 2 according to the embodiment.
Figure 14:
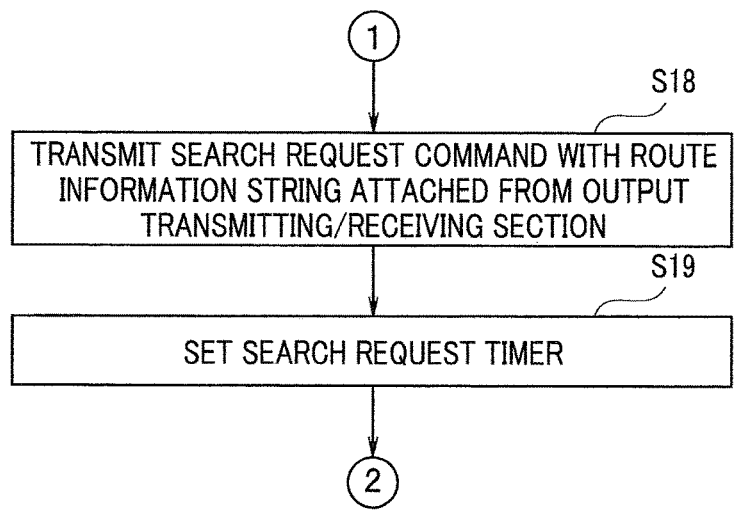
FIG. 14 is a flowchart for explaining the example of the flow of the search request/response command processing in S3 in each of the blocks 2 according to the embodiment.
Figure 17:
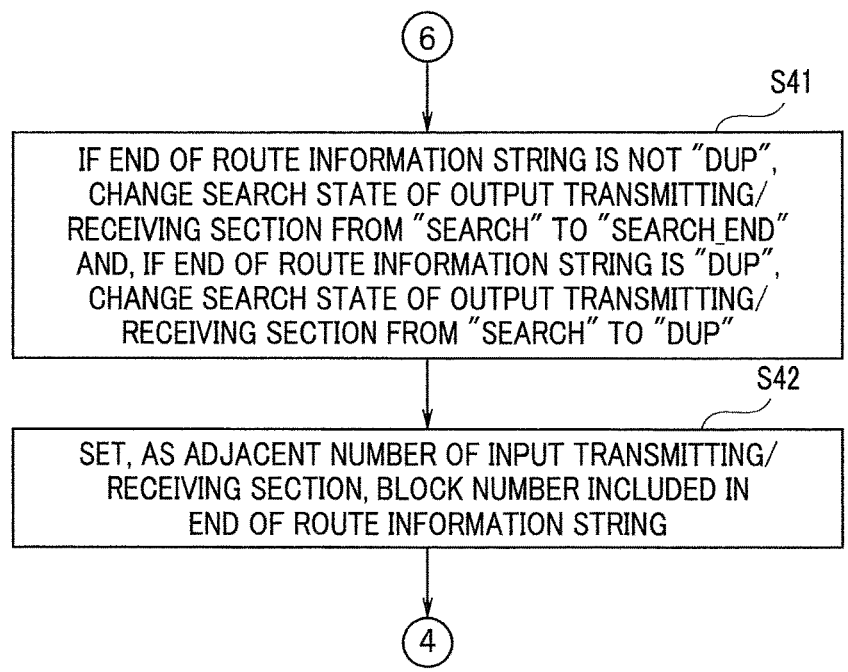
FIG. 17 is a flowchart for explaining the example of the flow of the search request/response command processing in S3 in each of the blocks 2 according to the embodiment.

When receiving the search response RC from the block 2(1), the CPU 24 of the block 2(8) shifts from S12 in FIG. 13 to processing in FIG. 17. If the end of the route information string PIS included in the received search response RC is not "DUP", the CPU 24 of the block 2(8) changes the search state of the output transmitting/receiving section from "SEARCH" to "SEARCH_END". If the end of the route information string PIS is "DUP", the CPU 24 of the block 2(8) changes the search state of the output transmitting/receiving section from "SEARCH" to "DUP" (S41).

The CPU 24 of the block 2(8) sets, as the adjacent number of the input transmitting/receiving section, a block number included in the end of the route information string PIS (S42). The processing shifts to S15. Therefore, although not shown in the figure, the search state of the side D changes to "DUP" and the adjacent number of the side D changes to "1" in the state information table TBL2 of the block 2(8).

Thereafter, the CPU 24 of the block 2(8) executes the processing in S15 in FIG. 13 and determines whether a transmitting/receiving section whose search state is "NULL" is present (S16). In the case of FIG. 8, there is no transmitting/receiving section whose search state is "NULL" (NO in S16). Therefore, the CPU 24 of the block 2(8) executes processing in FIG. 18, changes the search state of a transmitting/receiving section whose search state is "START" or "IN", to "END" or "IN_END", and sets the transmitting/receiving section as the output transmitting/receiving section (S51).

Further, the CPU 24 of the block 2(8) adds (input transmitting/receiving section identifier. shape identifier (own block number). output transmitting/receiving section identifier. RETURN) to the end of the route information string PIS and changes the route information string PIS to a new route information string PIS (S52).

The CPU 24 of the block 2(8) transmits the search request command SC including the route information string PIS from the output transmitting/receiving section as the search response RC (S53) and ends the processing.

FIG. 23 is a diagram showing a state of the state information table TBL2 of the block 2(8) at the time when the block 2(8) transmits the search response RC to the block 2(7). As shown in FIG. 23, in the state information table TBL2 in the block 2(8), the search states of the sides, A, B, C, and D are respectively "IN_END", "EDGE", "EDGE", and "DUP". The adjacent numbers of the sides A, B, C, and D are respectively "7", "0", "0", and "1".

Therefore, the CPU 24 of the block 2(8) transmits, according to an end of the search of the transmitting/receiving section 22D, the search request command SC from the transmitting/receiving section 22A to the block 2(7) (S53).

The block 2(7), which receives the search request command SC from the block 2(8), transmits the search request command SC from the transmitting/receiving section 22C whose search state is "NULL" to the block 2(9) (S18) and sets a timer (S19).

The CPU 24 of the block 2(9), which receives the search request command SC from the block 2(7), transmits the search request command SC from the transmitting/receiving section 22D according to the predetermined order (S18). The coupled block 2(1) is present on the side D of the transmitting/receiving section 22D of the block 2(9). Therefore, "DUP" is included in the end of the route information string PIS received from the block 2(1) (S33). Therefore, the CPU 24 of the block 2(9) sets the search state of the side D corresponding to the transmitting/receiving section 22D to "DUP" (S31) and sets the adjacent number of the transmitting/receiving section 22D to "1" (S32).

Thereafter, similarly, the CPU 24 of the block 2(9) transmits the search request command SC from the transmitting/receiving section 22A according to the predetermined order. "DUP" is included in the end of the route information string PIS received from the block 2(3). Therefore, the CPU 24 of the block 2(9) sets the search state of the transmitting/receiving section 22A of the block 2(9) to "DUP" (S31) and sets the adjacent number of the side A of the transmitting/receiving section 22A to "3" (S32).

Similarly, the CPU 24 of the block 2(9) transmits the search request command SC from the transmitting/receiving section 22B according to the predetermined order. "DUP" is included in the end of the route information string PIS received from the block 2(5). Therefore, the CPU 24 of the block 2(9) sets the search state of the transmitting/receiving section 22B of the block 2(9) to "DUP" (S31) and sets the adjacent number of the transmitting/receiving section 22A to "5" (S32).

Figure 18:
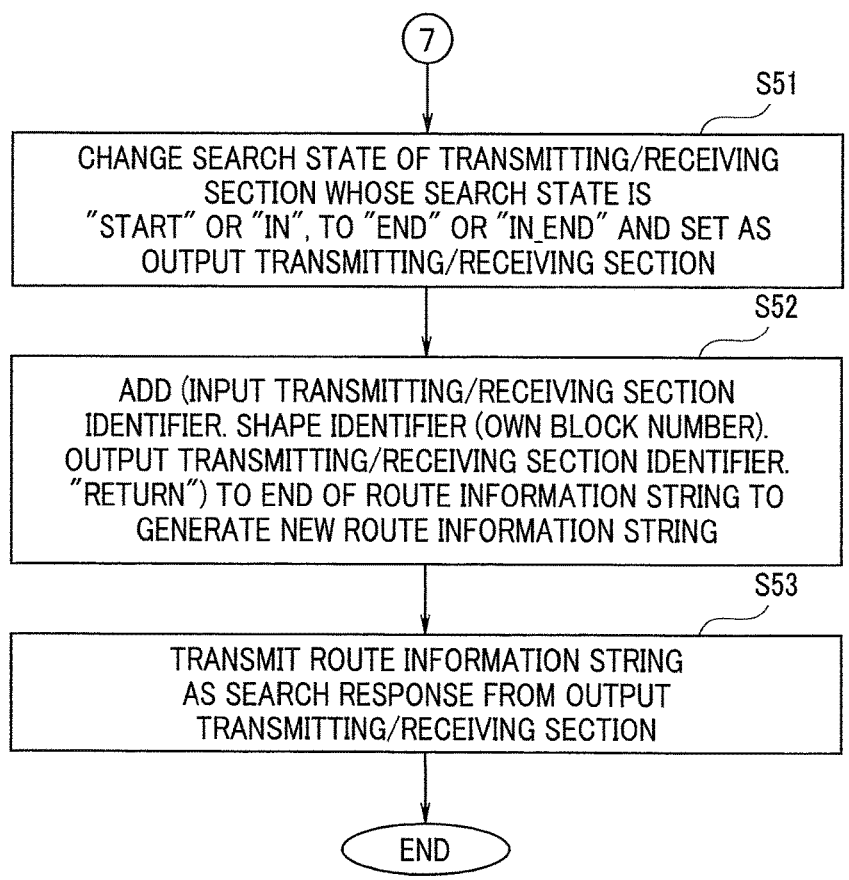
FIG. 18 is a flowchart for explaining the example of the flow of the search request/response command processing in S3 in each of the blocks 2 according to the embodiment.

Thereafter, since there is no transmitting/receiving section whose search state is "NULL" (NO in S16), the CPU 24 of the block 2(9) executes the processing in FIG. 18 and transmits the search response RC including the route information string PIS from the transmitting/receiving section 22C to the block 2(7) (S53).

The CPU 24 of the block 2(7) also transmits, according to reception of the search response RC from the block 2(9), the search response RC including the route information string PIS from the transmitting/receiving section 22D of the block 2(7) to the block 2(6) (S53). Thereafter, similarly, the search response command RC is transmitted to return from the block 2(6) to the block 2(1).

Note that, in the case of the display system 1 shown in FIG. 8, the transmitting/receiving section 22C of the block 2(5) and the transmitting/receiving section 22D of the block 2(3) receive the search response RC including "DUP" at the end from the block 2(9) to which the search request command SC is transmitted. Therefore, the CPUs 24 of the respective blocks 2(5) and 2(3) can determine a number of the block 2(9) adjacent thereto, that is, the adjacent number "9".

Finally, when receiving the search response RC in the transmitting/receiving section 22B of the block 2(1), the CPU 24 of the block 2(1) changes the search state of the transmitting/receiving section 22B to "SEARCH_END" (S41).

Figure 24:
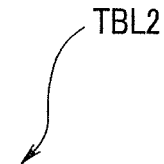
FIG. 24 is a diagram showing a state of the state information table TBL2 after the block 2(1) receives the search response RC from a block 2(2) according to the embodiment.

FIG. 24 is a diagram showing a state of the state information table TBL2 after the block 2(1) receives the search response RC from the block 2(2).

Subsequently, the CPU 24 of the block 2(1) transmits the search request command SC from the transmitting/receiving section 22C according to the predetermined order.

Figure 25:
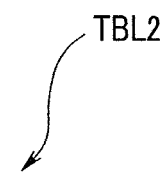
FIG. 25 is a diagram showing a state of the state information table TBL2 at time when the block 2(1) transmits the search request command SC to a block 2(9) according to the embodiment.

FIG. 25 is a diagram showing a state of the state information table TBL2 at time when the block 2(1) transmits the search request command SC to the block 2(9).

Subsequently, the CPU 24 of the block 2(1) receives the search response RC including "DUP" at the end from the block 2(9) to which the search request command SC is transmitted. Therefore, the CPU 24 of the block 2(1) can set the search state of the side C to "DUP" and determine a number of the block 2(9) adjacent thereto, that is, the adjacent number "9".

Figure 26:
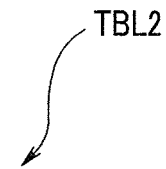
FIG. 26 is a diagram showing a state of the state information table TBL2 after the block 2(1) receives the search response from the block 2(9) according to the embodiment.

FIG. 26 is a diagram showing a state of the state information table TBL2 after the block 2(1) receives the search response RC from the block 2(9).

Subsequently, the CPU 24 of the block 2(1) transmits the search request command SC from the transmitting/receiving section 22D according to the predetermined order. The CPU 24 of the block 2(1) receives the search response RC including "DUP" at the end from the block 2(8) to which the search request command SC is transmitted.

Finally, the CPU 24 of the block 2(1) changes the search state of the transmitting/receiving section 22A whose search state is "START" to "END" (S51) and transmits the search response RC including the route information string PIS from the transmitting/receiving section 22A to the smartphone 3 (S53).

Figure 27:
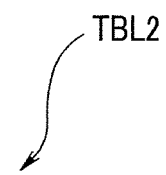
FIG. 27 is a diagram showing a state of the state information table TBL2 after the block 2(1) receives the search response RC from the block 2(8) according to the embodiment.

FIG. 27 is a diagram showing a state of the state information table TBL2 in a state after the block 2(1) receives the search response RC from the block 2(8).

Figure 28:
FIG. 28 is a diagram showing the route information string PIS included in the search response RC transmitted from the block 2(1) to the smartphone 3 according to the embodiment.

FIG. 28 is a diagram showing the route information string PIS included in the search response RC transmitted from the block 2(1) to the smartphone 3.

Figure 29:
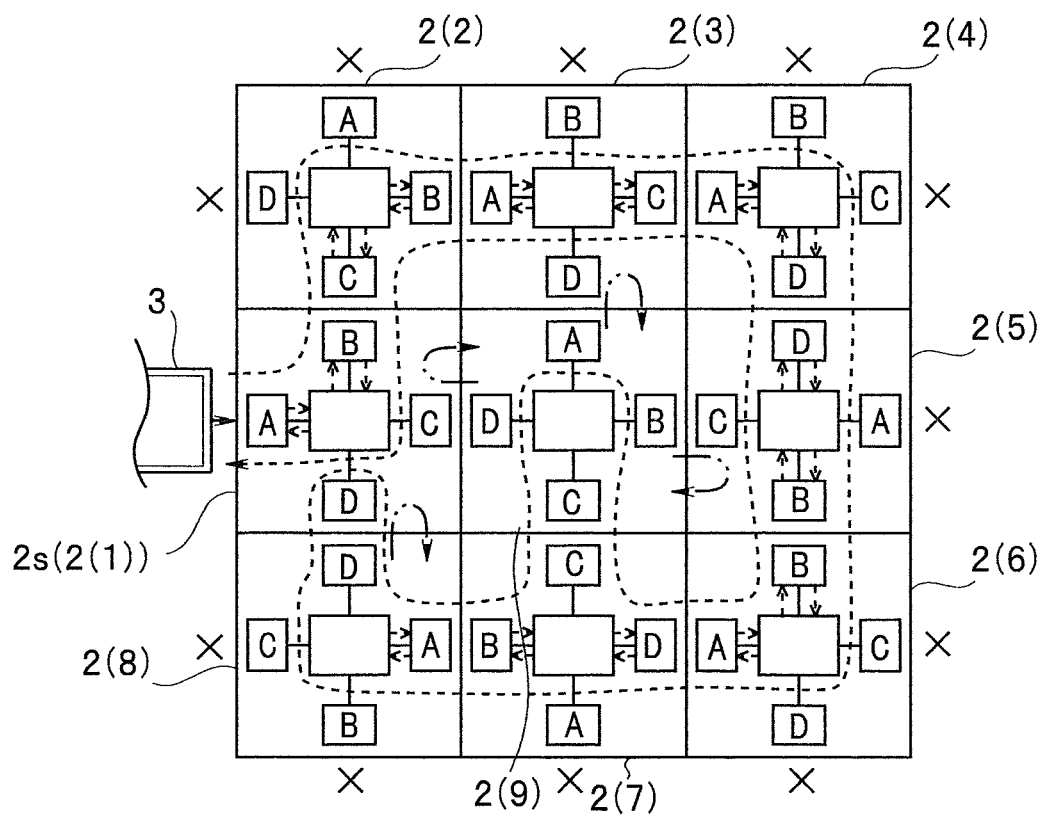
FIG. 29 is a diagram showing a flow of the search request command SC in the display system 1 according to the embodiment.

FIG. 29 is a diagram showing a flow of the search request command SC in the display system 1. As indicated by a dotted line in FIG. 29, the block 2(1), which receives the search request command SC, is the start block 2s. The search request command SC is transmitted from the block 2(1) to the other blocks 2 and returns to the block 2(1) as if drawing a line in a single stroke.

In FIG. 29, cross marks (X) indicate sides where adjacent blocks are absent. In FIG. 29, U-turn marks indicated by alternate long and two short dashes lines indicate places where loops are detected. The search request command SC includes the route information string PIS. The route information string PIS includes a block number generated and given in each of the blocks 2, end portion information of a side where an adjacent block is absent in each of the blocks 2 ("EDGE" described above), and loop information indicating presence of an already-searched block ("DUP" described above).

As explained above, the control section 21 of each of the blocks 2 configures the information-transmission control section that determines, when receiving the search request command SC including the route information string PIS, presence or absence of other blocks arranged adjacent to the respective surfaces on which the transmitting/receiving sections 22, which are the communication sections, are provided, adds the information including the block numbers, which are the identification information of the other blocks, arranged adjacent to the respective surfaces to the route information string PIS included in the search request command SC and generates the search request command SC or the search response RC on the basis of a determination result of the presence or absence of the other blocks, and transmits the search request command SC or the search response RC from any one of the plurality of transmitting/receiving sections 22. The search request command SC or the search response RC is information obtained by including, in the received search request command SC or search response RC, or adding, to the received search request command SC or search response RC, the information concerning the presence or absence of the other blocks on the respective surfaces and the identification information of the other blocks.

In particular, the control section 21, which is the information-transmission control section, includes, on the basis of the determination result of the presence or absence of the other blocks, in the route information string PIS, the information ("EDGE") indicating that the other block are absent concerning the surfaces on which the other blocks arranged adjacent to one another are absent.

Further, the control section 21, which is the information-transmission control section, includes, when the received search request command SC includes the search request command SC transmitted by the control section 21, the information ("DUP") indicating a loop in the route information string PIS.

(Adjacent Matrix Creation Processing in the Smartphone)

As explained above, in S2 in FIG. 9, the smartphone 3 receives the search response RC from the start block 2s. As explained above, the CPU 36 of the smartphone 3 executes the adjacent matrix creation processing and generates the block arrangement information of the display system 1 on the basis of the route information string PIS included in the received search response command RC and the display block information table TBL1 explained above (S3).

FIG. 30 is a flowchart for explaining an example of a flow of the adjacent matrix creation processing for generating the block arrangement information in S3.

The CPU 36 executes adjacent matrix initialization processing (S101). FIG. 31 is a flowchart for explaining an example of a flow of the adjacent matrix initialization processing.

The CPU 36 reads the route information string PIS from a top and, every time a new block number is found, determines the number of surfaces (or sides) of the block from a shape identifier of the block, and calculates a sum of the numbers of surfaces of all the blocks (S111).

The CPU 36 creates an empty square adjacent matrix having a size of the sum of the numbers of surfaces and allocates, for each of the blocks, rows and columns as many as the number of surfaces of the block (S112).

In the case of the display system 1 shown in FIG. 8, the number of surface is nine. Each of the blocks 2 is a square having four sides. Therefore, a matrix table of 36×36 is generated.

Figure 32:
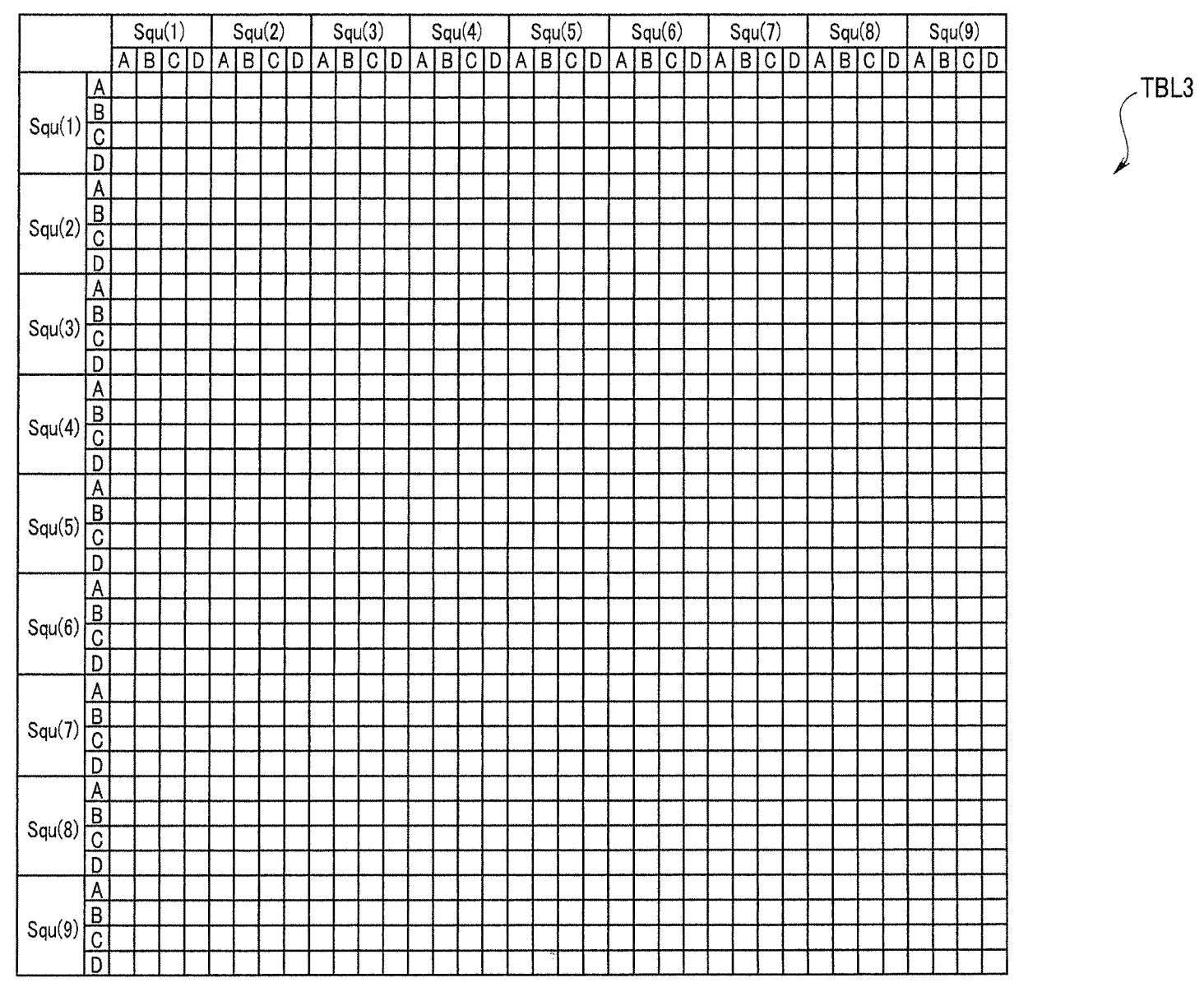

FIG. 32 is a diagram showing an example of the adjacent matrix table generated in S112.

Referring back to FIG. 30, the CPU 36 returns a readout target to the top of the route information string PIS (S102). That is, a position of the readout target route information PI is a position of route information of a top position of the route information string PIS.

The CPU 36 reads partial strings (a partial string pair) adjacent to each other of the route information string PIS (S103). Each of the respective partial strings is one piece of the route information PI. Therefore, the partial string pair is two pieces of the route information PI adjacent to each other.

In the following explanation, the partial string pair is indicated by (X1.FormX(#X).X2.<any>) (Y1.FormY(#Y).Y2.<any>). Each of (X1.FormX(#X).X2.<any>) and (Y1.FormY(#Y).Y2.<any>) is the route information PI. X1 and Y1 indicate input transmitting/receiving section identifiers. FormX(#X) and FormY(#Y) indicate shape identifiers (own block numbers). X2 and Y2 indicate output transmitting/receiving section identifiers. <any> indicates any one of empty (in this case, meaning a search request), Dup, Edge, and Return.

If the read partial string pair is (X1.FormX(#X).X2) (Y1.FormY(#Y).Y2.<any>), a surface X2 of a block #X is adjacent to a surface Y1 of a block #Y. Therefore, the CPU 36 sets a corresponding element of the adjacent matrix to 1 and sets elements other than the element in a row or a column including the element to zero (S104).

Subsequently, if the partial string pair is (X1.FormX(#X).X2.EDGE) (Y1.FormY(#Y).Y2.<any>), the surface X2 of the block #X is not adjacent to any block. Therefore, the CPU 36 sets all elements of a corresponding row and a corresponding column of the adjacent matrix to zero (S105).

Further, if the partial string pair is a pattern other than the above, the CPU 36 does not change the adjacent matrix (S106).

The CPU 36 shifts the readout target backward by one partial string (S107). That is, a range of the readout target is moved such that the route information PI of a back of the partial string pair changes to the route information PI of a front in a partial string pair to be read out next.

The CPU 36 determines whether the route information PI of the back of the partial string pair is the end of the route information string PIS (S108). That is, the CPU 36 determines whether the read-out target partial string pair includes the route information PI of the end of the route information string PIS.

If the route information PI of the back of the partial string pair is not the route information PI of the end of the route information string PIS (NO in S108), the processing returns to S103. If the route information PI of the back of the partial string pair is the route information PI of the end of the route information string PIS (YES in S108), the processing ends.

Figure 33:
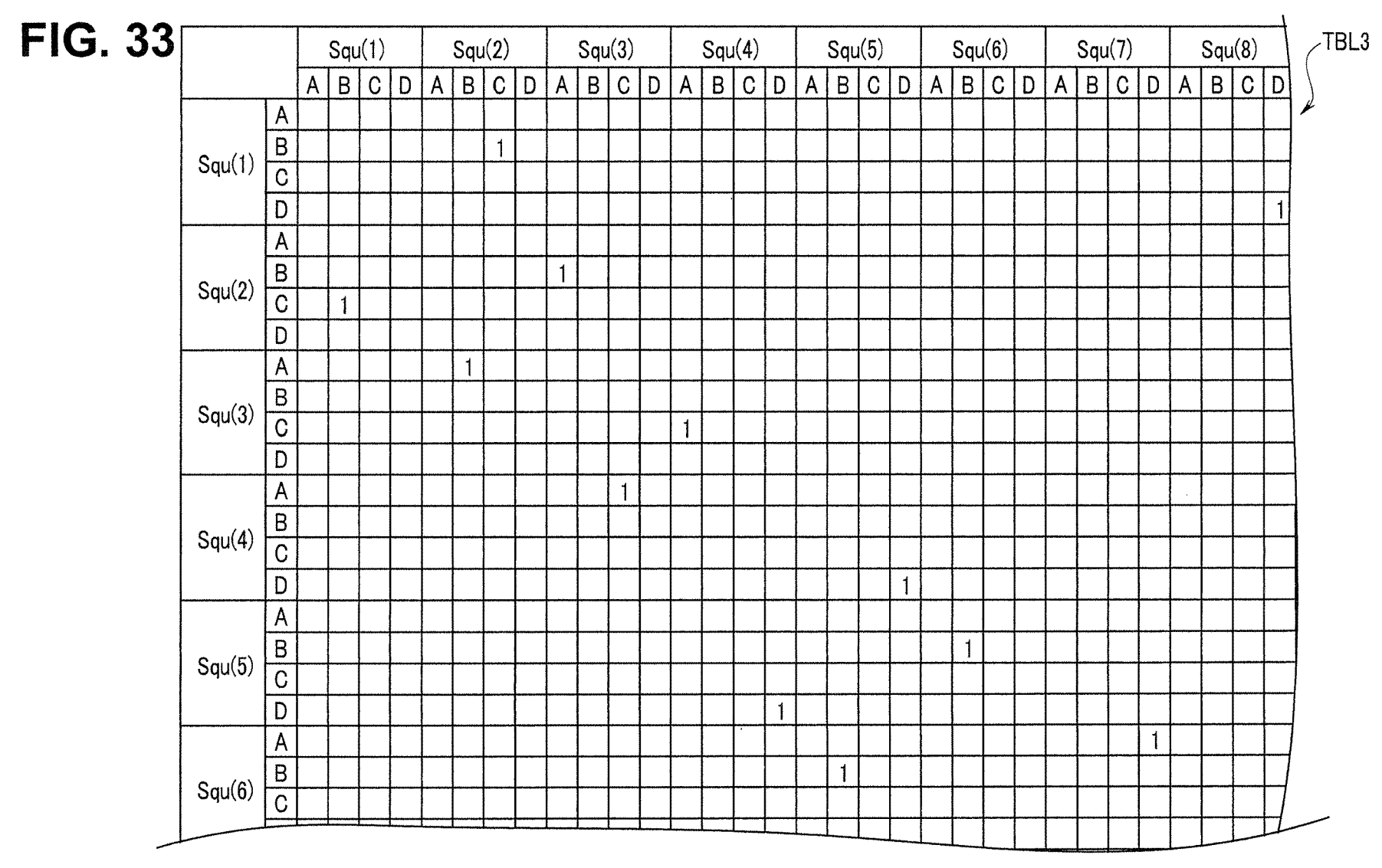

According to the processing explained above, an adjacent matrix table TBL3 shown in FIG. 33 is created.

FIG. 33 is a diagram showing a part of the adjacent matrix table TBL3 including information concerning a connection relation among the blocks 2 as a result of the processing in FIG. 30. In FIG. 33, "0" is not shown. The adjacent matrix generated as explained above includes all connection information among the blocks 2. Therefore, the CPU 36 of the smartphone 3 can generate block arrangement information on the basis of the generated adjacent matrix table TBL3.

As a result, the CPU 36 can divide, on the basis of the block arrangement information, the image selected in S4 and generate display image information including a plurality of pieces of block image information.

Figure 34:
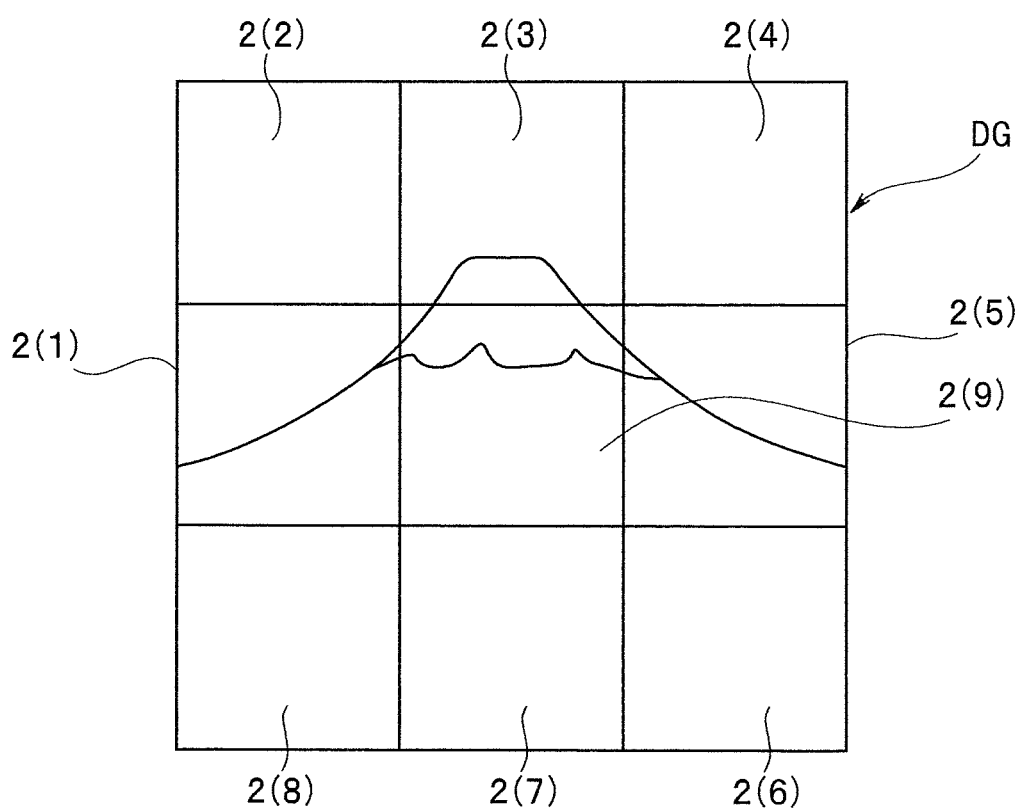
FIG. 34 is a diagram showing a display image DG to be displayed and a range in which the display image is displayed on a display surface 1a of the display system 1 according to the embodiment.

FIG. 34 is a diagram showing a display image DG to be displayed and a range in which the display image DG is displayed on the display surface 1a of the display system 1. The display image DG to be displayed with respect to a shape of the display surface 1a is selected or designated in S4. In S5, the display image DG is divided according to the respective blocks 2 in a display area and a plurality of pieces of block image information are generated. The block image information is image information for each of the blocks.

The smartphone 3 transmits display image information including the generated plurality of pieces of block image information to the start block 2s (S6). The plurality of pieces of block image information included in the display image information transmitted from the smartphone 3 are transmitted in association with block numbers. In other words, each of the pieces of the block image information is transmitted while including a number of the block 2 to be displayed, that is, an own block number generated in the above processing and stored in the state information table TBL2 of each of the blocks 2 or transmitted together with the own block number.

The smartphone 3 transmits the plurality of pieces of block image information to the start block 2s of the display system 1. In the start block 2s and the other blocks 2, transfer processing and display processing of the received block image information are executed.

(Rotation Processing of an Image in the Respective Blocks)

When the user couples the plurality of blocks 2 to configure the display system 1 and transfers images from the smartphone 3 to the blocks 2 of the display system 1, the user sometimes does not know the directions of image display of the display surfaces 2a of the respective blocks 2. Therefore, images of the respective display surfaces displayed on the basis of image data transferred from the smartphone 3 to the respective blocks 2 face various directions. Therefore, a combined image of the display system 1 does not coincide with an image displayed on the display device 33 of the smartphone 3.

Figure 35:
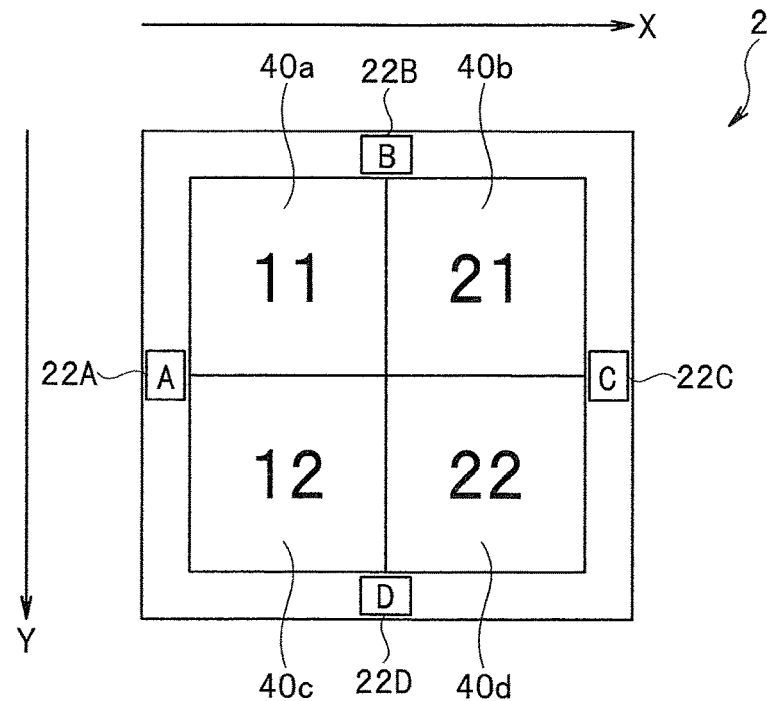
FIG. 35 is a diagram showing an example of pixels in the block 2.

FIG. 35 is a diagram showing an example of pixels arranged on the block 2.

On the block 2, for image display, usually, a large number of pixels are arranged, that is, m pixels are arranged along the X axis of the display device 23 and n pixels are arranged along the Y axis of the display device 23. Note that, in the example shown in FIG. 35, to make it easy to understand a problem that occurs when image data is transferred from the smartphone 3 to the respective blocks 2 and an image addressed to the blocks 2 is displayed on the respective display devices 23 of the respective blocks 2, the block 2 having a square shape includes four pixels 40a to 40d. In the display device 23, a pixel coordinate is shown instead of image display. The pixel 40a has a pixel coordinate (1, 1) and is written as "11" in FIG. 35. Similarly, the pixel 40b has a pixel coordinate (2, 1) and is written as "21" in FIG. 35. The pixel 40c has a pixel coordinate (1, 2) and is written as "12" in FIG. 35. The pixel 40d has a pixel coordinate (2, 2) and is written as "22" in FIG. 35.

Further, four transmitting/receiving sections 22A to 22D are written on the outer side of the pixels 40a to 40d. Note that the transmitting/receiving sections 22A to 22D are set in the housing of the block 2 and are not seen from the outer side of the block 2.

A relation between the arrangement of the transmitting/receiving sections 22A to 22D in the block 2 and the arrangement of the pixel coordinates of the pixels 40a to 40d is determined in a design stage of the block 2. Therefore, the relation is common in at least manufactured blocks 2 having the same size and a square shape. For example, in the block 2 shown in FIG. 35, the transmitting/receiving sections 22A to 22D are set such that the control section 21 recognizes that the transmitting/receiving sections 22A to 22D are arranged in the order of the transmitting/receiving sections 22A, 22B, 22C, and 22D clockwise. An arrangement relation among the pixel coordinates of the four pixels 40a to 40d is as explained below with respect to the arrangement relation of the transmitting/receiving sections 22A to 22D.

The pixel coordinate (1, 1) is on the transmitting/receiving sections 22A and 22B side. The pixel coordinate (2, 1) (equivalent to (Xm, 1)) is on the transmitting/receiving sections 22B and 22C side. Similarly, the pixel coordinate (1, 2) (equivalent to (1, Yn)) is on the transmitting/receiving sections 22A and 22D side. The pixel coordinate (2, 2) (equivalent to (Xm, Yn)) is on the transmitting/receiving sections 22C and 22D side.

Figure 36:
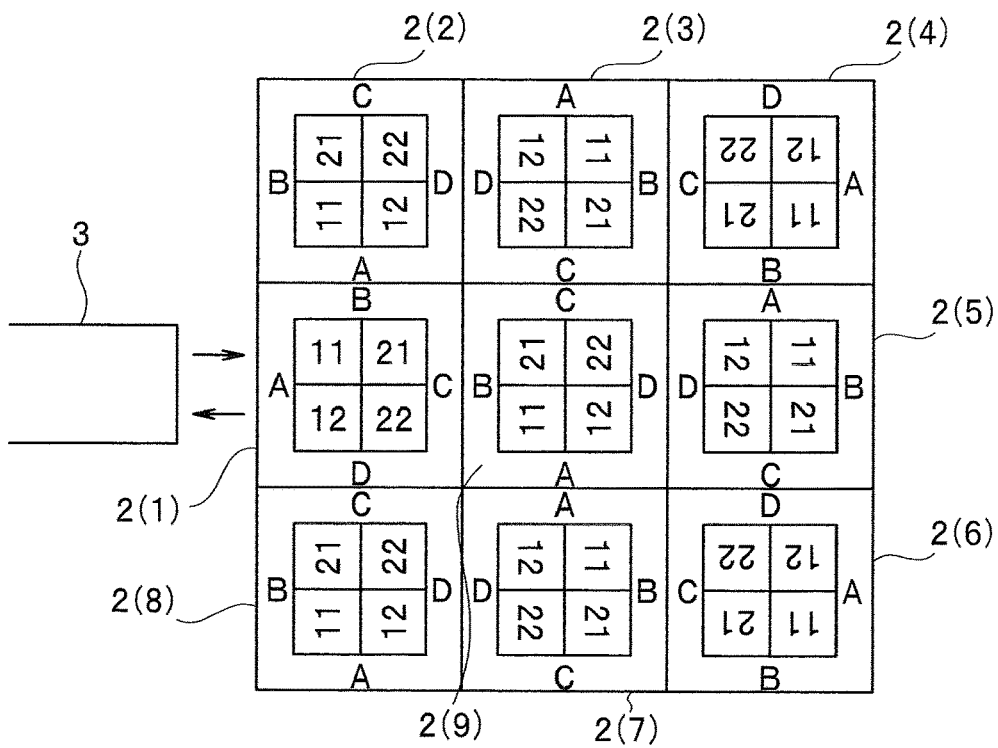
FIG. 36 is a configuration diagram of the display system 1 in a state in which a user couples the block 2 shown in FIG. 25 and completes an arrangement search using the smartphone 3.

FIG. 36 a configuration diagram of the display system 1 in a state in which the user couples the block 2 shown in FIG. 35 and completes an arrangement search using the smartphone 3.

According to the arrangement search of the smartphone 3, numbers (1) to (9) are already given to the respective blocks 2. The control section 21 recognizes the numbers. When the user himself or herself couples and arranges the nine blocks 2, the transmitting/receiving sections 22A to 22D of the respective blocks 2 are not seen from the outside of the housing. Therefore, arrangement relations of the transmitting/receiving sections 22A to 22D of the respective blocks 2 of the display system 1 do not coincide with one another. The transmitting/receiving sections 22A to 22D face various directions as shown in FIG. 36.

For example, a positional relation between the arrangement of the transmitting/receiving sections 22A to 22D and the pixel coordinates of the pixels 40a to 40d of the block 2(2) is arranged in a state in which the block 2(1) is rotated 270° to the right with respect to a positional relation between the arrangement of the transmitting/receiving sections 22A to 22D and the pixel coordinates of the pixels 40a to 40d of the block 2(1). A positional relation between the arrangement of the transmitting/receiving sections 22A to 22D and the pixel coordinates of the pixels 40a to 40d of the block 2(3) is arranged in a state in which the block 2(1) is rotated 90° to the right with respect to a positional relation between the arrangement of the transmitting/receiving sections 22A to 22D and the pixel coordinates of the pixels 40a to 40d of the block 2(1).

Figure 37:
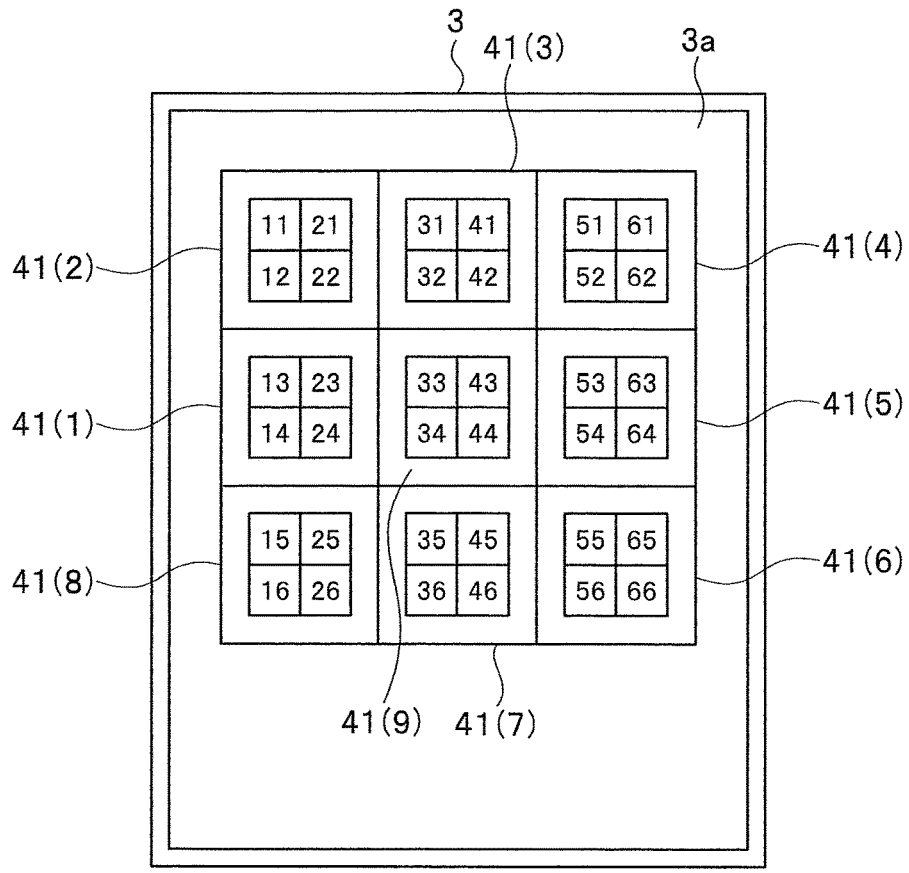
FIG. 37 is a diagram showing an example of a block frame displayed on a screen 3a of a display device 33 of the smartphone 3.

FIG. 37 is a diagram showing an example of a block frame displayed on the screen 3a of the display device 33 of the smartphone 3.

As shown in FIG. 37, on the screen 3a of the display device 33 of the smartphone 3, respective block frames 41(1) to 41(9) indicating outer frames of the pixel coordinates of the respective blocks 2(1) to 2(9) found in the arrangement search and images superimposed on the respective block frames 41(1) to 41(9) (in the example shown in FIG. 37, pixel coordinates are displayed instead of the images) are displayed. The user executes a predetermined application program started by the smartphone 3 to instruct division of image data divided by the block frames 41(1) to 41(9).

Subsequently, the user brings the smartphone 3 close to the block 2(1), which is a start block during the arrangement search, and performs an instruction for transfer of the image data. Then, nine pieces of block image information divided for each of the block frames 41(1) to 41(9) are transferred to the respective blocks 2(1) to 2(9) according to data transfer by short range radio. Note that, before the transfer of the image data, the user may bring the smartphone 3 close to the block 2(1) after executing the division processing of the image. The transfer processing of the block image information is explained below.

Figure 38:
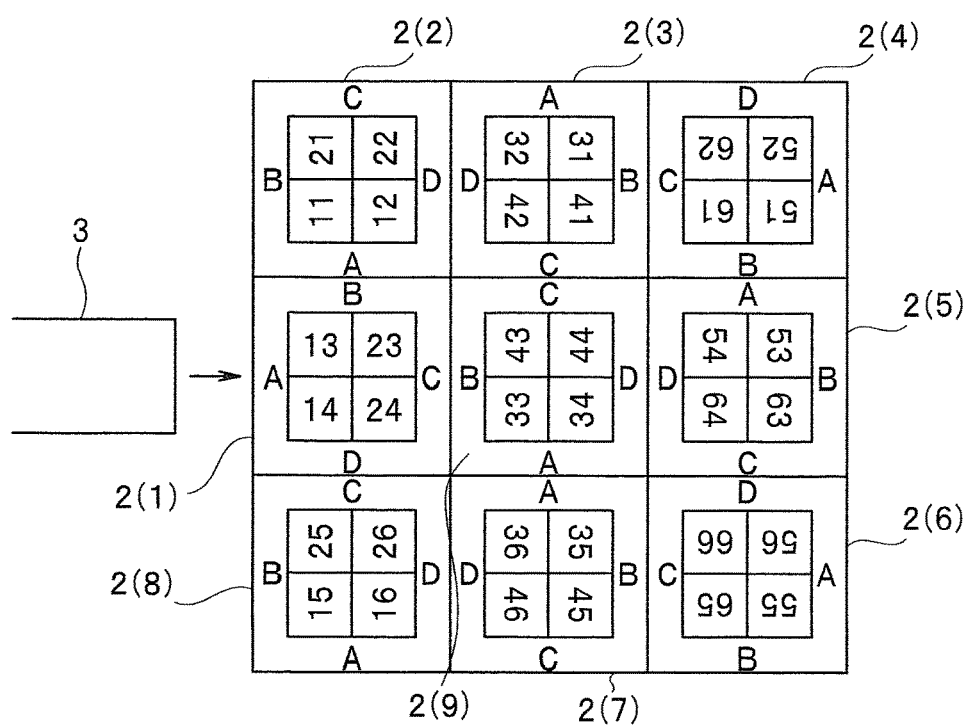
FIG. 38 is a diagram showing an example in which block image information shown in FIG. 37 is displayed on respective display devices 23 of the respective blocks 2(1) to 2(9)

FIG. 38 is a diagram showing an example in which the block image information shown in FIG. 37 is displayed on the respective display devices 23 of the respective blocks 2(1) to 2(9). Note that, in the example shown in FIG. 38, in order to clearly explain rotation of the images of the respective blocks 2(1) to 2(9), pixel coordinates corresponding to images data are written instead of the images.

The images displayed in the respective blocks 2(1) to 2(9), to which the block image information shown in FIG. 37 is transferred, are displayed in various directions according the arrangement of the pixel coordinates shown in FIG. 36. For example, as shown in FIG. 38, in the block 2(2), transferred image data is rotated 270° clockwise and displayed, in the block 2(3), transferred image data is rotated 90° clockwise and displayed, and, in the block 2(4), transferred image data is rotated 180° clockwise and displayed. Therefore, the user does not understand what kind of an image an image displayed on the display surface 1a of the display system 1 is.

Therefore, a method of solving such a problem and correctly displaying, for the user, the image displayed on the display surface 1a of the display system 1 is explained below.

FIGS. 39A to 39D, FIGS. 40A to 40D, FIGS. 41A to 41D, and FIGS. 42A to 42D are diagrams showing examples of combinations of only two transmitting/receiving sections adjacent to each other when two blocks respectively having square shapes are adjacent to each other.

Note that, in FIGS. 39A to 39D, FIGS. 40A to 40D, FIGS. 41A to 41D, and FIGS. 42A to 42D, the block 2 on an upstream side that transfers the block image information is indicated by a block 2(1) and the block 2 on a downstream side to which the block image information is transferred is indicated by a block 2(2). In FIGS. 39A to 39D, FIGS. 40A to 40D, FIG. 41A to 41D, and FIGS. 42A to 42D, when the arrangement of the transmitting/receiving sections 22A to 22D of the block 2(2), that is, the arrangement of the pixel coordinates on the downstream side is set the same as the arrangement of the transmitting/receiving sections 22A to 22D of the block 2(1), that is, the arrangement of the pixel coordinates on the upstream side, it is indicated how many degrees the pixel coordinates of the block 2(2) on the downstream side should be rotated.

In FIGS. 39A to 39D, the transmitting/receiving section on the upstream side is the transmitting/receiving section 22A. In FIGS. 40A to 40D, the transmitting/receiving section on the upstream side is the transmitting/receiving section 22B. In FIGS. 41A to 41D, the transmitting/receiving section on the upstream side is the transmitting/receiving section 22C. In FIGS. 42A to 42D, the transmitting/receiving section on the upstream side is the transmitting/receiving section 22D.

Figures 39A, 39B, 39C, 39D:
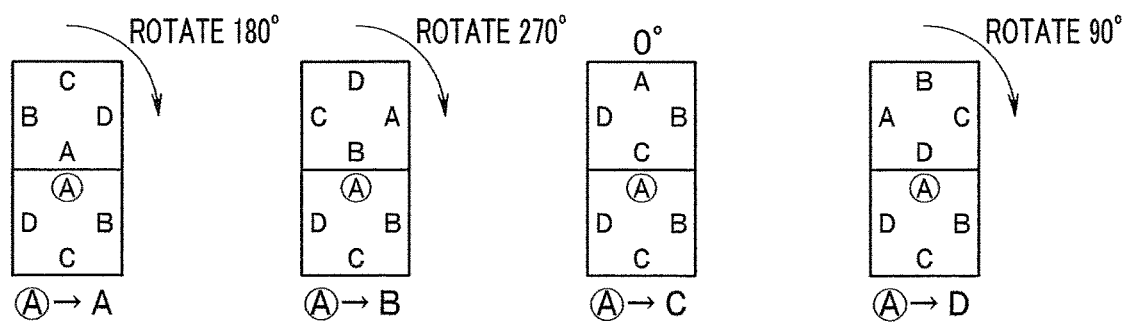
FIG. 39A is a diagram showing an example of a combination of only two transmitting/receiving sections adjacent to each other when two blocks respectively having square shapes are adjacent to each other.
FIG. 39B is a diagram showing an example of a combination of only two transmitting/receiving sections adjacent to each other when the two blocks respectively having the square shapes are adjacent to each other.
FIG. 39C is a diagram showing an example of a combination of only two transmitting/receiving sections adjacent to each other when the two blocks respectively having the square shapes are adjacent to each other.
FIG. 39D is a diagram showing an example of a combination of only two transmitting/receiving sections adjacent to each other when the two blocks respectively having the square shapes are adjacent to each other.
Figures 40A, 40B, 40C, 40D:
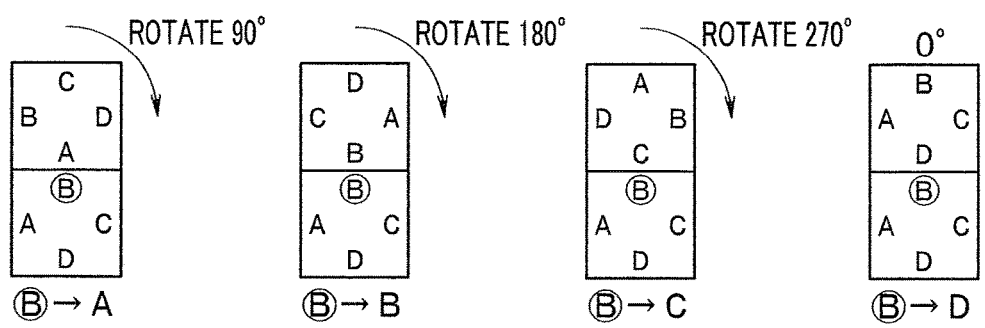
FIG. 40A is a diagram showing an example of a combination of only two transmitting/receiving sections adjacent to each other when the two blocks respectively having the square shapes are adjacent to each other.
FIG. 40B is a diagram showing an example of a combination of only two transmitting/receiving sections adjacent to each other when the two blocks respectively having the square shapes are adjacent to each other.
FIG. 40C is a diagram showing an example of a combination of only two transmitting/receiving sections adjacent to each other when the two blocks respectively having the square shapes are adjacent to each other.
FIG. 40D is a diagram showing an example of a combination of only two transmitting/receiving sections adjacent to each other when the two blocks respectively having the square shapes are adjacent to each other.
Figures 41A, 41B, 41C, 41D:
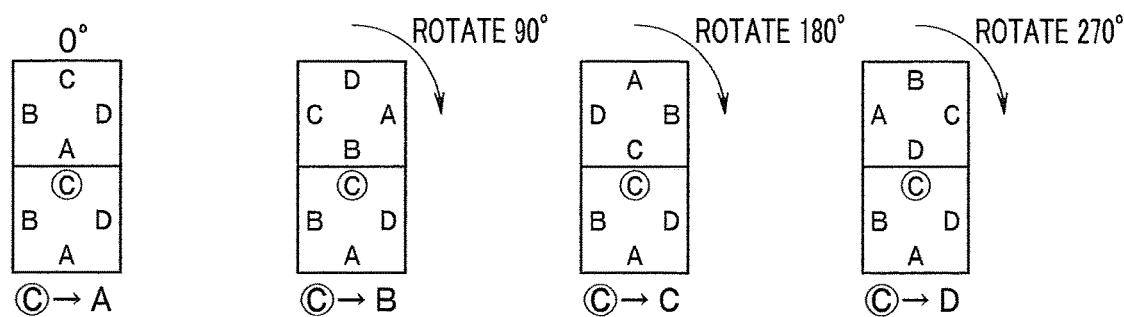
FIG. 41A is a diagram showing an example of a combination of only two transmitting/receiving sections adjacent to each other when the two blocks respectively having the square shapes are adjacent to each other.
FIG. 41B is a diagram showing an example of a combination of only two transmitting/receiving sections adjacent to each other when the two blocks respectively having the square shapes are adjacent to each other.
FIG. 41C is a diagram showing an example of a combination of only two transmitting/receiving sections adjacent to each other when the two blocks respectively having the square shapes are adjacent to each other.
FIG. 41D is a diagram showing an example of a combination of only two transmitting/receiving sections adjacent to each other when the two blocks respectively having the square shapes are adjacent to each other.
Figures 42A, 42B, 42C, 42D:
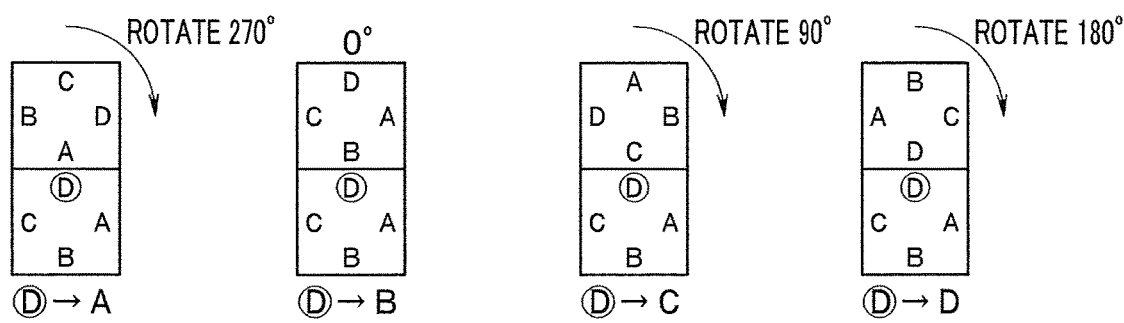
FIG. 42A is a diagram showing an example of a combination of only two transmitting/receiving sections adjacent to each other when the two blocks respectively having the square shapes are adjacent to each other.
FIG. 42B is a diagram showing an example of a combination of only two transmitting/receiving sections adjacent to each other when the two blocks respectively having the square shapes are adjacent to each other.
FIG. 42C is a diagram showing an example of a combination of only two transmitting/receiving sections adjacent to each other when the two blocks respectively having the square shapes are adjacent to each other.
FIG. 42D is a diagram showing an example of a combination of only two transmitting/receiving sections adjacent to each other when the two blocks respectively having the square shapes are adjacent to each other.

For example, in the example shown in FIG. 39A, the transmitting/receiving section 22A of the block 2(2) on the downstream side is adjacent to the transmitting/receiving section 22A of the block 2(1) on the upstream side. In this case, in order to set the arrangement of the pixel coordinates of the block 2(2) on the downstream side the same as the arrangement of the pixel coordinates of the block 2(1) on the upstream side, it is necessary to rotate the pixel coordinates of the block 2(2) 180° to the right.

Similarly, in the example shown in FIG. 39B, the arrangement of the pixel coordinates of the block 2(2) on the downstream side can be set the same as the arrangement of the pixel coordinates of the block 2(1) on the upstream side by rotating the pixel coordinates of the block 2(2) on the downstream side 270° to the right. In the example shown in FIG. 39C, the arrangement of the pixel coordinates of the block 2(2) on the downstream side and the arrangement of the pixel coordinates of the block 2(1) on the upstream side are the same. Therefore, the pixel coordinates of the block 2(2) on the downstream side are rotated 0°. In the example shown in FIG. 39D, the arrangement of the pixel coordinates of the block 2(2) on the downstream side can be set the same as the arrangement of the pixel coordinates of the block 2(1) on the upstream side by rotating the pixel coordinates of the block 2(2) on the downstream side 90° to the right.

Similarly, concerning FIGS. 40A to 40D, FIGS. 41A to 41D, and FIGS. 42A to 42D, a rotation angle of the pixel coordinates of the block 2(2) on the downstream side can be determined according to a relation between the arrangement of the transmitting/receiving sections 22 of the block 2(1) on the upstream side and the arrangement of the transmitting/receiving section 22 of the block 2(2) on the downstream side.

FIG. 43 is a data table showing how many degrees the pixel coordinates of the block 2(2) on the downstream side are rotated to the right with respect to the block 2(1) on an upstream side to set arrangement relations of the transmitting/receiving sections the same.

As shown in FIG. 43, a data table TBL4 is a table in which the rotation angles shown in FIGS. 39A to 39D, FIGS. 40A to 40D, FIGS. 41A to 41D, and FIGS. 42A to 42D are collected. For example, the table TBL4 indicates that, when the transmitting/receiving section of the block 2(1) on the upstream side is the transmitting/receiving section 22C and the transmitting/receiving section of the block 2(2) on the downstream side is the transmitting/receiving section 22D, the arrangement relations of the block 2(1) and the block 2(2) are set the same by rotating the pixel coordinates of the block 2(2) on the downstream side to the right 270°.

The data table TBL4 is a table applicable in the case of the block 2 having a square shape. For example, in respective shapes of a rectangle, a regular triangle, and the like, the number of transmitting/receiving sections and rotation angles of pixel coordinates are different from those of the block 2 having the square shape. Therefore, it is necessary to prepare, for each of the shapes and the coupling relations of the respective blocks 2, the data table TBL4 corresponding to the shape and the coupling relation.

For example, in a block having a rectangular shape, when surfaces on the long sides and the surfaces on the short sides are alternately present but only the surfaces on the long sides and only the surfaces on the end face sides can be coupled to each other, as rotation angle of pixel coordinates, only two rotation angles of 0° and 180° are present. On the other hand, when the surfaces on the long sides and the surfaces on the short side can be coupled in the block having the rectangular shape, as rotation angles of pixel coordinates, four rotation angles of 0°, 90°, 180°, and 270° are present. Therefore, for each of the shapes and the coupling relations of the blocks 2, the data table TBL4 corresponding to the shape and the coupling relation is necessary.

The data table TBL4 shown in FIG. 43 is stored in memories such as the ROMs 25 of the respective blocks 2. The data table TBL4 is stored in a memory such as the ROM 37 of the smartphone 3. Concerning the rotation of the pixel coordinates of the respective blocks in the display system 1, the control section 21 of the block 2 on the downstream side can determine the rotation angles of the pixel coordinates of the block 2 on the downstream side by recognizing the transmitting/receiving section 22 of the block 2 on the upstream side and the transmitting/receiving section 22 of the block 2 on the downstream side adjacent to the transmitting/receiving section 22 and referring to the data table TBL4.

The smartphone 3 is located as an upstream block with respect to the block 2(1). An image transferred from the smartphone 3 to the block 2(1) and displayed on the display device 23 of the block 2(1) needs to be displayed in a direction conforming to the intention of the user. For example, when the user is viewing the display system 1, which is coupled as shown in FIG. 38, from the direction of the blocks 2(6), 2(7), and 2(8), an image displayed on the display device 23 of the block 2(1) is displayed in a direction conforming to the intention of the user. On the other hand, when the user is viewing the display system 1 from the direction of the blocks 2(1), 2(2), and 2(8), an image displayed on the display device 23 of the block 2(1) is not displayed in the direction conforming to the intention of the user.

Therefore, first, the user transfers image information from the smartphone 3 to the start block 2(1) and causes the display device 23 of the block 2(1) to display an image. The user views the image displayed on the display device 23 of the block 2(1), determines whether the present direction is correct or how many degrees the image is desired to be rotated in the right direction, and selects a rotation angle out of 0°, 90°, 180°, and 270° on an application screen of the smartphone 3.

It is assumed that the user is viewing the display system 1 from the direction of the blocks 2(6), 2(7), and 2(8). In this case, the user recognizes that the image displayed on the display device 23 of the block 2(1) is displayed in the direction conforming to the intention of the user. Therefore, the user selects 0° as the rotation angle.

In this case, the smartphone 3 functioning as the block on the upstream side transmits, to the transmitting/receiving section 22A of the block 2(1) on the downstream side, information to the effect that a transmitting/receiving section of the smartphone 3 functioning as the block on the upstream side is C. The block 2(1) recognizes from the received information that the transmitting/receiving section on the upstream side is "C" and the transmitting/receiving section on the downstream side is "A" and determines from the data table TBL4 shown in FIG. 43 that a rotation tangle of the pixel coordinates of the block 2(1) is 0°.

However, the user is sometimes viewing the display system 1, which is coupled as shown in FIG. 36, from other directions (the block 2(2), block 2(1), and block 2(8) side, the block 2(2), block 2(3), and block 2(4) side, or the block 2(4), block 2(5), and block 2(6) side). Therefore, the user selects, according to the image displayed on the display device 23 of the block 2(1), on the application screen of the smartphone 3, an image to be displayed on the display device 23 of the block 2(1) to be rotated 90°, 180°, or 270° in the right direction.

For example, when the user is viewing the display system 1, which is coupled as shown in FIG. 36, from the block 2(2), the block 2(3), and block 2(4) side, the user selects, on the application screen of the smartphone 3, the image to be displayed on the display device 23 of the block 2(1) to be rotated 180° in the right direction. In this case, the smartphone 3 transmits, to the block 2(1), information to the effect that the transmitting/receiving section of the smartphone 3 is "A". Then, the block 2(1) refers to the data table TBL4 and rotates the pixel coordinate 180°.

The transmitting/receiving section 22A of the block 2(2) on the downstream side is adjacent to the transmitting/receiving section 22B of the block 2(1) on the upstream side. Therefore, the block 2(2) on the downstream side refers to the data table TBL4 and rotates the pixel coordinate 90° to the right.

However, the block 2(1) is likely to have rotated to angles of four patterns (0°, 90°, 180°, and 270°). Therefore, angles of the four patterns need to be added to the rotation angle of the block 2(2). Since the rotation angle of the block 2(1) is 0°, a cumulative rotation angle of the block 2(1) is 0°+90°=90°. Note that, when the cumulative rotation angle is 360° or more, the cumulative rotation angle is corrected to the angles of the four patterns (0°, 90°, 180°, and 270°) using a remainder function (MOD).

From the above explanation, when a cumulative rotation angle of the pixel coordinates of the block 2 on the downstream side is represented as θ2(x), a rotation angle of the pixel coordinates of the block 2 on the downstream side with respect to the block 2 on the upstream side is represented as θ1(x), and a cumulative rotation angle of the pixel coordinates of the block 2 on the upstream side is represented as θ2(x−1), the following (Equation 1) holds:

$$\theta 2(x) = \theta 1(x) + \theta 2(x-1) \quad \text{(Equation 1)}$$

According to the data table TBL4 in FIG. 43 and Equation 1, rotation angles of the pixel coordinates of the respective blocks 2(1) to 2(9) coupled as shown in FIG. 36 are as shown in FIG. 44.

FIG. 44 is a diagram showing an example of the rotation angles of the pixel coordinates of the respective blocks 2(1) to 2(9) coupled as shown in FIG. 36.

As shown in FIG. 44, when the rotation angle of the pixel coordinates of the block 2(1) is selected as 0°, as shown in a column of a remainder function (θ2(x), 360), the block 2(1) only has to be rotated 0°, the block 2(2) only has to be rotated 90° to the right, the block 2(3) only has to be rotated 270° to the right, the block 2(4) only has to be rotated 180° to the right, the block 2(5) only has to be rotated 270° to the right, the block 2(6) only has to be rotated 180° to the right, the block 2(7) only has to be rotated 270° to the right, the block 2(8) only has to be rotated 90° to the right, and the block 2(9) only has to be rotated 90° to the right.

Note that the data table TBL4 and Equation 1 may be saved in the memories of the respective blocks 2(1) to 2(9) every time the arrangement search is performed. However, the respective blocks 2(1) to 2(9) do not need to save all pieces of information of the data table TBL4. For example, the block 2(2) on the downstream side only has to retain information of a rotation angle of the block 2(2) calculated from the transmitting/receiving section of the block 2(2) and the transmitting/receiving section of the block 2(1) on the upstream side adjacent to the block 2(2) and information of a cumulative rotation angle of the block 2(1) on the upstream side.

Note that transformation of pixel coordinates in memory regions in which image information is stored can be realized by a well-known method on the basis of the rotation angles of the pixel coordinates of the respective blocks 2(1) to 2(9) calculated in this way.

For example, when enlargement or reduction of an image involved in rotation does not occur and the rotation angles are limited to 0°, 90°, 180°, and 270°, rotation processing can be realized by a change in a readout order of pixels. In the case of a configuration in which only one frame memory is secured, the rotation processing can be realized by changing a readout address. In the case of a configuration in which two or more frame memories are secured, after image information is written in another frame in a form of changing the readout order and rotating the image, the image may be displayed on the display device.

Even if the rotation angles are 0°, 90°, 180°, and 270°, when enlargement or reduction of the image occurs (when an image size and the number of pixels on a display side are different), it is necessary to transform the image according to the number of pixels on the display side. In this case, the transformation of the image can be realized by processing called "re-sampling" or "sampling rate transformation". Further, when the rotation angle is any angle not limited to 0°, 90°, 180°, and 270°, processing is more complicated. However, the transformation of the image can be realized using processing such as "affine transformation" together with the processing.

Therefore, by rotating the pixel coordinates as explained above, the respective blocks 2(1) to 2(9) coupled as shown in FIG. 36 are in directions same as the directions of the image display of the block 2(1). Images displayed on the display system 1 coincide with display of images transmitted from the smartphone 3.

Figure 45:
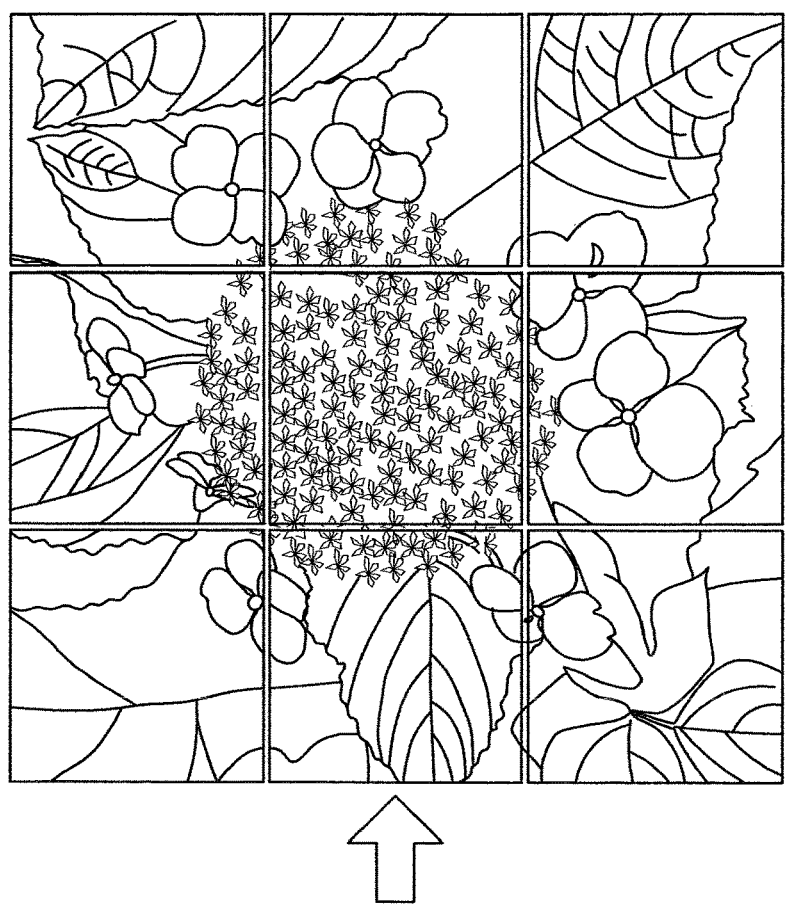
FIG. 45 is a diagram showing an example of an image displayed on the display system 1.
Figure 45:
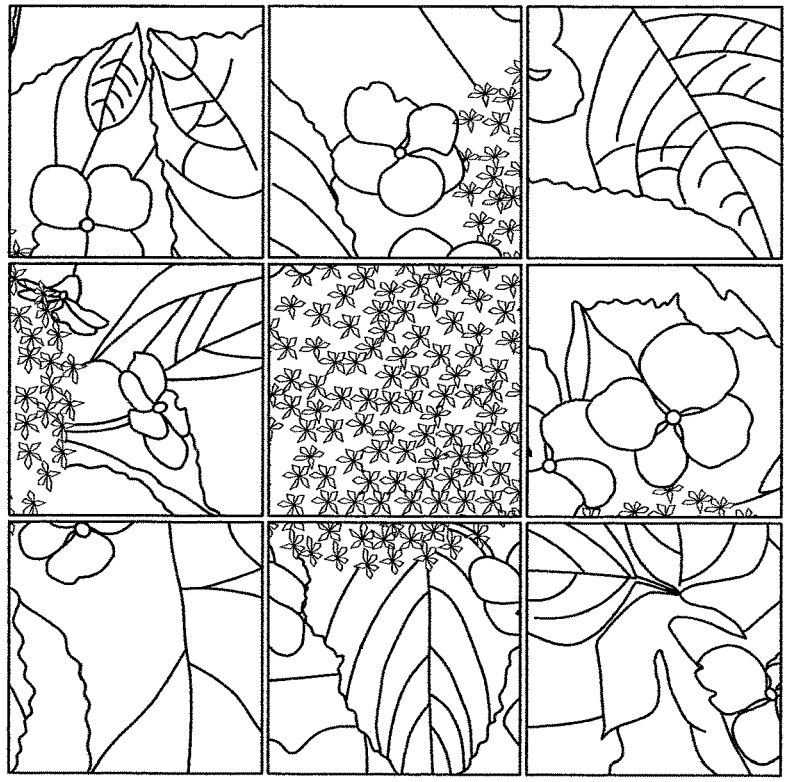

FIG. 45 is a diagram showing an example of the images displayed on the display system 1.

As shown in FIG. 45, in the display system 1, the images face various directions according to connecting directions of the respective blocks 2(1) to 2(9). However, as explained above, by rotating the pixel coordinates of the respective blocks 2(1) to 2(9), it is possible to display images coinciding with the display of the images transmitted from the smartphone 3.

Note that, in the example explained above, the user is viewing the display system 1 from the block 2(6), 2(7), and 2(8) side. However, the user is sometimes viewing the display system 1 from the other three directions. Rotation angles of the pixel coordinates of the respective blocks 2(1) to 2(9) at the time when the user is viewing the display system from the respective directions are shown in FIG. 46.

FIG. 46 is a diagram showing an example of the rotation angle of the pixel coordinates at the time when the user is viewing the respective blocks 2(1) to 2(9) coupled as shown in FIG. 36 from the respective directions.

For example, when the user is viewing the display system 1 from the block 2(2), 2(3), and 2(4) side, the user selects to rotate the pixel coordinates of the block 2(1) 180°. In this case, the block 2(2) only has to be rotated 270° to the right, the block 2(3) only has to be rotated 90° to the right, the block 2(4) only has to be rotated 0°, the block 2(5) only has to be rotated 90° to the right, the block 2(6) only has to be rotated 0°, the block 2(7) only has to be rotated 90° to the right, the block 2(8) only has to be rotated 270° to the right, and the block 2(9) only has to be rotated 270° to the right. Note that, when the user is viewing the display system 1 from the other directions, the rotation angles of the pixel coordinates of the respective blocks 2(1) to 2(9) are also determined from FIG. 46.

Note that, in the above explanation, the pixel coordinates of the pixels displayed on the display devices 23 by the respective blocks 2 are rotated by the predetermined angles. However, the rotation of the pixel coordinates is not limited to this. For example, the smartphone 3 may instruct the respective blocks 2 about the rotation angles of the pixel coordinates.

In this case, the smartphone 3 determines rotation angles of the pixel coordinates of the respective blocks 2 on the basis of a route information string PIS obtained by transmitting a search request command SC to the block 2(1) and the data table TBL4 and transmits the determined respective rotation angles to the respective blocks 2.

Like the blocks 2, the smartphone 3 can retain a data table TBL5 shown in FIG. 44 and Equation 1 in the memory such as the ROM 37. Further, the smartphone 3 can arrange the data table TBL5 shown in FIG. 44 and generate a data table TBL6 shown in FIG. 46 and retain the data table TBL6 in the memory.

When the user selects, from the four patterns, rotation angles of the coordinates of the first block 2(1) on the application screen of the smartphone 3, the smartphone 3 transfers the rotation angles of the pixel coordinates of the respective blocks 2(1) to 2(9) to the respective blocks 2(1) to 2(9) on the basis of the data table TBL6 shown in FIG. 46. The respective blocks 2(1) to 2(9) can match the pixel coordinates with an image on the smartphone 3 by rotating the pixel coordinates according to information of the rotation angles of the pixel coordinates of the respective blocks 2(1) to 2(9) transferred from the smartphone 3.

In the following explanation, a short range radio communication function such as WiFi is incorporated in any one of the blocks 2(1) to 2(9).

Figure 47:
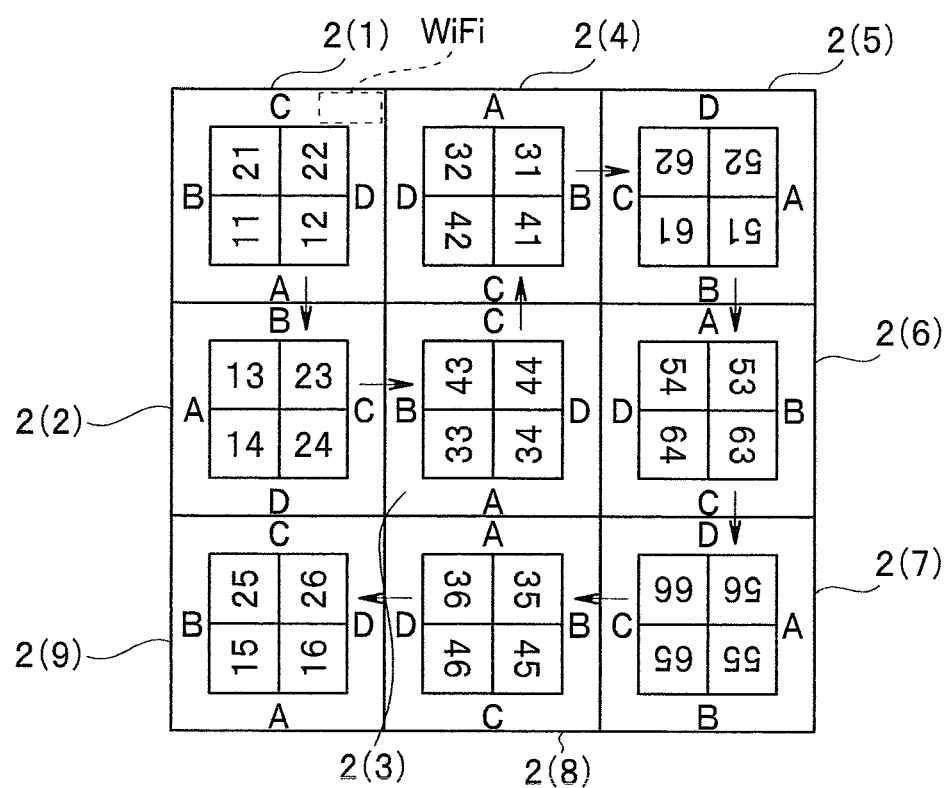
FIG. 47 is a configuration diagram of the display system 1 including a block incorporating a short range radio communication function.

FIG. 47 is a configuration diagram of the display system 1 including a block incorporating the short range radio communication function.

The display system 1 shown in FIG. 47 is configured by the nine blocks 2(1) to 2(9) having a square shape. In the display system 1, an instruction for an arrangement search and transfer of image information from the smartphone 3 are performed using the short range radio communication such as WiFi. Therefore, the block 2(1) inevitably becomes a start block. It is assumed that an arrangement search block from the smartphone 3 is transmitted to the block 2(1) and string information is generated and transmitted to the smartphone 3.

The respective blocks 2(1) to 2(9) determine rotation angles of the pixel coordinates of the respective blocks 2(1) to 2(9) on the basis of the data table TBL4 shown in FIG. 43, the generated string information, and Equation 1.

FIG. 48 is a diagram showing an example of the rotation angles of the pixel coordinates of the respective blocks 2(1) to 2(9) coupled as shown in FIG. 47. Note that, in FIG. 48, parts different from the parts in FIG. 44 are explained.

In the example shown in FIG. 36 explained above, the data communication between the smartphone 3 and the start block 2(1) is performed using the near field communication (NFC, etc.). Therefore, data transferred from the smartphone 3, which is the block on the upstream side, to the transmitting/receiving section 22A of the start block 2(1) has a transmitting/receiving section name (e.g., any one of A to D) as shown in FIG. 44.

On the other hand, in the example shown in FIG. 47, the short range radio (WiFi, etc.) is used for the data communication between the smartphone 3 and the start block 2(1). Therefore, the smartphone 3 does not need to be close to any one of the transmitting/receiving sections 22A to 22D of the start block 2(1). Even when a transmitting/receiving section name corresponding to a rotation angle is transmitted from the smartphone 3 to the block 2(1), the data is not transmitted to any one of the transmitting/receiving sections 22A to 22D of the block 2(1) and is directly transmitted to the control section 21 of the block 2(1) by the short range radio communication. The control section 21 of the block 2(1) cannot determine how many degrees pixel coordinates should be rotated.

Therefore, the smartphone 3 transmits information of rotation angles selected by the user to the start block 2(1) as shown in FIG. 48. Note that, since the near field communication system is used for data transfer to the block 2(1) and the subsequent blocks, rotation angles of the pixel coordinates of the respective blocks 2(1) to 2(9) are determined as shown in FIG. 44.

For example, when the user is viewing the display system 1 coupled as shown in FIG. 47 from the direction of the blocks 2(7), 2(8), and 2(9), the pixel coordinates of the block 2(1) need to be rotated 90° to the right. Therefore, the user selects to rotate the pixel coordinates of the block 2(1) 90° to the right using the application screen of the smartphone 3. Thereafter, it is determined on the basis of a data table TBL7 shown in FIG. 48, the string information, and Equation 1 that the rotation angles of the pixel coordinates of the blocks 2(2) to 2(9) are respectively 0°, 90° to the right, 270° to the right, 180° to the right, 270° to the right, 180° to the right, 270° to the right, and 90° to the right.

FIG. 49 is a diagram showing an example of rotation angles of the pixel coordinates at the time when the respective blocks 2(1) to 2(9) coupled as shown in FIG. 47 are viewed from respective directions.

The smartphone 3 can arrange the data table TBL7 shown in FIG. 48 and generate a data table TBL8 shown in FIG. 49 and retain the data table TBL8 in the memory.

For example, when the user is viewing the display system 1 from the block 2(5), 2(6), and 2(7) side, the user selects to rotate the pixel coordinates of the block 2(1) 180°. In this case, the block 2(2) only has to be rotated 90° to the right, the block 2(3) only has to be rotated 180° to the right, the block 2(4) only has to be rotated 0°, the block 2(5) only has to be rotated 270° to the right, the block 2(6) only has to be rotated 0°, the block 2(7) only has to be rotated 270° to the right, the block 2(8) only has to be rotated 0°, and the block 2(9) only has to be rotated 180° to the right.

Note that the user having the smartphone 3 only has to select according to the distance to the display system 1 whether the display system 1 is configured using the blocks 2 having only a near field communication function or the display system 1 is configured using one of all the blocks 2 as a block having a short range radio function in addition to the near field communication function. When the user is present near the display system 1, it is extremely easy to use the display system 1 including the blocks 2 having only the near field communication function. When the user is absent near the display system 1, it is easy to use the display system 1 including one of all the blocks 2 as the block having the short range radio function in addition to the near field communication function.

In the above explanation, the coupling directions of the blocks 2(1) to 2(9) are not unified. Therefore, the example is explained in which the rotation angle of the pixel coordinates is determined to display an image as a normal image. However, for example, the respective blocks 2(1) to 2(9) may display a display mark for determining directions.

Figure 50:
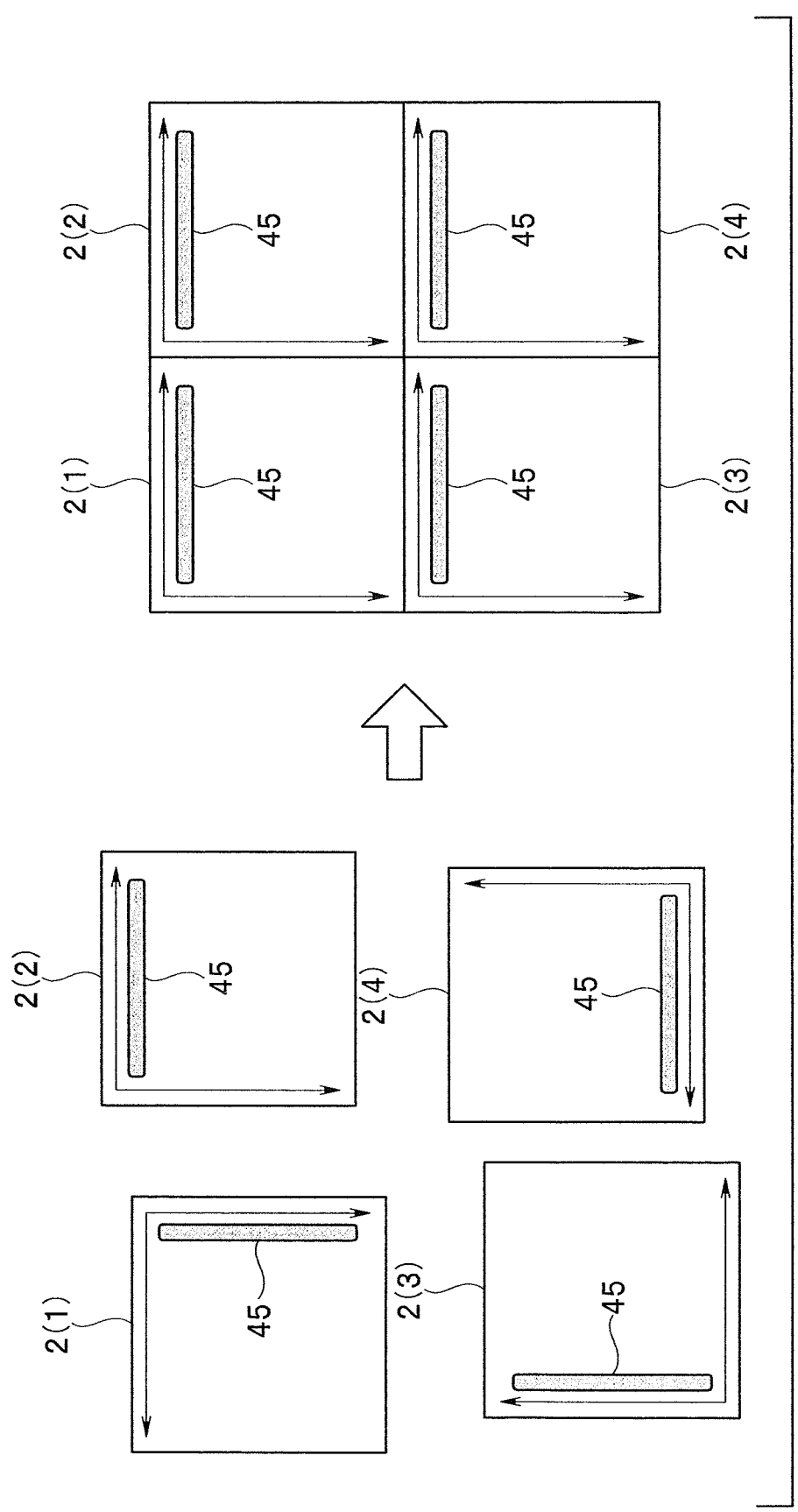
FIG. 50 is a diagram showing an example of blocks including a display mark for unifying coupling directions of the display system 1.

FIG. 50 is a diagram showing an example of blocks including the display mark for unifying coupling directions of the display system 1.

As shown in FIG. 50, the respective blocks 2(1) to 2(4) include a display mark 45 for unifying coupling directions. For example, when the user views the display mark 45 from the lower side, if the display mark 45 is arranged on the upper side, a normal image is displayed. Therefore, the user couples the respective blocks 2(1) to 2(4) such that the display mark 45 in the respective blocks 2(1) to 2(4) is displayed on the upper side. That is, by associating display positions of the display mark 45 with X-Y pixel coordinates of the display devices, without rotating pixel coordinates of images transmitted from the smartphone 3, it is possible to normally display the images. Note that the display mark 45 is displayed on the respective display devices 23 when start switches of the respective blocks 2(1) to 2(4) are turned on. After the respective blocks 2(1) to 2(4) are coupled, an arrangement search signal is transmitted from the smartphone 3 to any blocks. At a point in time when the respective blocks 2(1) to 2(4) receive this signal, the display mark 45 displayed on the respective display devices 23 only has to disappear.

(Transfer/Display Processing of the Block Image Information in Each of the Blocks)

Figure 51:
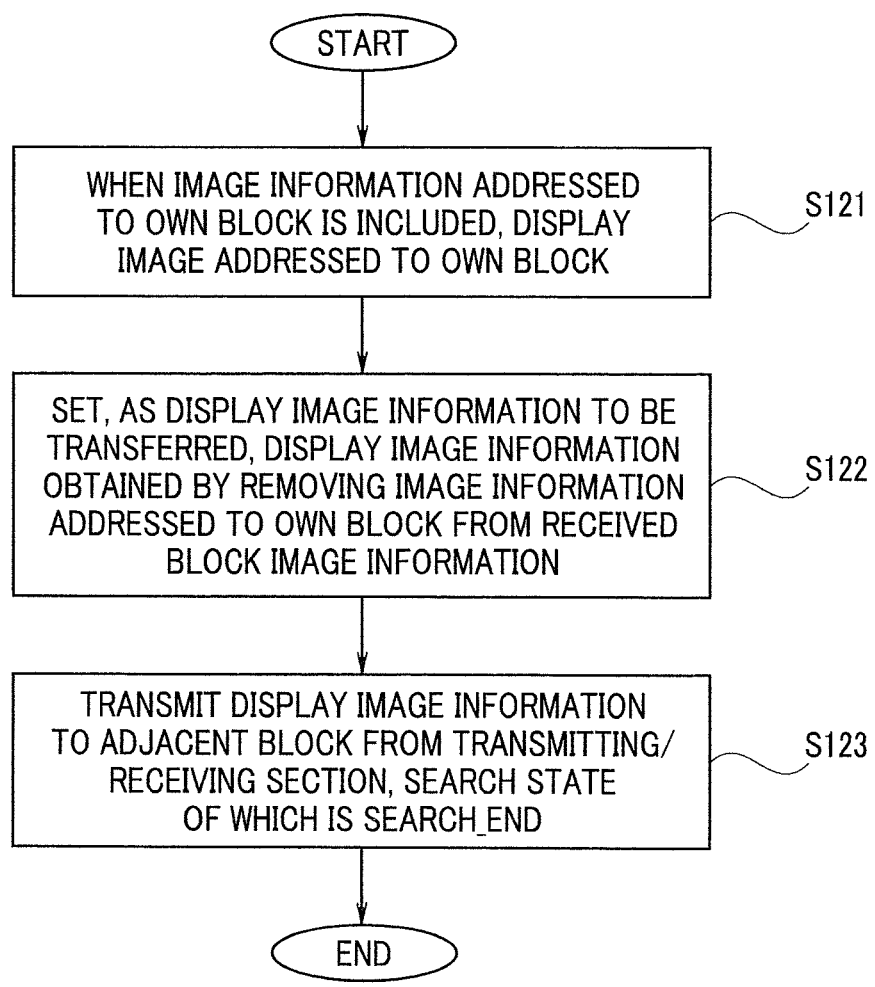

FIG. 51 is a flowchart for explaining an example of a flow of the transfer/display processing of the block image information in each of the blocks 2.

When receiving the display image information including the plurality of pieces of block image information, the CPU 24 of each of the blocks 2 executes the processing in FIG. 51.

The display image information including the plurality of pieces of block image information is received by the start block 2s, that is, the block 2(1) from the smartphone 3. The display image information received by the block 2(1) is transferred from the block 2(1) to the other blocks 2.

When receiving the display image information, the CPU 24 of each of the blocks 2 stores, if image information addressed to the own block is included in the display image information, the block image information addressed to the own block in the RAM 26 or the memory 27 and outputs an image to be displayed by the CPU 24 to the display device 23 and displays the image (S121). Each of the blocks 2 can specify the image information addressed to the own block in the display image information by comparing the own block number stored in the state information table TBL2 and the block number associated with each of the pieces of block image information.

That is, the control section 21 of each of the blocks 2 configures a display control section that displays, when the image information addressed to the block 2 is received in any one of the plurality of transmitting/receiving sections 22, the image information on the display device 23. The control section 21 determines on the basis of an own block number, which is block identification information of the block 2 whether the block image information is addressed to the block 2.

Further, the CPU 24 of each of the blocks 2 sets, as display image information to be transferred, display image information obtained by removing the block image information addressed to the own block from received one or two or more pieces of block image information (S122). The image information addressed to the block 2 is removed from the display image information to be transferred in order to reduce an amount of data to be transferred.

Note that each of the blocks 2 may store all pieces of block image information including block image information of the other blocks in the memory 27.

The CPU 24 of each of the blocks 2 transmits the display image information from the transmitting/receiving section 22 whose search state is "SEARCH_END" to the adjacent block 2 (S123). The display image information is transmitted from the transmitting/receiving section 22 whose search state is "SEARCH_END" because the display image information can be communicated to all the blocks 2 included in the display system 1 without useless transmission.

Each of the blocks 2 executes the processing explained above to thereby display an image to be displayed by the block 2. As a result, as shown in FIG. 34, the display image DG is displayed on the display surface 1a of the display system 1.

As explained above, the user causes the smartphone 3 to execute the predetermined application program and transmits the predetermined command to any block 2 of the display system 1.

The block 2, which receives the predetermined command, and each of the plurality of blocks 2 configuring the display system 1 execute the search request/response command processing and generate the route information string including the plurality of pieces of route information including the coupling information of the plurality of blocks 2 configuring the display system 1.

The route information string concerning the entire display system 1 is transmitted to the smartphone 3.

The smartphone 3 generates, from the received route information string, the block arrangement information of the plurality of blocks 2 configuring the display system 1, generates, on the basis of the block arrangement information, the block image information to be displayed by each of the blocks 2, and transmits the block image information to the block 2(1) in order to transmit the block image information to each of the blocks 2. That is, the smartphone 3, which is the transmitting apparatus, transmits the image information (DG) to one of the plurality of blocks 2.

Each of the blocks 2 outputs the block image information addressed to the block 2 to the display device 23, whereby the display image DG is displayed as a whole on the display surface 1*a* of the display system 1.

(Synchronization Processing in a Moving Image)

The display system 1 displays an image while dividing the image into the plurality of blocks 2(1) to 2(9). Therefore, unless the display system 1 changes, in synchronization among the respective blocks 2(1) to 2(9), an image to be displayed, in particular, when a moving image is displayed, timing when the moving image is displayed in the respective blocks start to shift as time elapses from a display start and the moving image changes to an unsightly image.

In the present embodiment, the smartphone 3 inserts a time stamp of time when the divided moving images should be displayed into respective picture frames of the divided moving images and transmits image information to the respective blocks 2(1) to 2(9). Consequently, the smartphone 3 synchronizes display timings among the respective blocks 2(1) to 2(9). This is explained blow.

First, the respective blocks 2(1) to 2(9) perform time synchronization among the respective blocks 2(1) to 2(9) during initialization to prevent dropouts of images.

However, when the respective blocks 2(1) to 2(9) generate time with a quartz oscillator having accuracy of approximately several tens of ppms and perform moving image display at several tens of frames/second, for example, it is likely that an error of display timing equal to or larger than one frame occurs among the respective blocks 2(1) to 2(9) in approximately several tens of minutes. It is likely that, even with an error of display timing smaller than one frame, an image unsightly for the user is formed. Therefore, the time synchronization among the respective blocks 2(1) to 2(9) needs to be performed at a predetermined interval.

Therefore, in the present embodiment, even after the initialization, the time synchronization among the respective blocks 2(1) to 2(9) is periodically performed, for example, at an interval of once in several seconds. The respective blocks 2(1) to 2(9) obtain information concerning the adjacent blocks 2 through near field communication and perform the time synchronization.

According to the arrangement search during the initialization, as shown in FIG. 29, a route passing through the respective blocks 2(1) to 2(9) is determined. Note that, in the following explanation, the route without branches shown in FIG. 29 is explained as an example. However, the explanation can also be applied to a route having branches. The first block 2(1) on the route shown in FIG. 29 is referred to as master block and the other blocks 2(2) to 2(9) are referred to as slave blocks.

FIG. 52 is a flowchart for explaining an example of time synchronous message processing in the master block. FIG. 53 is a flowchart for explaining an example of time synchronous message processing in the slave block. FIG. 54 is a timing chart for explaining the processing in FIGS. 52 and 53. FIG. 55 is a diagram for explaining logical time in S144 in FIG. 53.

First, the CPU 21 of the master block (the block 2(1)) determines whether regular start time has come (S131). That is, as explained above, the CPU 21 periodically performs the time synchronization among the respective blocks 2(1) to 2(9), for example, at an interval of once in several seconds.

When the regular start time has not come (NO in S131), the CPU 21 of the master block returns to step S131 and repeats the same processing. On the other hand, when the regular start time has come (YES in S131), the CPU 21 of the master block transmits a message Msg1 with master time set to own present time Tm, a delay cumulative total Dt set to zero, and X time set to own present time Tx1 (transmission time) to the next block (the slave block: the block 2(2)) on the route (S132). That is, as shown in S201 in FIG. 54, the master block (a block X) transmits the message Msg1 of the master time (Tm), the delay cumulative total (Dt), and the X time (Tx1) to the next slave block (a block Y).

Thereafter, a message Msg2 is transmitted to the master block from the slave block to which the message Msg1 is transmitted. Note that processing of the slave block is explained below.

When receiving the message Msg2 from the slave block adjacent to the master block, the CPU 21 of the master block transmits a message Msg3 with the master time kept at Tm, the delay cumulative total kept at zero, and the X time set to own present time Tx2*a*/Tx2*b* (reception time/transmission time) to the next slave block (the block 2(2)) on the route (S133), returns to step S131, and repeats the same processing. That is, as shown in S202 in FIG. 54, the master block transmits the message Msg3 with the mater time (Tm), the delay cumulative total (Dt), and the X time (Tx2*n*/Tx2*b*) to the next block.

Processing of the slave block that receives the messages Msg1 and Msg3 from the master block is explained.

The CPU 21 of the slave block determines whether the message Msg1 is received from the preceding block (the master block: the block 2(1)) on the route (step S141). When the message Msg1 is not received (NO in S141), the CPU 21 of the slave block returns to step S141 and repeats the same processing. On the other hand, when the message Msg1 is received (YES in S141), the CPU 21 of the slave block transmits the message Msg2 with the master time TM kept as in the message Msg1, with the delay cumulative total kept as in the message Msg1, and the Y time set to own present time Ty1*a*/Ty1*b* (reception time/transmission time) to the preceding block (the master block: the block (1)) on the route (S142). That is, as shown in S203 in FIG. 54, the slave block transmits the message Msg2 of the master time (Tm), the delay cumulative total (Dt), and the Y time (Ty1*a*/Ty1*b*) to the preceding master block.

Thereafter, the message Msg3 is transmitted to the slave block from the master block to which the message Msg2 is transmitted.

When receiving the message Msg3 from the preceding block on the route, the CPU 21 of the slave block calculates a delay time Dx and an adjacent delay time Dn on the basis of the X time (Tx1) of the message Msg1, the X time (Tx2*a*/Tx2*b*) of the message Msg3, the Y time (Ty1*a*/Ty1*b*) of the message Msg2, and the own present time (Ty2) (S143).

The delay time Dx and the adjacent delay time Dn are calculated by the following Equation 2 and Equation 3.

$$Dx = \{(Tx2a - Tx1) - (Ty1b - Ty1a) + (Ty2 - Ty1b) - (Tx2b - Tx2a)\}/4 \quad \text{(Equation 2)}$$

$$Dn = (Tx2b - Tx1) + Dx \quad \text{(Equation 3)}$$

Subsequently, the CPU 21 of the slave block sets time obtained by adding the delay time Dx to the master time (Tm) as estimated master time (Tm/Ty1*a*) at the own present time Ty1*a*, calculates a correction function from the estimated master time (Tm/Ty1*a*) and a history in the past, and calculates logical time TLx (S144).

The master time is time of the master block. A progress degree of time of the mater block is different from a progress degree of time of the respective slave blocks because of an error in a clock source (a quartz oscillator, etc). Therefore, the error increases as time elapses. The respective slave blocks calculate a difference between progress degrees of the master time and the own time from histories of the estimated master time and the own time in the past and calculate logical time at necessary respective times tin future.

In FIG. 55, the abscissa indicates true time and the ordinate indicates times of the respective blocks. At true times Tt1, Tt2, Tt3, Tt4, and the like, times of a certain slave block are Tx1, Tx2, Tx3, Tx4, and the like. Estimated master times corresponding to the slave block are Tm1, Tm2, Tm3, Tm4, and the like.

When the times of the respective blocks are accurate, a graph of the times of the respective blocks is a straight line having a tilt of 45°. However, since there is a limit in accuracy of the quartz oscillator, the graph is not the straight line having the tilt of 45°. Note that, in FIG. 55, the error is exaggerated to make it easy to understand the error.

If the true time Tt1 is initialization time, the time Tx1 of a certain slave block is the estimated master time Tm1. Therefore, a difference Tm1-Tx1 is correction time c1. At this point, the logical time TLx of the slave block is set as time Tx+c1 of the slave block (TLx(t)=Tx(t)+c1). The time t is regarded as the own time Tx.

Thereafter, since the slave block has a history in the past at true time Ttn, the slave block can calculate a difference between an average way of progress of the estimated master time (a sparse broken line 50) and an average way of progress of the own time (a sparse broken line 51). Consequently, the slave block can calculate a correction function c(t) corresponding to the own time Tx(t) and calculate the logical time TLx(t) at the respective times t necessary in future.

The logical time TLx(t) of the slave block is calculated by Equation 4 below.

$$TLx(t)=Tx(t)+c(t) \tag{Equation 4}$$

Subsequently, the CPU 21 of the slave block transmits a message Msg1' with the master time TM kept at the value of the message Msg1 received from the preceding block, the delay cumulative total set to a value obtained by adding the adjacent delay time Dn and the own processing time Dy to the delay cumulative total, and the X time set to own present time Tx1' to the next block (the slave block: the block 2(3)) on the route (S145). Subsequently, a message Msg2' is transmitted to the slave block (the block 2(2)) from the slave block (the block 2(3)) to which the message Msg1' is transmitted. That is, as shown in S204 in FIG. 54, the slave block (the block Y) transmits the message Msg1' of the master time (Tm), the delay cumulative total (Dt: obtained by adding the adjacent delay time Dn and the own processing time Dy to the transmitted delay cumulative total), and the X time (Tx1') to the next slave block (a block Z).

Thereafter, when receiving the message Msg2' from the preceding slave block (the block 2(3)), the CPU 21 of the slave block (the block 2(2)) transmits a message Msg3' with the master time and the delay cumulative total not changed from the values of the message Msg1' and the X time set to Tx2a'/Tx2b' (reception time/transmission time) to the next slave block (the block 2(3)) on the route (S146) and returns to step S141. That is, as shown in S205 in FIG. 54, the slave block (the block Y) transmits the message Msg3' of the master time (Tm), the delay cumulative total (Dt), and the X time (Tx2a'/Tx2b') to the next slave block (the block Z).

The slave block that receives the messages Msg1' and Msg3' performs processing same as the processing shown in FIG. 53. Consequently, the respective slave blocks (the blocks 2(2) to 2(9)) can share substantially the same logical time synchronizing with the master time of the master block (the block 2(1)). As a result, the blocks 2(1) to 2(9) can display (update) the images substantially simultaneously according to the time stamp of the time when the images should be displayed inserted into the respective images.

Note that the smartphone 3 knows in advance a time period necessary for transferring the images to all the blocks 2(1) to 2(9) and controls the transfer of the images such that the transfer of the images to all the blocks 2(1) to 2(9) ends by the time when the images should be displayed.

Note that, in the above explanation, the time synchronization is performed with the block 2(1) set as the master block and the blocks 2(2) to 2(9) set as the slave blocks. However, the time synchronization may be performed with the smartphone 3 set as the master block and the blocks 2(1) to 2(9) set as the slave blocks. In this case, time synchronization can be performed between the smartphone 3 and the blocks 2(1) to 2(9).

By periodically performing the time synchronization of the respective blocks as explained above, a pause and play of a moving image can also be easily performed.

That is, there is a need that the user having the smartphone 3 and viewing a moving image temporarily stops the moving image and plays the moving image again or, after temporarily stopping the moving image, puts back the moving image for several seconds and then plays the moving image again. In this case, when the user transmits, with the smartphone 3, a signal for a moving image play stop to the start block 2(1) through a start application, the start block 2(1) that receives the signal gives an instruction for the moving image play stop to the start block 2(1) itself and the other blocks 2(2) to 2(9) in order. At this point, the start block 2(1) transmits, in addition to the stop signal, data of time of a time stamp of a picture frame of the moving image at a point in time when the stop signal is received to the start block 2(1) itself and the other blocks.

After all the blocks 2(1) to 2(9) receive the stop signal and the moving images in respective blocks stop, when the user desires to play the moving image from a point in time of the stop, the user only has to transmit, from the smartphone 3, an instruction for play to all the other blocks 2(2) to 2(9) through the start block 2(1) (however, a time period needs to be extended taking into a transmission time of the play instruction from the start block to the last block according to the number of blocks).

The user may designate, on the application of the smartphone 3, a time period for which the user desires to put back the moving image or a time period for which the user desires to put forward the moving image. In this case, the user causes all the blocks 2(1) to 2(9) to recognize, in the same manner as explained above, a picture frame having a time stamp closest to time obtained by subtracting, from time of the time stamp at the stop time, the time period for which the user desires to put back the moving image or time obtained by adding, to the time of the time stamp, the time period for which the user desires to put forward the moving image. Consequently, after a predetermined time elapses, all the blocks 2(1) to 2(9) can simultaneously play the moving image from respective picture frames having the same time stamp time.

Further, a configuration is also possible in which at least one block of the blocks 2 includes a display surface 2*a* having a touch panel function. The touch panel function is a function for enabling some kind of computer operation when a human finger or the like touches the display surface 2*a*. For example, the display surface 2*a* includes a sensor that detects the touch of the human finger or the like. In this case, instead of the smartphone 3, the block 2 including the display surface 2*a* having the touch panel function instructs the remaining blocks 2 to stop and play the moving image. A method of the instruction is the same as the method performed by the smartphone 3. A configuration is also possible in which all the blocks 2 include the display surfaces 2*a* having the touch panel function. In this case, all the blocks 2 can instruct the stop and the play of the moving image.

Note that the example explained above is the display system formed by connecting only the square blocks 2. However, as explained above, the blocks 2 having the different shapes may be connectable.

FIG. 56 is a diagram showing a configuration example of a display system 1C including blocks having two kinds of shapes, i.e., a rectangular and a regular triangle. Therefore, the user can form a display system including the display surface 1*a* of a desired shape by optionally connecting the plurality of blocks 2 having the different shapes.

Furthermore, in the example explained above, the near field communication (NFC) is used for the communication between the smartphone 3 and the block 2. However, the communication between the smartphone 3 and the block 2 may be performed using short range radio such as WiFi.

For example, in FIGS. 3 and 8, as indicated by an alternate long and short two dashes line, a communication section WFN having a short range radio function such as WiFi may be provided in one of the plurality of blocks 2 configuring the display system 1. In the case of such a configuration, only the block 2 including the communication section WFN is the start block 2*s*. The search request command SC and the display image information from the smartphone 3 are received in the start block 2*s*. The search response RC is transmitted from the start block 2*s* to the smartphone 3. That is, one of the plurality of blocks 2 may include a wireless communication section configured to perform near field communication for receiving the search request command SC.

In the example explained above, the identification of each of the blocks 2 is based on the temporarily-generated block number. However, a peculiar identification number (e.g., an MAC address or a manufacturing number) may be given to each of the blocks. The identification of each of the blocks may be performed using the peculiar identification number.

Furthermore, in the example explained above, the plurality of blocks 2 are arranged to be coupled to one another on a two-dimensional plane. However, the blocks 2 may be coupled to be three-dimensionally adjacent to one another.

A display system in which cubic blocks are coupled in a three-dimensional shape is explained below. Note that the blocks configuring the display system are not limited to the cubic blocks and may be, for example, rectangular parallelepiped blocks.

FIGS. 57A to 75I are perspective views showing examples of the cubic blocks. As shown in FIG. 57A, a cubic block 60*a* includes six surfaces f1 to f6. In the block 60*a*, visible surfaces are the surfaces f1, f4, and f5. Invisible surfaces are the surfaces f2, f3, and f6.

When a plurality of the cubic blocks 60*a* are coupled to form a display system having a three-dimensional shape such as a pyramid structure is formed, in the block 60*a*, to eliminate a place where the display device 23 is not formed, in this case, display devices need to be provided on one to five surfaces.

A block 60*b* shown in FIG. 57B includes the display device only on one surface f1. A block 60*c* shown in FIG. 57C includes the display devices on two surfaces f1 and f2. A block 60*d* shown in FIG. 57D includes the display devices on two surfaces f1 and f3. In this way, two patterns are present in the blocks 60*c* and 60*d* including the display devices on the two surfaces. The blocks 60*c* and 60*d* can be applied to various coupling patterns by being rotated.

Blocks 60*e* and 60*f* shown in FIGS. 57E and 57F are two patterns including the display devices on three surfaces. Blocks 60*g* and 60*h* shown in FIGS. 57G and 57H are two patterns including the display devices on four surfaces. The block 60*e* includes the display devices on the surfaces f1, f2, and f3. The block 60*f* includes the display devices on the surfaces f1, f2, and f5. The block 60*g* includes the display devices on the surfaces f1, f2, f3, and f4. The block 60*h* includes the display devices on the surfaces f1, f2, f3, and f5. A block 60*i* shown in FIG. 57I includes the display devices on five surfaces f1, f2, f3, f4, and f5.

In the blocks 60*b* to 60*i*, transmitting/receiving sections for data transmission and reception are arranged on surfaces on which the display devices are not provided. Data is transferred to blocks adjacent to the blocks 60*b* to 60*i*.

FIG. 58 is a diagram showing an example of a display system formed in a pyramid structure by placing cubic blocks one on top of another in stages.

When cubic blocks are coupled in a three-dimensional shape to form a display system 1C as shown in FIG. 58, the display devices need to be formed on all the surfaces of the display system 1C irrespective of directions in which the user views the display system 1C. Therefore, the respective blocks forming the display system 1C need to include the display devices on a plurality of surfaces. Any one of the blocks 60*b* to 60*i* is used.

FIG. 59 is an exploded view of the display system 1C having the pyramid structure exploded in the respective stages.

In the display system 1C, the blocks arranged at four corners in the first stage from the bottom need to include the display devices on three surfaces. Therefore, the block 60*f* is used. Blocks arranged in places other than the four corners only have to include the display devices on two surfaces. Therefore, the block 60*c* is used. The same applies to second and third stages from the bottom. Blocks arranged in a fourth stage from the bottom (the top stage) need to include the display devices on five surfaces. Therefore, the block 60*i* is used. In these blocks, the transmitting/receiving sections are arranged on the surfaces not including the display devices. Data is transferred to blocks adjacent to the blocks.

On the other hand, blocks not arranged on the surfaces when the pyramid structure is formed do not need to include the display devices. The blocks not including the display devices are divided into blocks (dummy blocks: simple housings formed according to the size of the display apparatus) 60*j* not including the display devices, the communication sections, and the control sections, which are housings for only filling gaps among the blocks, and blocks 60*k* not including the display devices but including the transmitting/receiving sections and the control sections. As explained above, the blocks not including the display devices but including the transmitting/receiving sections and the control sections are also included in the display apparatus. The blocks 60*k* may include the transmitting/receiving sections on all the surfaces. However, the blocks 60k may include at least two or more transmitting/receiving sections to correspond to only surfaces necessary for data transfer between the blocks adjacent to the blocks 60k and the next blocks.

In order to transfer data between the first stage and the second stage, in order to transfer data between the second stage and the third stage, and in order to transfer data between the third stage and the fourth stage, at least one block 60k is arranged in the first to third stages. Note that, as the block 60k, in order to perform transfer of data, a block including the display device on at least one surface is arranged. In the gaps among the other blocks, the blocks 60j, which are the dummy blocks, are arranged.

The user can configure the display system 1C having a desired three-dimensional structure by selecting, according to a three-dimensional shape, which of the blocks 60b to 60k is used and assembling the blocks. Note that, when the blocks 60b to 60k are coupled in a three-dimensional shape or arranged on a wall or the like, a mechanism for coupling the display devices to each other on the inner surface or a mechanism for fixing the display devices on the wall only has to be provided.

When an arrangement search and transfer of image information is performed from the smartphone 3 to the display system 1C, it is conceivable that the arrangement search and the transfer of the image information cannot be performed with respect to a surface including the display device by the near field communication (NFC, etc.). In this case, as shown in FIG. 59, instead of the block 60f including the three display devices, the block 60c including the two display devices or the block 60k not including the display device is arranged. After the transfer of all of the arrangement search and the image information is performed from the smartphone 3, the block 60c or 60k only has to be replaced with the block 60f including the display device on the three surfaces. Alternatively, after all the image information is transferred from the smartphone 3 to the block 60f, the block 60f may sequentially perform the transfer of the arrangement search and the image information on behalf of the smartphone 3.

Further, in the present embodiment, the example is explained in which an image (a still image or a moving image) is displayed on the display device 23 of the block 2. However, the present invention is not limited to this. The image is a stimulus to the visual sense but may stimulate a sense other than the visual sense, for example, the auditory sense or the tactile sense.

FIGS. 60 and 61 are diagrams showing examples of other configurations of blocks.

As shown in FIG. 60, for example, a block 70 may further incorporate, on the inside, in addition to the display device on which an image is formed, a speaker (e.g., a piezoelectric speaker) 71 that emits sound (displays sound) for stimulating the auditory sense. The speaker 71 outputs, for example, a melody of a song, singing voice, or sound. Note that the display device may be a display device that does not have a function of displaying an image and displays only sound.

As a method of utilization of a display system in which a plurality of the blocks 70 incorporating the speakers 17 are coupled, a digital signal of a song is divided according to the number of the blocks 70 and divided digital signals are transferred to the respective blocks 70 from the smartphone 3. The user listens to fragments of music different from one another output from the blocks 70 divided into pieces, rearranges the respective blocks 70 to form the original song, and checks, with a signal from the smartphone 3, whether the order of the rearranged blocks 70 is correct or wrong. Besides, the display system in which the blocks 70 incorporating the speakers 71 are coupled can be utilized by various methods.

As shown in FIG. 61, as a block for representing a three-dimensional shape for stimulating the tactile sense in addition to the visual sense, a block 72 can be used in which a large number of cylinders 73 are arranged in a matrix shape on a surface of a display device of the block and a cylinder driving section for driving the respective cylinders 73 is incorporated. A control section and the cylinder driving section are connected. The respective cylinders 73 are independently driven by the cylinder driving section to form three-dimensional unevenness on the display device surface.

A plurality of the blocks 72 may be coupled. For example, according to a purpose, a geography of a mountain may be represented by an entire display system in which the blocks 72 are coupled. The block 72 can be used for purposes other than this purpose. When sound display or 3D shape display is performed on the display device, a sound display application or a 3D shape display application only has to be installed in the smartphone 3 according to the sound display or the 3D shape display.

As explained above, according to the embodiment, it is possible to realize the display block and the display system capable of performing image data transfer among a plurality of arranged display apparatuses and capable of optionally changing a size and a form of a display screen on which an image is displayed.

A data communication method of the respective transmitting/receiving sections of the display apparatus may be optical wireless communication or the like instead of the near field communication such as the NFC. In this case, the transmitting/receiving section of the block is, for example, a mechanism for performing data transmission and reception by an infrared ray. Center section regions of respective side surfaces corresponding to the transmitting/receiving sections of the block have transparency to the infrared ray. Optimum communication means only has to be selected taking into account, for example, the necessity of further reducing the size of the block and the necessity of more quickly transferring larger data.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. A display apparatus including a plurality of surfaces, the display apparatus comprising:
    a display device provided on at least one surface among the plurality of surfaces;
    a plurality of communication sections arranged to correspond to at least two side surfaces with respect to the at least one surface on which the display device is provided and configured to perform communication within a predetermined distance, the plurality of communication sections including different identification information from each other; and
    a control section configured to perform control of the plurality of communication sections and the display device, wherein:
when another display apparatus is connected to the display apparatus, the control section periodically performs time synchronization to synchronize an image displayed on the display device with an image displayed on a display device provided in the other display apparatus,
when receiving a first message including a master time, a delay cumulative total, and a first own present time from the other display apparatus, the control section transmits a second message including the master time, the delay cumulative total, and a second own present time to the other display apparatus,
the first own present time is a time at which the first message is transmitted from the other display apparatus to the display apparatus, and
the second own present time is a time at which the first message is received from the other display apparatus and the second message is transmitted from the display apparatus to the other display apparatus.

2. The display apparatus according to claim 1, wherein, when receiving a third message including the master time, the delay cumulative total, and a third own present time from the other display apparatus, after transmitting the second message to the other display apparatus, the control section calculates a delay time and an adjacent delay time, based on the first own present time, the second own present time, the third own present time, and a fourth own present time.

3. The display apparatus according to claim 2, wherein:
the third own present time is a time at which the second message is received from the display apparatus and the third message is transmitted from the other display apparatus to the display apparatus, and
the fourth own present time is a present time in the display apparatus.

4. The display apparatus according to claim 2, wherein the control section sets a time obtained by adding the delay time to the master time as an estimated master time at a present time in the display apparatus, calculates a correction function from the estimated master time and a history in the past, and calculates a logical time.

5. The display apparatus according to claim 4, wherein the control section synchronizes the image displayed on the display device with the image displayed on the display device provided in the other display apparatus, based on the logical time.

* * * * *